United States Patent
Wang et al.

(10) Patent No.: US 12,096,292 B2
(45) Date of Patent: Sep. 17, 2024

(54) SYSTEM, DATA TRANSMISSION METHOD AND NETWORK EQUIPMENT SUPPORTING PDCP DUPLICATION FUNCTION METHOD AND DEVICE FOR TRANSFERRING SUPPLEMENTARY UPLINK CARRIER CONFIGURATION INFORMATION AND METHOD AND DEVICE FOR PERFORMING CONNECTION MOBILITY ADJUSTMENT

(71) Applicant: Samsung Electronics Co., Ltd, Suwon-si (KR)

(72) Inventors: Weiwei Wang, Beijing (CN); Lixiang Xu, Beijing (CN); Xiaowan Ke, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/684,549

(22) Filed: Nov. 14, 2019

(65) Prior Publication Data

US 2020/0084682 A1      Mar. 12, 2020

Related U.S. Application Data

(63) Continuation of application No. 16/611,212, filed as application No. PCT/KR2018/005237 on May 4, 2018.

(30) Foreign Application Priority Data

May 5, 2017   (CN) .......................... 201710316543.8
Jun. 16, 2017  (CN) .......................... 201710461700.4
(Continued)

(51) Int. Cl.
H04W 36/02   (2009.01)
H04L 5/00    (2006.01)
(Continued)

(52) U.S. Cl.
CPC ............ *H04W 36/026* (2013.01); *H04L 5/005* (2013.01); *H04L 5/0055* (2013.01); *H04W 24/02* (2013.01);
(Continued)

(58) Field of Classification Search
None
See application file for complete search history.

(56) References Cited

U.S. PATENT DOCUMENTS 9,402,255 B2   7/2016  Lohr et al.
10,091,806 B2  10/2018 Aminaka et al.
(Continued)

FOREIGN PATENT DOCUMENTS

AU   2019207254 A1    1/2020
BR   112019018068 A2  7/2020
(Continued)

OTHER PUBLICATIONS

Communication pursuant to Article 94(3) EPC dated Aug. 17, 2020 in connection with European Patent Application No. 18 793 884.0, 5 pages.
(Continued)

*Primary Examiner* — Gregory B Sefcheck
*Assistant Examiner* — Suk Jin Kang

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure discloses a system, a data transmission method and a network equipment supporting a Packet Data Convergence Protocol (PDCP) duplication function. The data transmission method supporting a PDCP duplication function comprises the steps of: transmitting, by a first network equipment, a configuration instruction message of
(Continued)

a radio bearer supporting a PDCP duplication function to a second network equipment; and, performing, by the first network equipment and the second network equipment, transmission of a data packet of the radio bearer configured with the PDCP duplication function. In the present disclosure, by an interface between the first network equipment and the second network equipment, the transmission of duplicated data packets between the first network equipment and the second network equipment is realized, and the reliability of data transmission is improved. The present disclosure also discloses a method and device for transferring supplementary uplink carrier configuration information and a method and device for performing a connection mobility adjustment.

12 Claims, 15 Drawing Sheets

(30) Foreign Application Priority Data

Jan. 10, 2018 (CN) .................. 201810024386.8
Jan. 11, 2018 (CN) .................. 201810028304.7

(51) Int. Cl.

| | | |
|---|---|---|
| H04W 24/02 | (2009.01) | |
| H04W 28/18 | (2009.01) | |
| H04W 36/00 | (2009.01) | |
| H04W 36/08 | (2009.01) | |
| H04W 36/14 | (2009.01) | |
| H04W 80/02 | (2009.01) | |
| H04W 80/10 | (2009.01) | |
| H04W 92/20 | (2009.01) | |

(52) U.S. Cl.
CPC ..... *H04W 28/18* (2013.01); *H04W 36/00835* (2018.08); *H04W 36/08* (2013.01); *H04W 36/14* (2013.01); *H04W 80/02* (2013.01); *H04W 80/10* (2013.01); *H04W 92/20* (2013.01); *H04L 5/0048* (2013.01)

(56) References Cited

U.S. PATENT DOCUMENTS

| | | | |
|---|---|---|---|
| 10,172,179 B2 | 1/2019 | Van Lieshout et al. | |
| 10,334,477 B2 | 6/2019 | Yi et al. | |
| 10,623,988 B2 | 4/2020 | Wang et al. | |
| 10,638,386 B2 | 4/2020 | Wang et al. | |
| 10,644,974 B2 | 5/2020 | Novlan et al. | |
| 10,694,417 B2 | 6/2020 | Zhu et al. | |
| 10,757,615 B2* | 8/2020 | Park | H04W 24/10 |
| 10,764,947 B2 | 9/2020 | Park et al. | |
| 10,764,948 B2 | 9/2020 | Park et al. | |
| 10,772,007 B2 | 9/2020 | Shim et al. | |
| 10,772,008 B2 | 9/2020 | Park et al. | |
| 10,834,638 B2 | 11/2020 | Dai et al. | |
| 10,869,243 B2 | 12/2020 | Kim et al. | |
| 10,925,103 B2 | 2/2021 | Luo et al. | |
| 10,986,493 B2 | 4/2021 | Yi et al. | |
| 11,038,859 B2 | 6/2021 | Van Der Velde et al. | |
| 11,483,883 B2 | 10/2022 | Luo et al. | |
| 2010/0113004 A1* | 5/2010 | Cave | H04W 72/0406 |
| | | | 455/422.1 |
| 2012/0147733 A1* | 6/2012 | Wang | H04L 41/0863 |
| | | | 370/216 |
| 2012/0264417 A1* | 10/2012 | Gao | H04W 36/0083 |
| | | | 455/422.1 |
| 2013/0072208 A1* | 3/2013 | Marinier | H04L 5/0053 |
| | | | 455/450 |
| 2013/0155984 A1* | 6/2013 | Marinier | H04W 52/365 |
| | | | 370/329 |
| 2013/0343297 A1 | 12/2013 | Dinan | |
| 2014/0204771 A1 | 7/2014 | Gao et al. | |
| 2015/0156766 A1 | 6/2015 | Xu et al. | |
| 2015/0208267 A1 | 7/2015 | Jung et al. | |
| 2016/0164793 A1 | 6/2016 | Basu et al. | |
| 2016/0295600 A1 | 10/2016 | Dinan | |
| 2017/0019930 A1 | 1/2017 | Lee et al. | |
| 2017/0041943 A1 | 2/2017 | Aminaka et al. | |
| 2017/0164273 A1 | 6/2017 | Hayashi et al. | |
| 2017/0222876 A1 | 8/2017 | Van Der Velde et al. | |
| 2018/0227919 A1* | 8/2018 | Lee | H04L 5/0032 |
| 2018/0270718 A1 | 9/2018 | Wang et al. | |
| 2018/0279168 A1 | 9/2018 | Jheng et al. | |
| 2018/0279169 A1 | 9/2018 | Wang et al. | |
| 2018/0279353 A1* | 9/2018 | Shaheen | H04W 72/042 |
| 2018/0279360 A1* | 9/2018 | Park | H04L 5/0053 |
| 2018/0302890 A1* | 10/2018 | Marinier | H04W 72/0406 |
| 2018/0309660 A1 | 10/2018 | Loehr et al. | |
| 2018/0324780 A1 | 11/2018 | Novlan et al. | |
| 2018/0338277 A1* | 11/2018 | Byun | H04W 74/0833 |
| 2018/0343584 A1 | 11/2018 | Yi et al. | |
| 2018/0367288 A1 | 12/2018 | Vrzic et al. | |
| 2018/0368107 A1* | 12/2018 | Babaei | H04L 1/1838 |
| 2018/0368132 A1* | 12/2018 | Babaei | H04W 76/11 |
| 2019/0028918 A1 | 1/2019 | Zhu et al. | |
| 2019/0075023 A1* | 3/2019 | Sirotkin | H04W 88/08 |
| 2019/0098529 A1 | 3/2019 | Park et al. | |
| 2019/0098682 A1 | 3/2019 | Park et al. | |
| 2019/0132777 A1* | 5/2019 | Park | H04W 76/19 |
| 2019/0182716 A1* | 6/2019 | Futaki | H04W 76/27 |
| 2019/0200259 A1* | 6/2019 | Shim | H04W 28/16 |
| 2019/0215726 A1* | 7/2019 | Park | H04L 41/0816 |
| 2019/0253915 A1 | 8/2019 | Joseph et al. | |
| 2019/0268103 A1* | 8/2019 | Park | H04L 5/0055 |
| 2019/0268799 A1* | 8/2019 | Hong | H04W 4/70 |
| 2019/0327133 A1* | 10/2019 | Gao | H04W 48/16 |
| 2019/0327772 A1 | 10/2019 | Luo et al. | |
| 2019/0342809 A1 | 11/2019 | Kim | |
| 2019/0349139 A1* | 11/2019 | Park | H04W 76/27 |
| 2019/0357264 A1* | 11/2019 | Yi | H04L 5/001 |
| 2019/0372841 A1* | 12/2019 | Sirotkin | H04L 41/082 |
| 2020/0008255 A1* | 1/2020 | Sharma | H04W 12/037 |
| 2020/0029349 A1* | 1/2020 | Chang | H04W 52/0216 |
| 2020/0037151 A1 | 1/2020 | Du et al. | |
| 2020/0067676 A1* | 2/2020 | Yi | H04W 72/042 |
| 2020/0084808 A1* | 3/2020 | Oak | H04L 69/321 |
| 2020/0112879 A1* | 4/2020 | Shimoda | H04L 1/1819 |
| 2020/0120579 A1* | 4/2020 | Byun | H04W 48/14 |
| 2020/0128578 A1* | 4/2020 | Park | H04W 72/23 |
| 2020/0162211 A1 | 5/2020 | Wang et al. | |
| 2020/0228442 A1 | 7/2020 | Liu et al. | |
| 2020/0245401 A1 | 7/2020 | Ingale et al. | |
| 2020/0274651 A1 | 8/2020 | Yi et al. | |
| 2020/0274750 A1* | 8/2020 | Yi | H04L 27/2659 |
| 2020/0280987 A1* | 9/2020 | Liu | H04L 5/0098 |
| 2020/0281023 A1* | 9/2020 | Yan | H04W 72/0413 |
| 2020/0314696 A1* | 10/2020 | Futaki | H04W 80/02 |
| 2020/0351950 A1* | 11/2020 | Liu | H04W 72/042 |
| 2020/0382240 A1 | 12/2020 | Centonza et al. | |
| 2020/0389930 A1 | 12/2020 | Park et al. | |
| 2020/0396026 A1* | 12/2020 | Chang | H04W 74/08 |
| 2020/0396786 A1 | 12/2020 | Park et al. | |
| 2020/0413363 A1* | 12/2020 | Park | H04W 56/0045 |
| 2021/0160120 A1* | 5/2021 | Yi | H04L 27/2613 |
| 2021/0227600 A1* | 7/2021 | Luo | H04W 76/12 |
| 2022/0095162 A1* | 3/2022 | Shimoda | H04L 1/08 |
| 2022/0095385 A1* | 3/2022 | Yi | H04W 74/0833 |

FOREIGN PATENT DOCUMENTS

| | | |
|---|---|---|
| CA | 3074691 A1 | 4/2019 |
| CA | 3049053 C | 3/2022 |
| CN | 102026398 A | 4/2011 |
| CN | 103796287 A | 5/2014 |
| CN | 104869666 A | 8/2015 |
| CN | 105409135 A | 3/2016 |
| CN | 105706387 A | 6/2016 |

(56) References Cited

FOREIGN PATENT DOCUMENTS

| | | |
|---|---|---|
| CN | 106332048 A | 1/2017 |
| CN | 107006051 A | 8/2017 |
| CN | 109560899 A | 4/2019 |
| CN | 110035563 A | 7/2019 |
| CN | 110691424 A | 1/2020 |
| CN | 111466133 A | 7/2020 |
| CN | 110691424 B | 9/2020 |
| EP | 3536021 A1 | 9/2019 |
| EP | 3570626 A1 | 11/2019 |
| EP | 3536021 B1 | 8/2020 |
| EP | 3713334 A1 | 9/2020 |
| EP | 3737014 A1 | 11/2020 |
| GB | 2563453 A | 12/2018 |
| JP | 2017-088666 A | 5/2017 |
| JP | 2017-127025 A | 7/2017 |
| JP | 2020-511818 A | 4/2020 |
| KR | 10-2018-0007706 A | 1/2018 |
| KR | 10-2018-0100704 | 9/2018 |
| KR | 10-2018-0118804 A | 10/2018 |
| KR | 10-1984609 B1 | 5/2019 |
| KR | 10-2100491 B1 | 4/2020 |
| KR | 10-2020-0058467 A | 5/2020 |
| KR | 10-2021-0126144 A | 10/2021 |
| KR | 10-2311647 B1 | 10/2021 |
| KR | 10-2352184 B1 | 1/2022 |
| WO | 2010/131850 A2 | 11/2010 |
| WO | 2013104413 A1 | 7/2013 |
| WO | 2017188698 A1 | 11/2017 |
| WO | 2017191933 A1 | 11/2017 |
| WO | 2017191952 A1 | 11/2017 |
| WO | 2018012873 A1 | 1/2018 |
| WO | 2018/228134 A1 | 12/2018 |
| WO | 2019067970 A1 | 4/2019 |
| WO | 2019137519 A1 | 7/2019 |

OTHER PUBLICATIONS

Ericsson, "CU-DU interface protocols", 3GPP TSG-RAN WG3 #95bis, Apr. 3-7, 2017, Tdoc R3-171164, 3 pages.

Catt, "TP for support of multi-connectivity for option 2 and option 3-1", 3GPP TSG RAN WG3 Meeting #Adhoc, Jan. 17-19, 2017, R3-170126, 2 pages.

Supplementary European Search Report dated Feb. 6, 2020 in connection with European Patent Application No. 18 79 3884, 7 pages.

"3rd Generation Partnership Project; Technical Specification Group Services and System Aspects; Vocabulary for 3GPP Specifications (Release 16)", 3GPP TR 21.905 V16.0.0 (Jun. 2019), 65 pages.

"3rd Generation Partnership Project; Technical Specification Group Radio Access Network; Evolved Universal Terrestrial Radio Access (E-UTRA) and NR; Study on RAN-centric data collection and utilization for LTE and NR (Release 16)", 3GPP TR 37.816 V0.4.0 (May 2019), 35 pages.

"3rd Generation Partnership Project; Technical Specification Group Radio Access Network; Study on New Radio Access Technology; Radio Access Architecture and Interfaces (Release 14)", 3GPP TR 38.801 V1.2.0 (Feb. 2017), 90 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 v15.7.0 (Sep. 2019), 962 pages.

"3rd Generation Partnership Project; Technical Specification Group Radio Access Network; Evolved Universal Terrestrial Radio Access Network (E-UTRAN); X2 application protocol (X2AP)(Release 15)", 3GPP TS 36.423 V15.1.0 (Mar. 2018), 354 pages.

"3rd Generation Partnership Project; Technical Specification Group Radio Access Network; NR; User Equipment (UE) radio transmission and reception; Part 1: Range 1 Standalone (Release 15)", 3GPP TS 38.101-1 V15.4.0 (Dec. 2018), 230 pages.

"3rd Generation Partnership Project; Technical Specification Group Radio Access Network; NR; Base Station (BS) radio transmission and reception (Release 15)", 3GPP TS 38.104 V15.4.0 (Dec. 2018), 208 pages.

"3rd Generation Partnership Project; Technical Specification Group Radio Access Network; NR; NR and NG-RAN Overall Description; Stage 2 (Release 15)", 3GPP TS 38.300 V15.7.0 (Sep. 2019), 99 pages.

"3rd Generation Partnership Project; Technical Specification Group Radio Access Network; NR; Medium Access Control (MAC) protocol specification (Release 15)", 3GPP TS 38.321 V15.4.0 (Dec. 2018), 77 pages.

"3rd Generation Partnership Project; Technical Specification Group Radio Access Network; NR; Radio Resource Control (RRC) protocol specification (Release 15)", 3GPP TS 38.331 V15.7.0 (Sep. 2019), 527 pages.

"3rd Generation Partnership Project; Technical Specification Group Radio Access Network; NR-RAN; Architecture description (Release 15)", 3GPP TS 38.401 V15.4.0 (Dec. 2018), 40 pages.

"3rd Generation Partnership Project; Technical Specification Group Radio Access Network; NR-RAN; Xn application protocol (XnAP) (Release 15)", 3GPP TS 38.423 V15.5.0 (Sep. 2019), 311 pages.

"3rd Generation Partnership Project; Technical Specification Group Radio Access Network; NR-RAN; NR user plane protocol (Release 15)", 3GPP TS 38.425 V15.6.0 (Jul. 2019), 22 pages.

"3rd Generation Partnership Project; Technical Specification Group Radio Access Network; NR-RAN; F1 general aspects and principles (Release 15)", 3GPP TS 38.470 V15.6.0 (Jul. 2019), 13 pages.

"3rd Generation Partnership Project; Technical Specification Group Radio Access Network; NR-RAN; F1 application protocol (F1AP) (Release 15)", 3GPP TS 38.473 V15.7.0 (Sep. 2019), 221 pages.

Ericsson, "Further aspects of data duplication in PDCP layer", 3GPP TSG-RAN WG2 #97, Feb. 13-17, 2017, Tdoc R2-1700834, 3 pages.

Samsung, "Stage2 TP on UE Context modification", 3GPP TSG-RAN WG3 Meeting #97, Aug. 21-25, 2017, R3-173433, 2 pages.

Samsung et al., "Further discussions on PDCP duplication in high-layer split", 3GPP TSG-RAN WG3 Meeting #98, Nov. 27-Dec. 1, 2017, R3-174618, 4 pages.

Samsung, "Stage 3 TP for SUL information over Xn", 3GPP TSG-RAN WG3 NR AdHoc 1801, Jan. 22-26, 2018, R3-180607, 2 pages.

Samsung, "Supplementary uplink (SUL) information over F1", 3GPP TSG-RAN WG3 NR AdHoc 1801, Jan. 22-26, 2018, R3-180608, 31 pages.

Nokia et al., "Support for supplementary UL carrier", 3GPP TSG-RAN WG3 AdHoc, Jan. 22-26, 2018, R3-180624, 8 pages.

Samsung, "TP for NSA BL CR on PDCP duplication support", 3GPP TSG-RAN WG3 #99, Feb. 26-Mar. 2, 2018, 3GPP TSG-RAN WG3 #99, R3-181401, 4 pages.

Huawei, "Correction of packet duplication", 3GPP TSG-RAN3 Meeting #99, Feb. 26-Mar. 2, 2018, R3-181462, 2 pages.

Ran, "LS on optimisation of UE capability signaling", 3GPP TSG RAN WG3#99Bis, Apr. 16-20, 2018, R3-181617, 2 pages.

Samsung, "Discussion on supplementary uplink (SUL) addition and release for NSA", 3GPP TSG-RAN WG3 #99bis, Apr. 16-20, 2018, R3-181876, 3 pages.

Samsung, "CR for NSA on supplementary uplink (SUL) addition and release over F1", 3GPP TSG-RAN WG3 #99bis, Apr. 16-20, 2018, R3-181877, 21 pages.

Nokia et al., "Introduction of UL/SUL indication", 3GPP TSG-RAN WG3 Meeting #99bis, Apr. 16-20, 2018, R3-181883, 47 pages.

Ericsson, "XnAP—Rapporteur proposal for editorial and other changes", 3GPP TSG-RAN WG3 Meeting #99bis, Apr. 16-20, 2018, R3-182213, 3 pages.

Nokia et al., "Introduction of UL/SUL indication", 3GPP TSG-RAN WG3#99bis, Apr. 16-20, 2018, R3-182360, 46 pages.

Huawei, "(TP for NR BL CR for TS 38.473): on CA-based SRB duplication", 3GPP TSG-RAN WG3 meeting#99bis, Apr. 16-20, 2018, R3-182467, 14 pages.

Written Opinion of the International Searching Authority dated Aug. 17, 2018 in connection with International Patent Application No. PCT/KR2018/005237, 16 pages.

Samsung et al., "(TP for PDCP dup Assist Info CR for TS38.425) Further discussions on assistant information over F1", 3GPP TSG-RAN WG3 #100, May 21-25, 2018, R3-183013, 11 pages.

(56) References Cited

OTHER PUBLICATIONS

Huawei, "TP for TS38.463 on inactivity monitoring in CPUP separation", 3GPP TSG-RAN3 Meeting #100, Apr. 21-May 25, 2018, R3-183283, 5 pages.
CATT, "(TP for SA BL CR for TS 38.473): Support of PDCP Duplication for SRB", 3GPP TSG-RAN WG3#100, May 21-May 25, 2018, R3-183419, 15 pages.
Ericsson, "Radio quality information report activation", 3GPP TSG-RAN WG3 Meeting #100, May 21-25, 2018, R3-183578, 8 pages.
Nokia et al., "(TP for NR BL CR for TS 38.473) UL configuration in Initial UL RRC Message Transfer", 3GPP TSG-RAN WG3#101, Aug. 20-24, 2018, R3-185209, 53 pages.
IEEE Communications Magazine, vol. 54, No. 11, Nov. 2016, 228 pages, see pp. 17-23.
International Search Report dated Aug. 17, 2018 in connection with International Patent Application No. PCT/KR2018/005237, 5 pages.
Non-final Office Action dated Mar. 18, 2021 in connection with U.S. Appl. No. 16/611,212, 19 pages.
European Search Report dated Nov. 23, 2021, in connection with European Application No. 21181630.1, 6 pages.
Samsung, "On the procedures for SUL", 3GPP TSG-RAN WG2 Meeting #100, Nov. 27-Dec. 1, 2017, R2-1712836, 4 pages.
Huawei, "offline discussion report for SUL remaining issues", 3GPP TSG-RAN WG2 Meeting #100, Nov. 27-Dec. 1, 2017, R2-1714173, 5 pages.
Huawei, "UE initial access procedure for CP-UP separation", 3GPP TSG RAN WG3 meeting #97bis, Aug. 9-13, 2017, R3-173714, 5 pages.
Office Action dated Oct. 11, 2021 in connection with Chinese Patent Application No. 201810024386.8, 7 pages.
European Search Report dated Oct. 11, 2021 in connection with European Patent Application No. 21 18 1626, 12 pages.
Notice of Allowance dated Aug. 17, 2021 in connection with U.S. Appl. No. 16/611,212, 11 pages.
Non-Final Office Action dated Mar. 8, 2023, in connection with U.S. Appl. No. 17/561,424, 27 pages.
Office Action dated Feb. 15, 2023, in connection with Chinese Application No. 201810028304.7, 17 pages.
Huawei, et al., "Discussion on procedures for supporting SUL," R2-1713208, 3GPP TSG-RAN WG2 Meeting #100, Reno, USA, Nov. 27-Dec. 1, 2017, 5 pages.
Notice of Allowance dated Jan. 3, 2024, in connection with Chinese Application No. 201810028304.7, 7 pages.
Notice of Patent Grant dated Oct. 20, 2023, in connection with Korean Application No. 10-2019-7026542, 5 pages.
Notice of Preliminary Rejection dated Feb. 6, 2024, in connection with Korean Patent Application No. 10-2024-7000543, 10 pages.
The Second Office Action dated Mar. 12, 2024, in connection with Chinese Patent Application No. 202210615670.9, 13 pages.
Notice of registration procedures dated May 16, 2024, in connection with Chinese Application No. 202210615670.9, 6 pages.
Nokia Networks (Rapporteur), "Discussion on PDCP reordering after split bearer reconfiguration towards MCG bearer," R2-144179, Update of R2-143792, 3GPP TSG-RAN WG2 Meeting #87bis, Shanghai, China, Oct. 6-10, 2014, 16 pages.

* cited by examiner

[Fig. 1] PRIOR ART
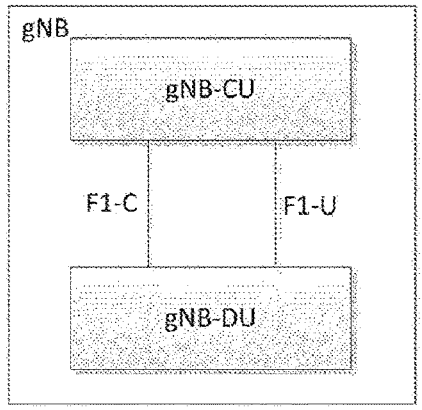
[Fig. 2] PRIOR ART
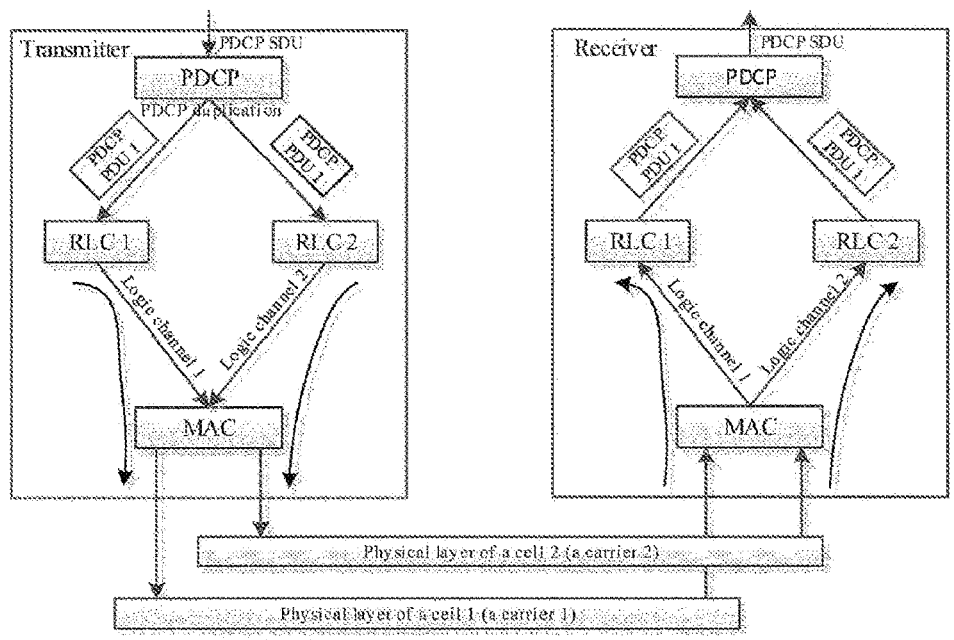
[Fig. 3] PRIOR ART
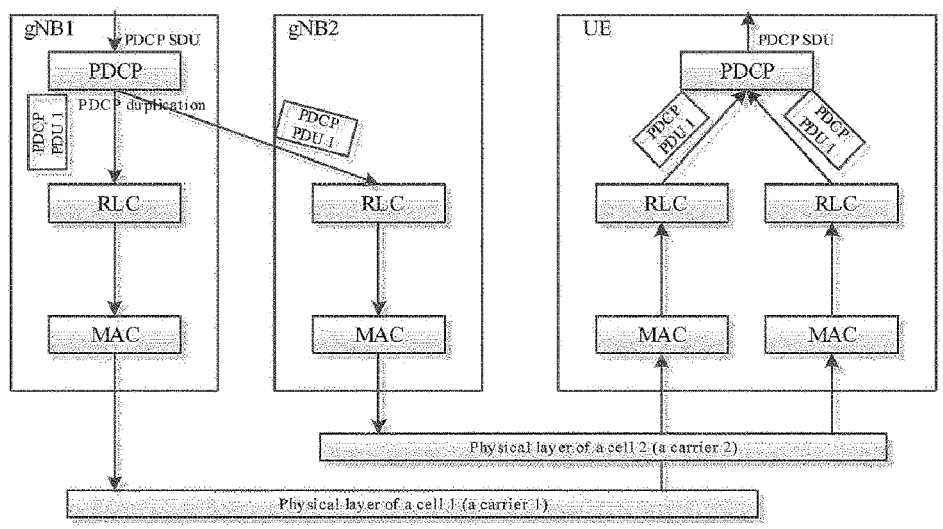

[Fig. 4a] PRIOR ART
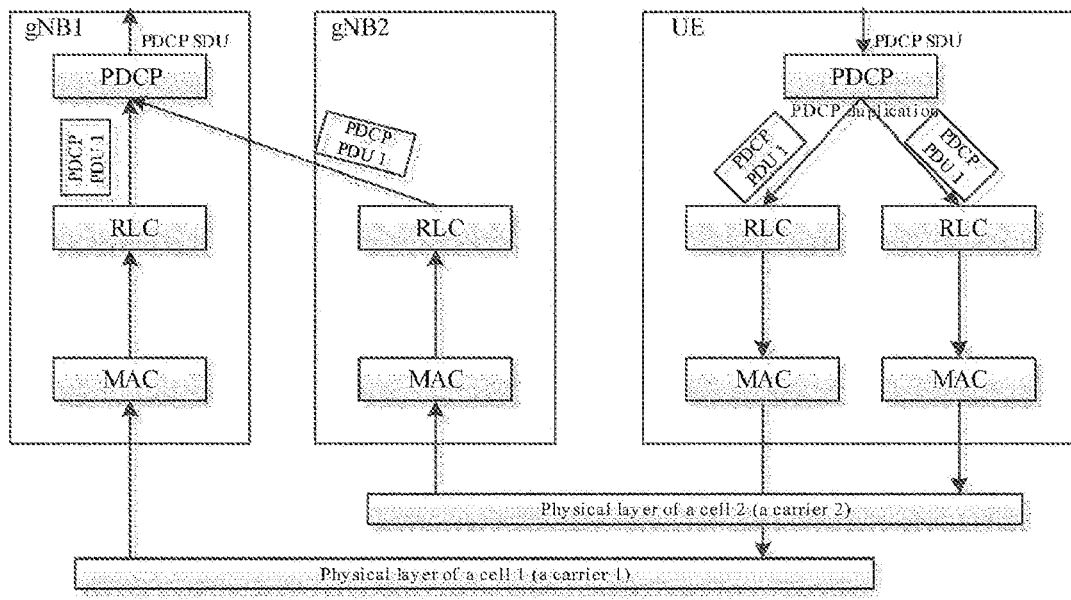
[Fig. 4b] PRIOR ART
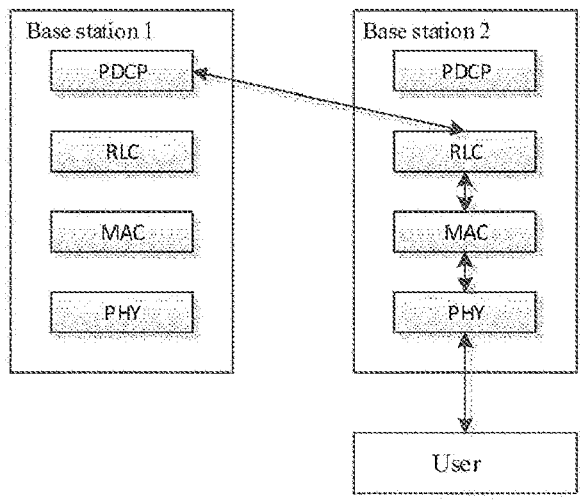
[Fig. 5]
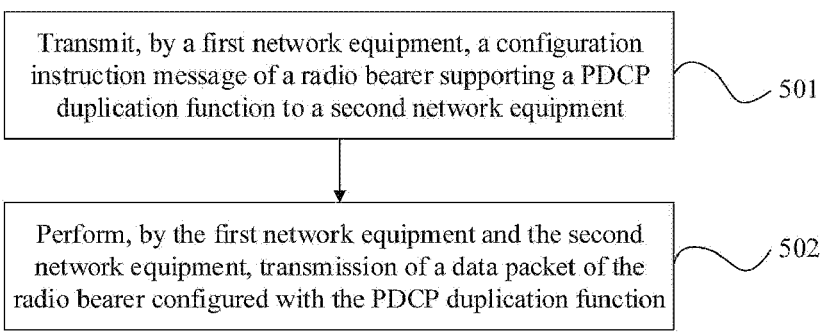

[Fig. 6] PRIOR ART
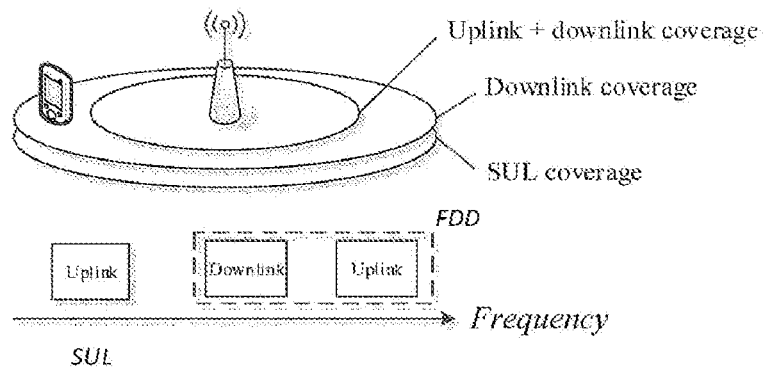
[Fig. 7] PRIOR ART
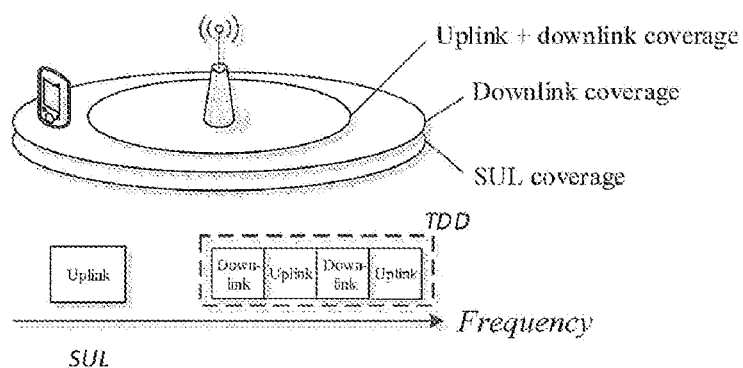
[Fig. 8]
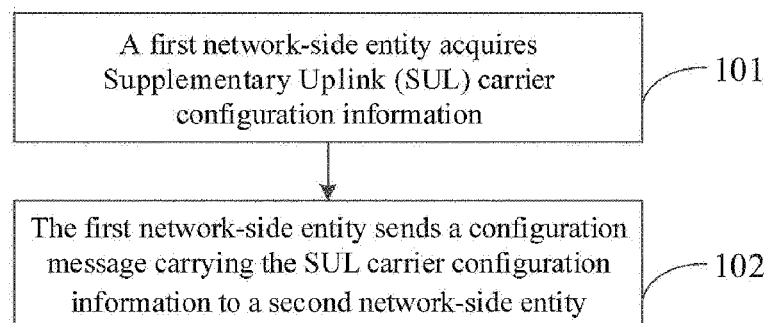

[Fig. 9]
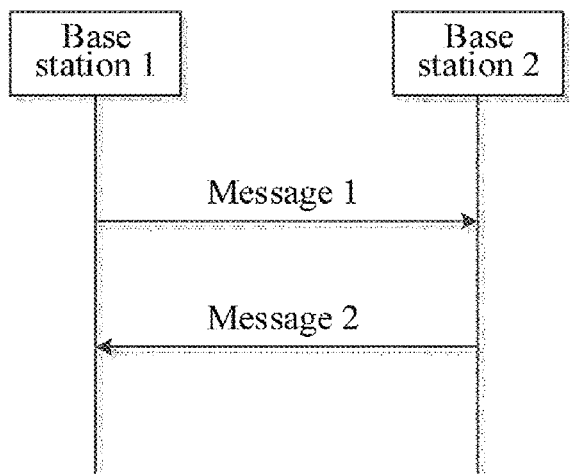
[Fig. 10]
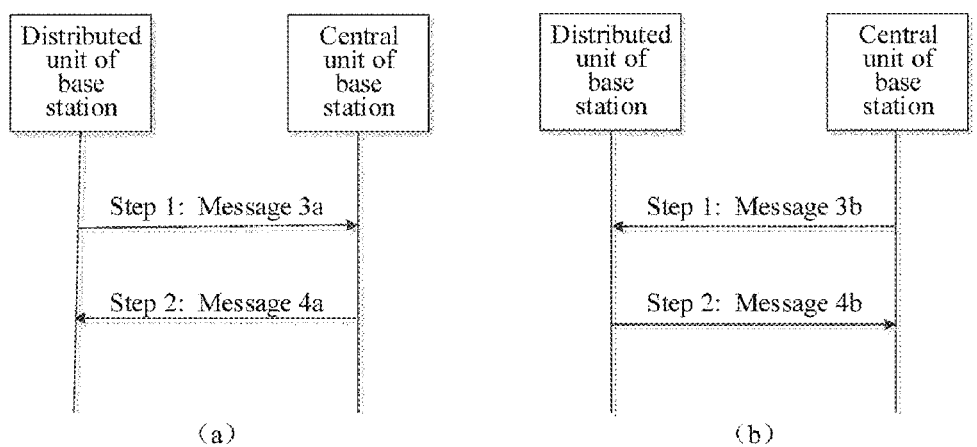

[Fig. 11]
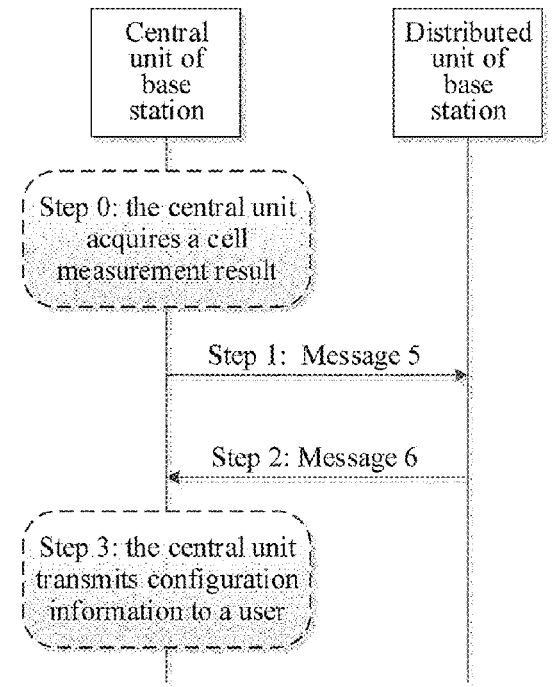
[Fig. 12]
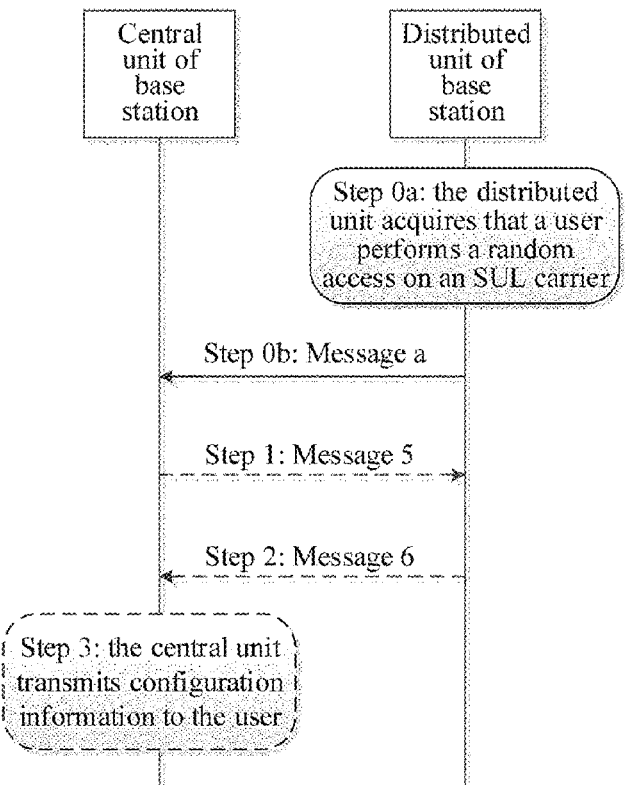

[Fig. 13]
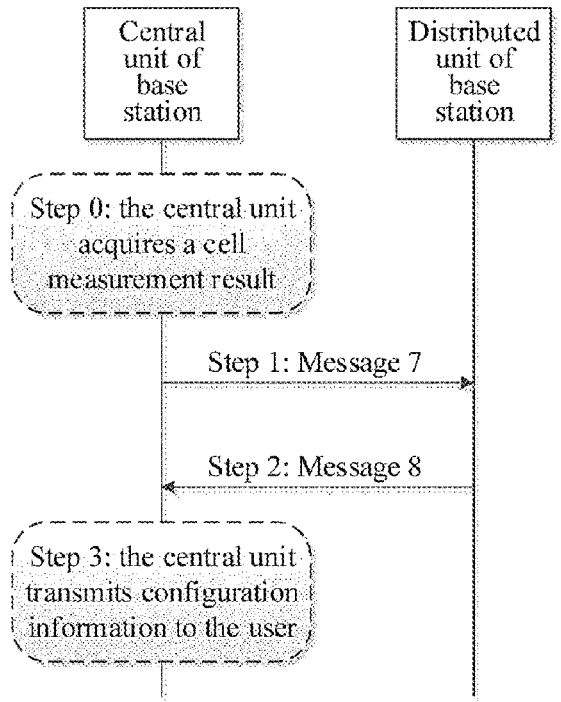
[Fig. 14]
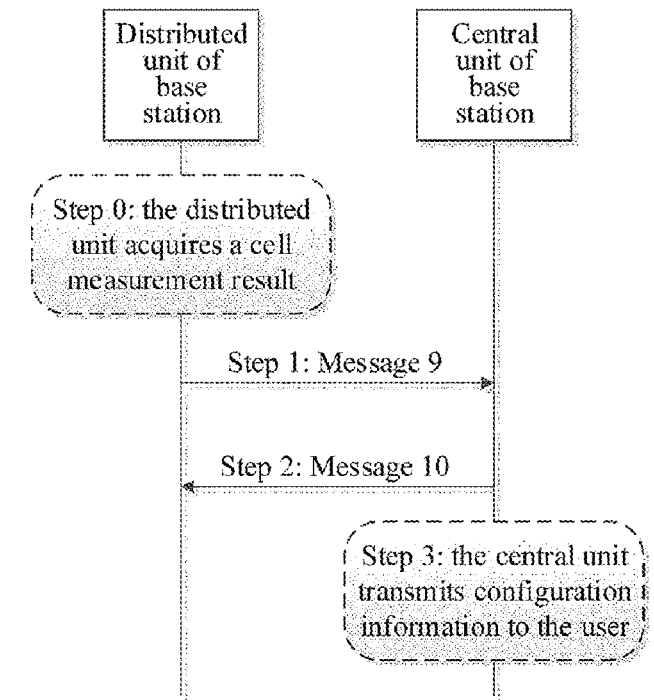

[Fig. 15]
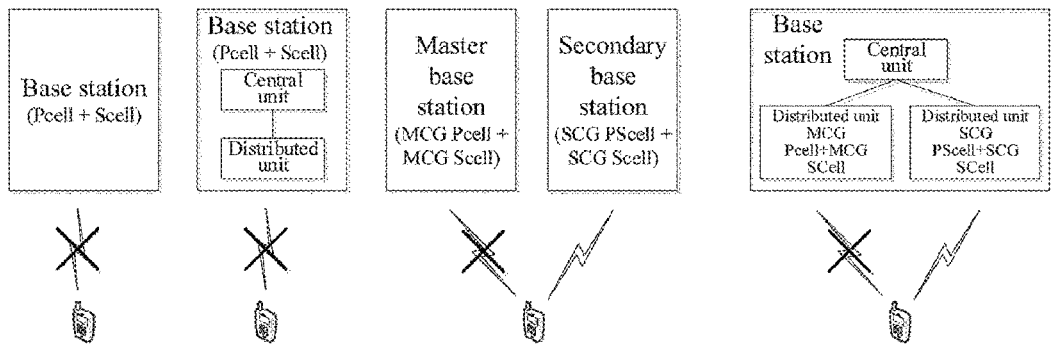
[Fig. 16]
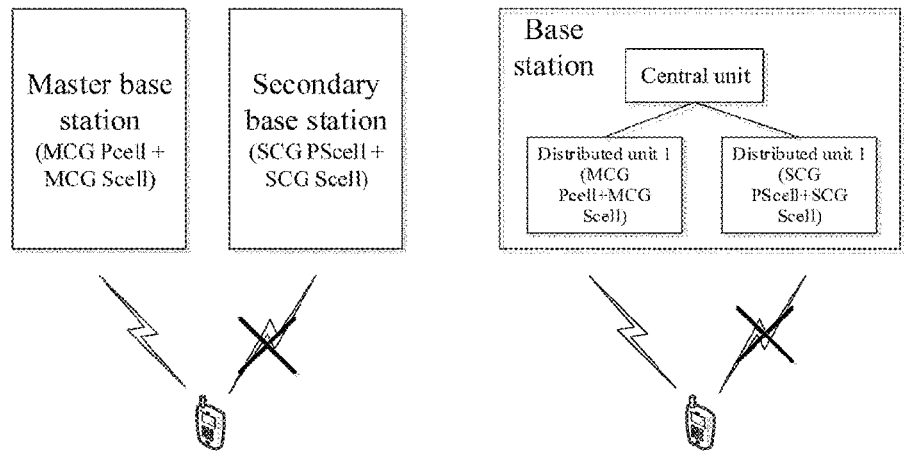
[Fig. 17]
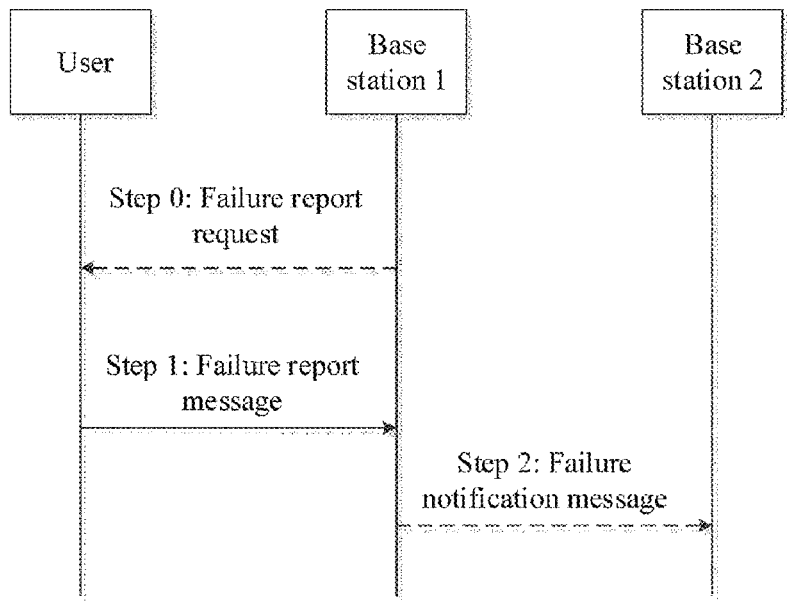

[Fig. 18]
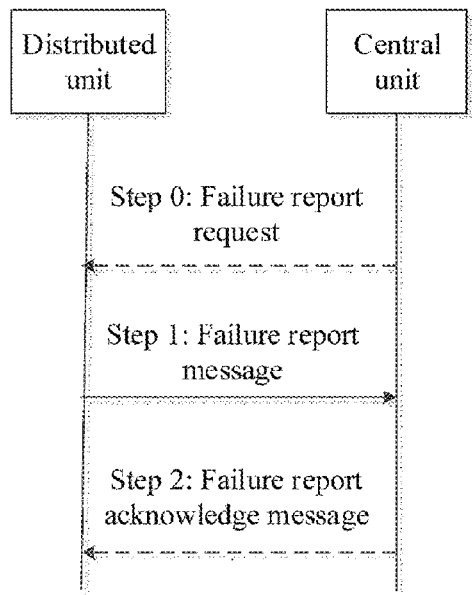
[Fig. 19]
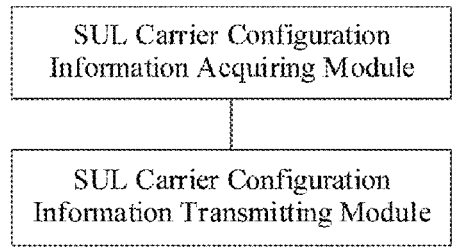
[Fig. 20]
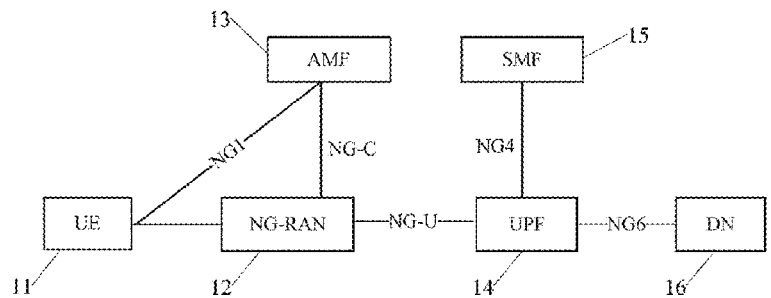

[Fig. 21]
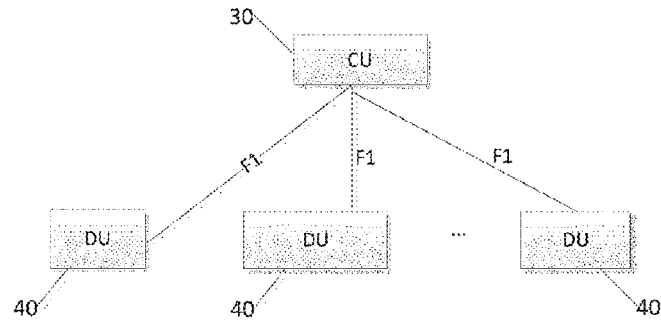
[Fig. 22A]
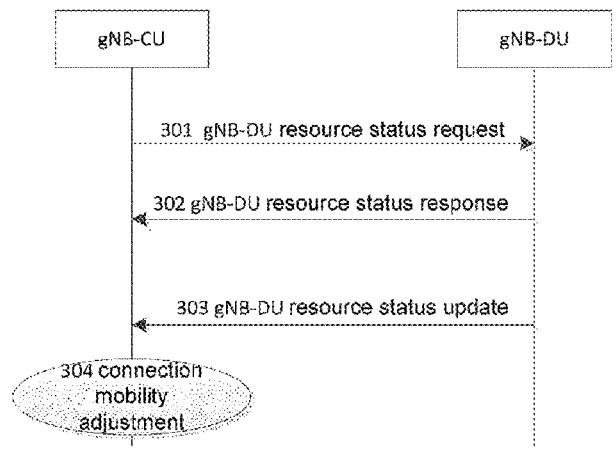
[Fig. 22B]
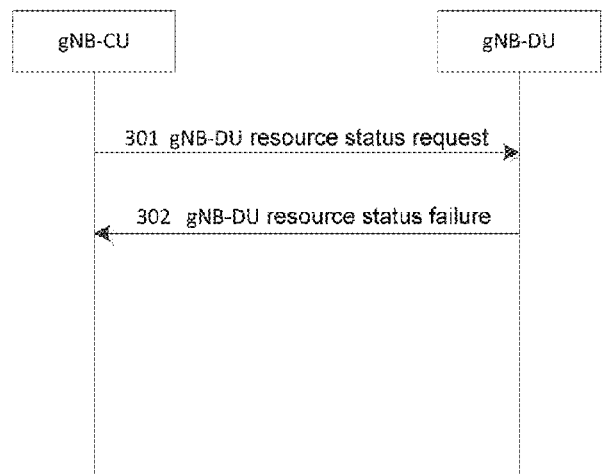

[Fig. 23A]
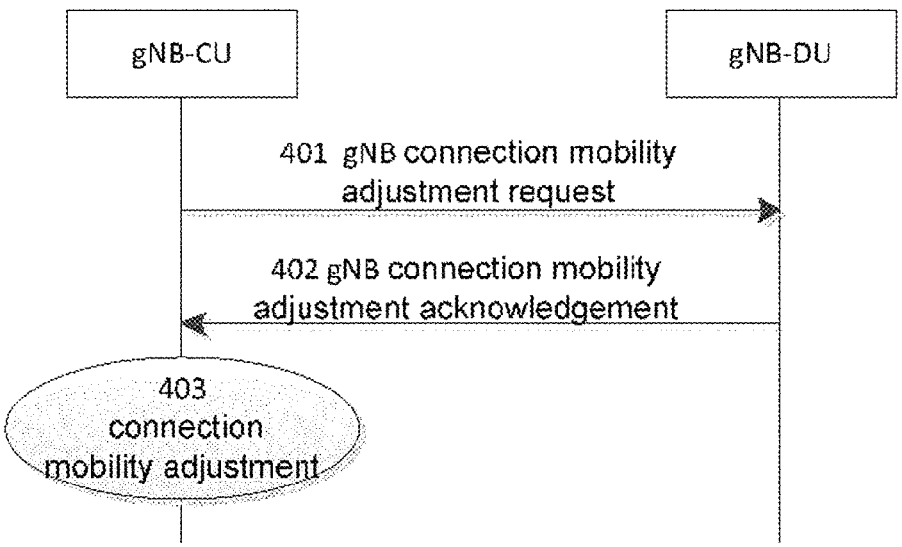
[Fig. 23B]
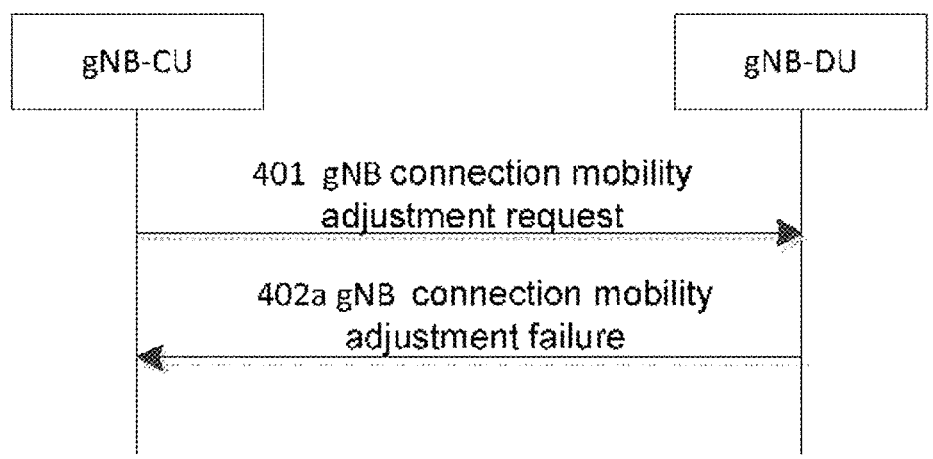

[Fig. 24A]
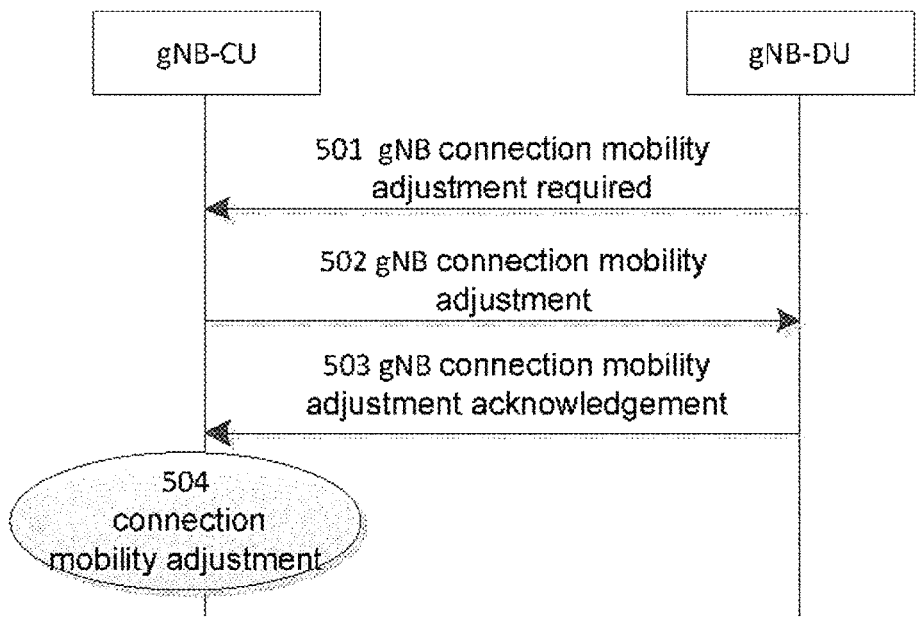
[Fig. 24B]
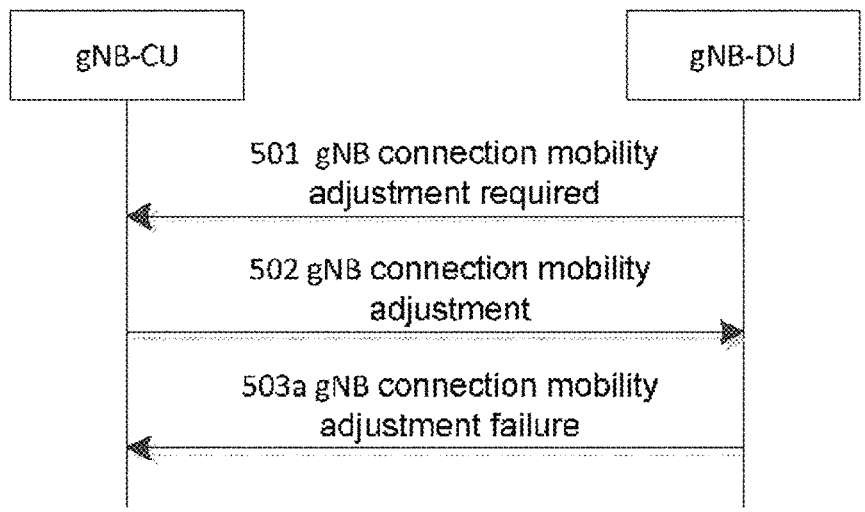

[Fig. 25A]
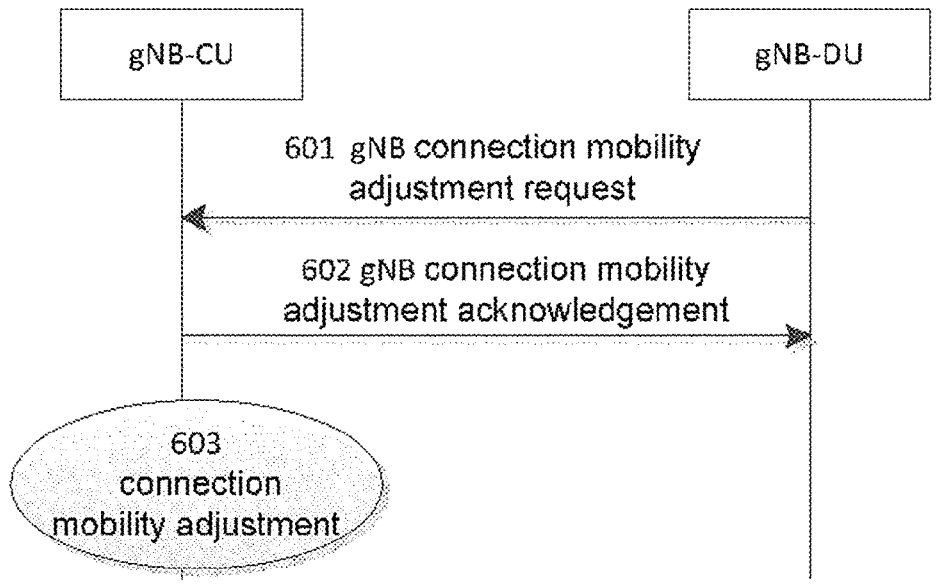
[Fig. 25B]
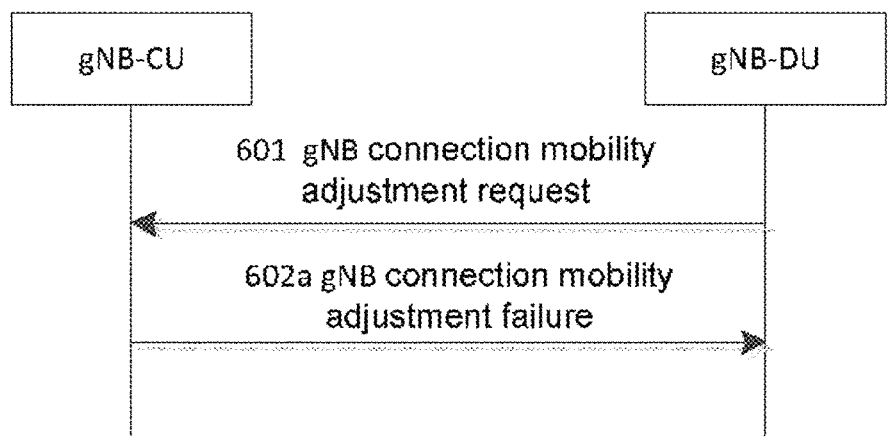

[Fig. 26A]
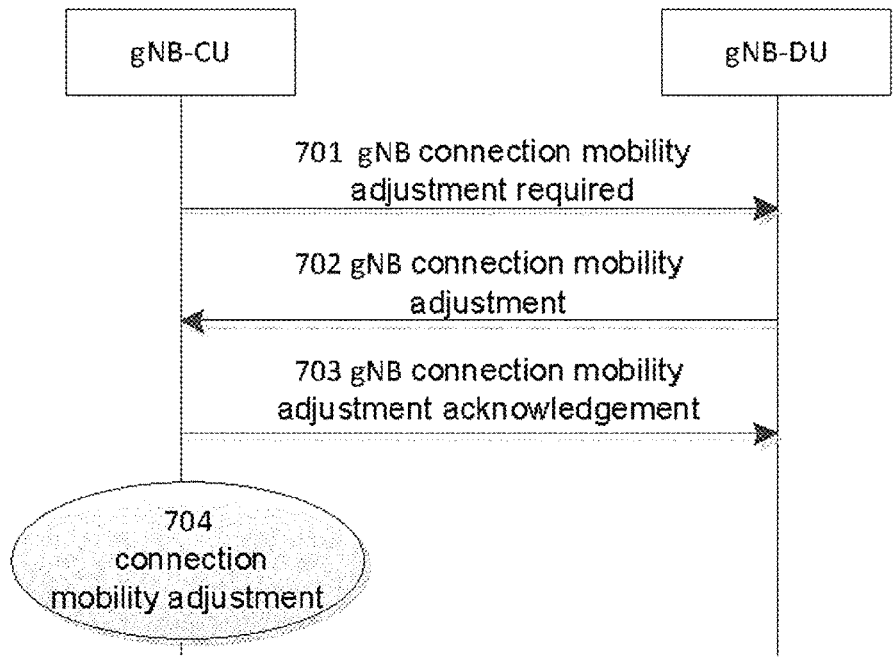
[Fig. 26B]
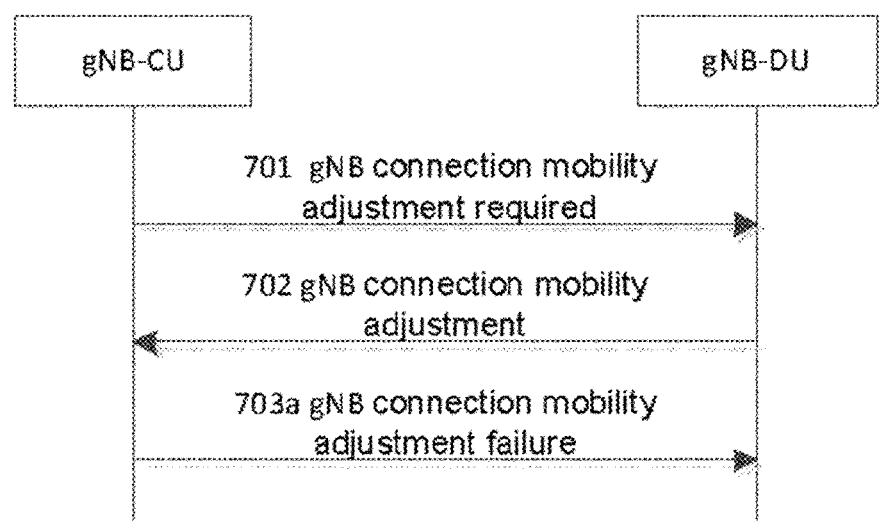

[Fig. 27]
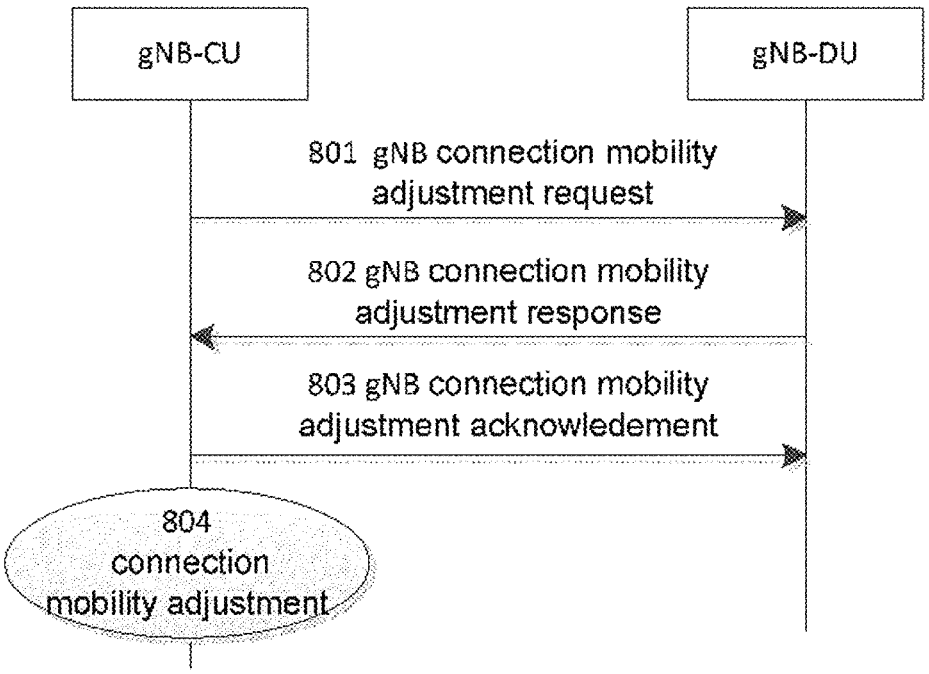
[Fig. 28]
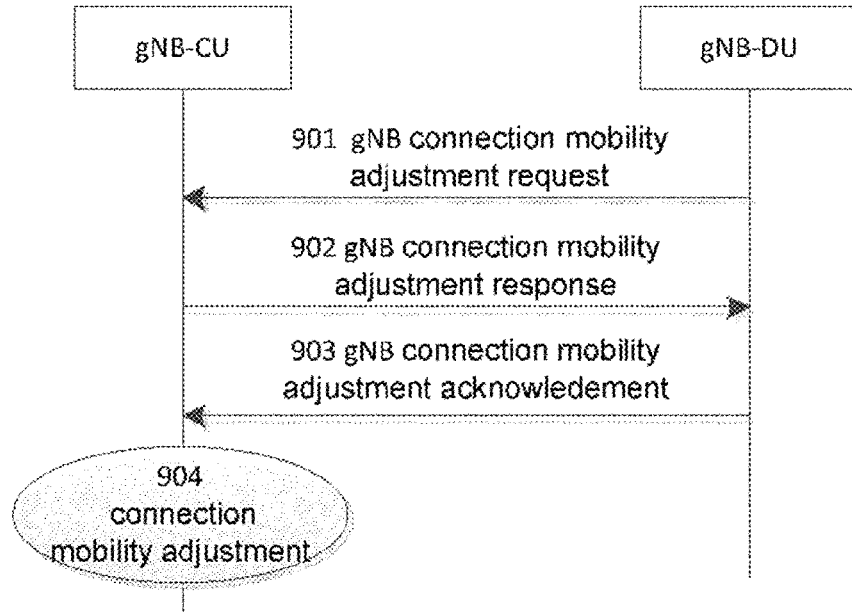

[Fig. 29]
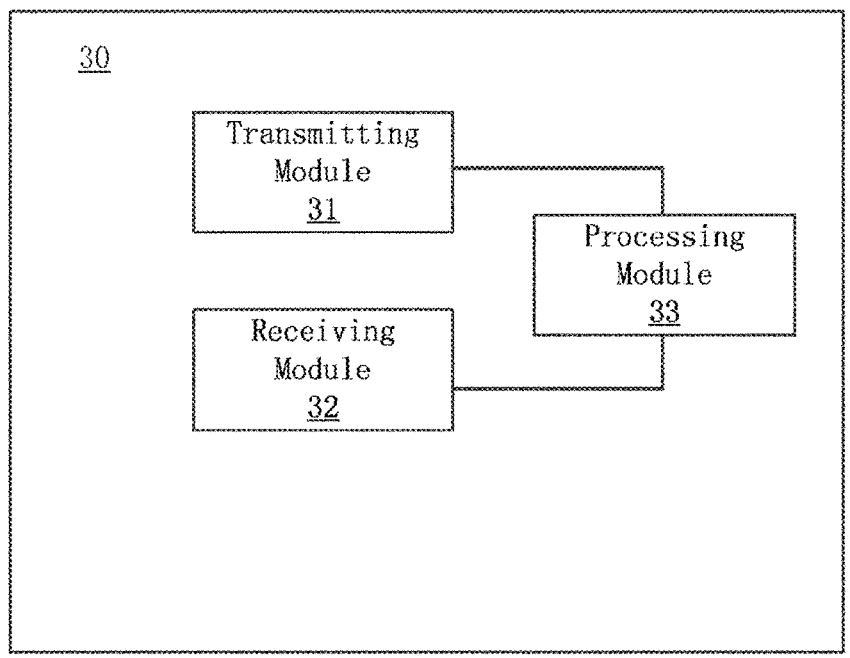
[Fig. 30]
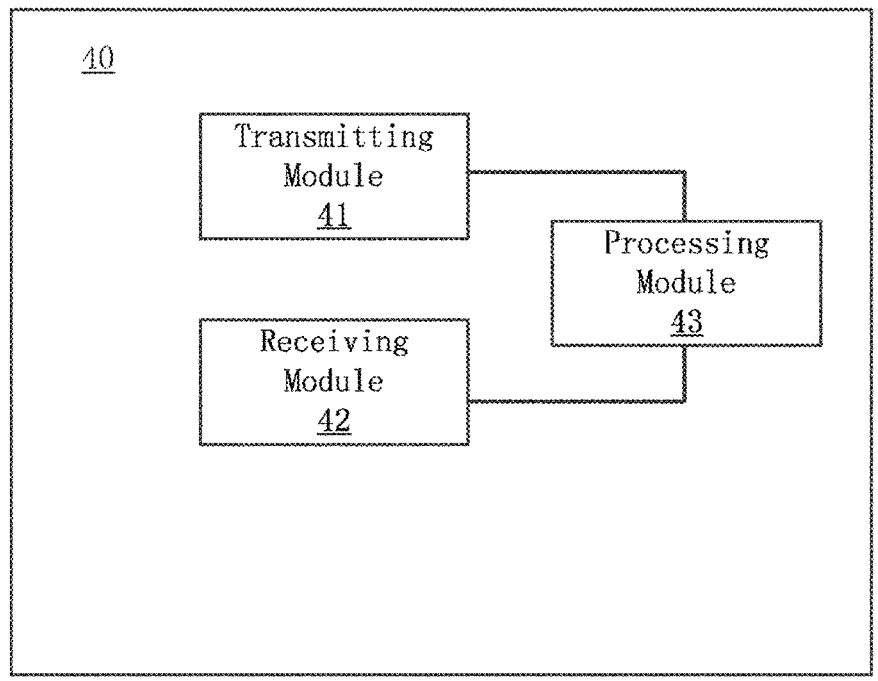

SYSTEM, DATA TRANSMISSION METHOD AND NETWORK EQUIPMENT SUPPORTING PDCP DUPLICATION FUNCTION METHOD AND DEVICE FOR TRANSFERRING SUPPLEMENTARY UPLINK CARRIER CONFIGURATION INFORMATION AND METHOD AND DEVICE FOR PERFORMING CONNECTION MOBILITY ADJUSTMENT

CROSS-REFERENCE TO RELATED APPLICATIONS

This application is a continuation of U.S. patent application Ser. No. 16/611,212 filed on Nov. 5, 2019, which is a 371 of International Application No. PCT/KR2018/005237 filed on May 4, 2018, which claims priority to Chinese Patent Application No. 201710316543.8 filed on May 5, 2017, Chinese Patent Application No. 201710461700.4 filed on Jun. 16, 2017, Chinese Patent Application No. 201810024386.8 filed on Jan. 10, 2018, and Chinese Patent Application No. 201810028304.7 filed on Jan. 11, 2018, the disclosures of which are herein incorporated by reference in their entirety.

BACKGROUND

1. Field

The present disclosure relates to the technical field of wireless communication, and in particular to a system, a data transmission method and a network equipment supporting a PDCP duplication function, a method and device for transferring supplementary uplink carrier configuration information and a method and a device for performing a connection mobility adjustment.

2. Description of Related Art

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a next-generation network or a 5G network, in order to support network function virtualization and to realize more efficient resource management and scheduling, a gNB providing a radio network interface for a UE can be further divided into a gNB Central Unit (gNB-CU) and a gNB Distributed Unit (gNB-DU). The gNB-CU has a Radio Resource Control (RRC) protocol layer, a Packet Data Convergence Protocol (PDCP) protocol layer, and optionally contains a Service Data Adaptation Protocol (SDAP) and the like. The gNB-DU has a Radio Link Control (RLC) protocol, a Medium Access Control (MAC) layer, a physical layer, and the like. There is a standardized public interface F1 between the gNB-CU and the gNB-DU. The F1 interface includes a control plane F1-C and a user plane F1-U. A transmission network layer of the F1-C is transmitted based on Internet Protocol (IP). To realize a more reliable transmission signaling, a Stream Control Transmission Protocol (SCTP) is additionally provided on the basis of the IP. The protocol for an application layer is F1AP. The SCTP can provide reliable message transmission in the application layer. A transport layer for the F1-U is UDP/IP, and the GTP-U on the UDP/IP is used for bearing Protocol Data Units (PDUs) of the user plane. FIG. 1 shows the structures of the gNB-CU and the gNB-DU. In addition, in a new generation network, in order to improve the reliability of data transmission or signaling transmission, the PDCP protocol layer will support a PDCP duplication function. This function is characterized in that each PDCP PDU of a radio bearer supporting this function will be transmitted to at least two Radio Link Control (RLC) entities, then transmitted to the MAC layer by two different logic channels or identical logic channels and transmitted by two different cells, respectively. The radio bearer can be a Data Radio Bearer (DRB) or a Signaling Radio Bearer (SRB). This function can be applied in a carrier aggregation scenario and a dual-connectivity scenario.

In a carrier aggregation scenario, FIG. 2 shows a schematic diagram in which a transmitting terminal and a receiving terminal are included. In the transmitting terminal, a PDCP Service Data Unit (SDU) (which may be a data packet from the DRB or a data packet from the SRB) is processed by the PDCP protocol layer (including a PDCP duplication function) to obtain two identical PDCP PDUs (e.g., PDCP PDU1); and the two identical PDCP PDUs will be transmitted to two different RLC entities (i.e., RLC 1 and RLC 2), respectively, and then transmitted to the MAC layer through two different logic channels (i.e., logic channel 1 and logic channel 2), respectively. In the MAC layer, the data packets from the two logic channels are transmitted by physical layers serving different cells (i.e., a cell 1 and a cell 2, where the two cells may employ different carriers or identical carriers). In the receiving terminal, data packets from different carriers are processed by the MAC layer and then transmitted to two different RLC entities (e.g., RLC1 and RLC2) through different logic channels, respectively; then, the RLC-processed data packets are transmitted to the PDCP layer; and the PDCP layer will process duplicated PDCP PDUs (e.g., discard one of duplicated PDCP PDUs) to eventually obtain the PDCP SDU. In FIG. 2, the examples of the transmitting terminal and the receiving terminal can be a gNB and a UE, or a UE and a gNB, or a UE and another UE, and the like.

In a dual-connectivity scenario, FIG. 3 shows a schematic diagram of downlink transmission (from a gNB to a UE). In the gNB, a PDCP SDU is processed by the PDCP protocol layer (containing a PDCP duplication function) to obtain two identical PDCP PDUs (e.g., PDCP PDU1). The two identical PDCP PDUs will be transmitted to two different RLC entities on two different gNBs (i.e., gNB 1 and gNB2), then transmitted to MAC layers corresponding to the RLC entities respectively and eventually transmitted to user equipments through physical layers of two different cells (i.e., a cell 1 and a cell 2, where the two cells may employ different carriers or identical carriers). On the user side, packets received by the two different cells will be transmitted to two different MAC entities and then transmitted to two different RLC entities; the data packets output from the two RLC entities will be transmitted to a same PDCP entity; and the PDCP entity will process duplicated PDCP PDUs (e.g., discard a duplicated PDCP PDU) to eventually obtain a PDCP SDU. Similarly, FIG. 4a shows a schematic diagram of uplink transmission (from a UE to a gNB).

In addition, in a next-generation network or a fifth-generation (5G) network, a UE may also accept services from two base stations (a primary base station and a secondary base station). The two base stations may be two base stations of a same type, for example, base stations in 4G (eNBs) or base stations in 5G (gNBs); or the two base stations may be base stations of different types, for example, an eNB and a gNB, or base stations of other types. In a case when the two base stations are serving an UE's radio bearer (e.g., a DRB or an SRB), the PDCP layer serving this radio bearer is located on one base station (e.g., a base station 1, which may be the primary base station or the secondary base station), and other protocol layers (e.g., an RLC layer, an MAC layer and a Physical Layer (PHY)) serving this radio bearer are located on the other base station (e.g., a base station 2, which may be the primary base station or the secondary base station, wherein the base station 2 is the secondary base station if the base station 1 is the primary base station; and, the base station 2 is the primary base station if the base station 1 is the secondary base station). Data of the radio bearer will be transmitted on an interface (e.g., an X2 interface or an Xn interface) between the two base stations, as shown in FIG. 4a.

In the description of the PDCP duplication function, the PDCP PDUs obtained after the PDCP duplication may belong to one radio bearer or multiple radio bearers. The radio bearer can be a DRB for transmitting data or an SRB for transmitting a signaling by a user. The radio bearers may belong to one user or multiple users. It is indicated that only the user is configured with a PDCP duplication function, if the radio bearers belong to one user; however, it is indicated that the multiple users are configured with a PDCP duplication function, if the radio bearers belong to multiple different users.

In the description of the PDCP duplication function, one PDCP PDU is transmitted for two times by two different RLC entities. For this function, it is also possible to transmit one PDCP PDU for multiple times by multiple different RLC entities. In the subsequent description of the present disclosure, transmitting one PDCP PDU for two times is taken as example. This also works in a situation where one PDCP PDU is transmitted for multiple times.

However, in a 5G system, a gNB may consist of two independent functional entities, i.e., a gNB-CU and a gNB-DU, and an interface between the gNB-CU and the gNB-DU is standardized F1. In the conventional LTE network, the gNB is one functional entity, and the interaction between all functions of this entity can be regarded as an internal implementation. However, in 5G, how to realize transmission of duplicated PDCP PDUs between the gNB-CU and the gNB-DU becomes a problem to be urgently solved at present, if one gNB consists of a gNB-CU and a gNB-DU.

In the New Radio access (NR) network or 5G network, in order to improve the uplink signal coverage, particularly at a high frequency, the concept of Supplementary Uplink (SUL) carrier is proposed. For a Frequency Division Duplexing (FDD) system, usually one User Equipment (UE) is configured with one downlink carrier (or frequency/band) and one uplink carrier (or frequency/band) (herein referred to as a non-SUL carrier). In order to improve the uplink coverage, the NR supports that the UE may be configured with another uplink carrier (or frequency/band), which is the SUL carrier. Thus, one UE may be configured with two uplink carriers (one non-SUL carrier and one SUL carrier) and one downlink carrier, which belong to a same cell, as shown in FIG. 6. For a Time Division Duplexing (TDD) system, usually one UE is configured with one carrier where the UE performs uplink and downlink communications in a time division manner. In order to improve the uplink coverage, the NR supports that the UE may be configured with another uplink carrier (or frequency/band), which is the SUL carrier. Thus, one UE may be configured with one SUL carrier and one TDD carrier (herein referred to as a non-SUL carrier), which belong to a same cell, as shown in FIG. 7.

When an SUL carrier is introduced into a cell, one UE may transmit data on two uplink carriers. However, under the control of the network, one UE will not simultaneously transmit data in physical uplink shared channels (PUSCH) on the two uplink carriers. When the UE initially accesses a cell that contains an SUL carrier, the UE may compare the measured downlink signal strength of the cell with a threshold, and if the downlink signal strength is lower than the threshold, the UE may perform a random access process on the SUL carrier to access the cell.

In order to support the SUL carrier, the NR system defines some configuration information related to the SUL carrier. A network side entity may determine whether to configure the UE with an SUL carrier according to the channel state of the UE, or whether to schedule the UE to transmit data on an SUL carrier. However, currently the system may neither exchange the SUL carrier configuration information between related network-side entities (e.g., between base stations, or between a central unit and a distributed unit of a base station), nor add/modify/release an SUL carrier for UE between the network-side entities. Thus, the network-side entities do not acquire respective cell configuration information and may not determine whether to configure the UE with a cell containing an SUL carrier, thereby triggering the network-side entities to perform SUL carrier configuration. In addition, when a radio link failure occurs in the UE, the network-side entities may not determine whether the failure is caused by using the SUL carrier, and then may not correct the SUL carrier parameter configuration for the failure caused by the SUL carrier, which affects the achievement of the purpose of introducing the SUL carrier to enhance the uplink coverage. For this reason, it is necessary to provide a method and device for transferring supplementary uplink carrier configuration information which may solve the above technical problem.

Modern mobile communications are increasingly tending to provide a higher mobile bandwidth, less latency, and a support for a large number of terminal services, which typically require supports for virtualizations of network functions and a more efficient resource management and scheduling. For this reason, a base station (gNB) of a next-generation mobile communication system, such as a 5G mobile communication system, is divided into a central unit (gNB-CU) and distributed unit(s) (gNB-DU(s)), instead of a base station (eNB) in a conventional LTE network which can be considered as a single functional entity. The connection mobility adjustment performed by the base station is no longer an internal implementation of a single functional entity due to the separation between the gNB-DU(s) and the gNB-CU, and thus the mechanism in the eNB is not applicable any more. Currently there is no specification on how to implement a connection mobility adjustment in a gNB.

Therefore, there is a need for a new mechanism for performing a connection mobility adjustment in a gNB.

SUMMARY

The present disclosure provides a system, a data transmission method and a network equipment supporting a PDCP duplication function in order to realize the transmission of duplicated data packets between a first network equipment and a second network equipment and to improve the reliability of data transmission; another objective of the present disclosure is to overcome the shortage of the prior art by providing a method and device for transferring supplementary uplink carrier configuration information, which may effectively enhance the uplink coverage of the NR system; another objective of the present disclosure is to provide a mechanism for performing a connection mobility parameter adjustment by the cooperation among the central unit and the distributed units of the base station.

A first network equipment is provided, including:
a transmitting subunit configured to transmit, to a second network equipment, a configuration instruction message of a radio bearer supporting a Packet Data Convergence Protocol (PDCP) duplication function; and
a processing subunit configured to perform, with the second network equipment, transmission of a data packet of the radio bearer configured with the PDCP duplication function.

When the data packet of the radio bearer configured with the PDCP duplication function is downlink data,
the transmitting subunit is configured to transmit, by an interface between the first network equipment and the second network equipment, the data packet of the radio bearer configured with the PDCP duplication function.

When the first network equipment and the second network equipment activate the PDCP duplication function of the radio bearer supporting the PDCP duplication function, the transmitting subunit is specifically configured to transmit, by a tunnel on the interface between the first network equipment and the second network equipment, the data packet of the radio bearer configured with the PDCP duplication function to the second network equipment; or
the transmitting subunit is specifically configured to duplicate the data packet of the radio bearer configured with the PDCP duplication function to obtain two identical data packets of the radio bearer configured with the PDCP duplication function, and transmit, by a tunnel on the interface between the first network equipment and the second network equipment, the two identical data packets of the radio bearer configured with the PDCP duplication function, respectively; or, specifically configured to transmit, by a tunnel on the interface between the first network equipment and the second network equipment, the data packet of the radio bearer configured with the PDCP duplication function for two times; or the transmitting subunit is specifically configured to transmit, by two different tunnels on the interface between the first network equipment and the second network equipment, the data packet of the radio bearer configured with the PDCP duplication function to the second network equipment for two times; or
the transmitting subunit is specifically configured to transmit, by a control plane message on the interface between the first network equipment and the second network equipment, two identical data packets of the radio bearer configured with the PDCP duplication function to the second network equipment.

When the first network equipment does not activate the PDCP duplication function of the radio bearer supporting the PDCP duplication function, the transmitting subunit is specifically configured to transmit, via the interface between the first network equipment and the second network equipment, the data packet of the radio bearer configured with the PDCP duplication function to the second network equipment so that the second network equipment transmits, successively via a specified or self-selected RLC entity and a corresponding logic channel thereof, an MAC layer and a cell, the data packet to a user terminal.

When the transmitting subunit transmits the data packet of the radio bearer configured with the PDCP duplication function to the second network equipment, the transmission is realized by a tunnel on the interface between the first network equipment and the second network equipment or a control plane message on the interface between the first network equipment and the second network equipment; and when the transmitting subunit transmits the data packet of the radio bearer configured with the PDCP duplication function to the second network equipment, one tunnel on the interface between the first network equipment and the second network equipment includes a specified tunnel or a self-selected tunnel.

When the data packet of the radio bearer configured with the PDCP duplication function is uplink data, the first network equipment further includes:
a receiving subunit configured to receive the data packet of the radio bearer configured with the PDCP duplication function transmitted by the second network equipment; and
the processing subunit is configured to process, by a PDCP layer, the received data packet of the radio bearer configured with the PDCP duplication function to obtain a PDCP Service Data Unit (SDU) of the radio bearer configured with the PDCP duplication function.

The configuration instruction message of the radio bearer supporting the PDCP duplication function transmitted to the second network equipment by the transmitting subunit includes at least one of the following information:
information indicating the support of the PDCP duplication function;
part or all of configuration information of at least one Radio Link Control protocol (RLC) entity corresponding to a data bearer;
identifier information and/or configuration information of a logic channel corresponding to at least one RLC entity;
configuration information of at least one tunnel on the interface between the first network equipment and the second network equipment;
information about a correspondence between at least one tunnel on the interface between the first network equipment and the second network equipment and at least one RLC entity; and indication information for identifying a duplicated data packet.

The first network equipment further includes:
a receiving subunit configured to receive a configuration response message returned by the second network equipment, wherein the configuration response message includes configuration information of at least one tunnel on the interface between the first network equipment and the second network equipment.

The configuration information of at least one tunnel on the interface between the first network equipment and the second network equipment contained in the configuration instruction message is specifically address information for receiving or transmitting, by the first network equipment, the data packet of the radio bearer supporting the PDCP duplication function; and, the configuration information of at least one tunnel on the interface between the first network equipment and the second network equipment contained in the configuration response message is specifically address information for receiving or transmitting, on the second network equipment side, the data packet of the radio bearer supporting the PDCP duplication function.

Preferably, the first network equipment is a first base station, and the second network equipment is a second base station; or
the first network equipment is a Central Unit (CU) in a base station, and the second network equipment is a Distributed Unit (DU) in the base station.

The present disclosure further provides a second network equipment, including:
a receiving subunit configured to receive a configuration instruction message of a radio bearer supporting a PDCP duplication function transmitted by a first network equipment; and
a processing subunit configured to perform, with the first network equipment, transmission of a data packet of the radio bearer configured with the PDCP duplication function.

When the data packet of the radio bearer configured with the PDCP duplication function is downlink data, the second network equipment further includes:
the receiving subunit configured to receive, by an interface between the second network equipment and the first network equipment, the data packet of the radio bearer configured with the PDCP duplication function; and
a transmitting subunit configured to transmit the data packet of the radio bearer configured with the PDCP duplication function to two different cells, respectively.

When the first network equipment and the second network equipment activate the PDCP duplication function of the radio bearer supporting the PDCP duplication function, the receiving subunit is configured to receive, by a tunnel on the interface between the second network equipment and the first network equipment, the data packet of the radio bearer configured with the PDCP duplication function transmitted by the first network equipment;
the processing subunit is specifically configured to duplicate the data packet of the radio bearer configured with the PDCP duplication function to obtain two identical data packets of the radio bearer configured with the PDCP duplication function; and
the transmitting subunit is specifically configured to transmit, by two different RLC entities and corresponding logic channels and via an MAC layer, the two identical data packets of the radio bearer configured with the PDCP duplication function to two different cells, respectively.

When the first network equipment and the second network equipment activate the PDCP duplication function of the radio bearer supporting the PDCP duplication function, the receiving subunit is configured to receive, by a tunnel on the interface between the second network equipment and the first network equipment, the data packet of the radio bearer configured with the PDCP duplication function transmitted by the first network equipment; and
the transmitting subunit is specifically configured to transmit, by two different RLC entities and corresponding logic channels and via an MAC layer, the data packet of the radio bearer configured with the PDCP duplication function to two different cells once, respectively.

When the first network equipment and the second network equipment activate the PDCP duplication function of the radio bearer supporting the PDCP duplication function, the receiving subunit is configured to receive, by one or two tunnels on the interface between the second network equipment and the first network equipment and for two times, two identical data packets of the radio bearer configured with the PDCP duplication function transmitted by the first network equipment; and the transmitting subunit is specifically configured to transmit, by two different RLC entities and corresponding logic channels and via an MAC layer, two identical data packets of the radio bearer configured with the PDCP duplication function to two different cells, respectively.

When the first network equipment and the second network equipment activate the PDCP duplication function of the radio bearer supporting the PDCP duplication function, the receiving subunit is configured to receive, by a control plane message on the interface between the second network equipment and the first network equipment and via receptions of two times, two identical data packets of the radio bearer configured with the PDCP duplication function transmitted by the first network equipment; and the transmitting subunit is specifically configured to transmit, by two different RLC entities and corresponding logic channels and via an MAC layer, two identical data packets of the radio bearer configured with the PDCP duplication function to two different cells, respectively.

When the first network equipment and the second network equipment do not activate the PDCP duplication function of the radio bearer supporting the PDCP duplication function, the receiving subunit is specifically configured to receive the data packet of the radio bearer configured with the PDCP duplication function transmitted by the first network equipment via the interface between the second network equipment and the first network equipment; and the transmitting subunit is specifically configured to transmit, successively via a specified or self-selected RLC entity and a corresponding logic channel thereof, an MAC layer and a cell, the data packet of the radio bearer configured with the PDCP duplication function to a user terminal.

When the data packet of the radio bearer configured with the PDCP duplication function is uplink data, the second network equipment further includes:
a transmitting subunit configured to transmit the data packet of the radio bearer configured with the PDCP duplication function to the first network equipment.

When the first network equipment and the second network equipment activate the PDCP duplication function of the radio bearer supporting the PDCP duplication function, the transmitting subunit is specifically configured to transmit, by one or two tunnels on the interface between the second network equipment and the first network equipment or a control plane message on the interface between the second network equipment and the first network equipment, two identical data packets of the radio bearer configured with the PDCP duplication function acquired from two different cells to the first network equipment, the two identical data packets being obtained via physical layers of the cells, MAC layers, two different logic channels and corresponding RLC entities thereof.

When the first network equipment and the second network equipment do not activate the PDCP duplication function of the radio bearer supporting the PDCP duplication function, the transmitting subunit is specifically configured to transmit, via the interface between the second network equipment and the first network equipment and to the first network equipment, the data packet of the radio bearer configured with the PDCP duplication function acquired from a cell, the data packet being obtained via a physical layer of the cell, an MAC layer, a logic channel and a corresponding RLC entity thereof.

The second network equipment transmits, by a tunnel on the interface between the second network equipment and the first network equipment or a control plane message on the interface between the second network equipment or the first network equipment and to the first network equipment, the data packet of the radio bearer configured with the PDCP duplication function acquired from a cell, the data packet being obtained via a physical layer of the cell, an MAC layer, a logic channel and a corresponding RLC entity thereof.

One tunnel on the interface between the second network equipment and the first network equipment includes a specified tunnel or a self-selected tunnel, and the RLC entity includes a specified RLC entity or a self-selected RLC entity.

The second network equipment further includes:
a transmitting subunit configured to transmit, to the first network equipment, a configuration response message carrying configuration information of at least one tunnel on the interface between the second network equipment and the first network equipment.

The configuration information of at least one tunnel on the interface between the second network equipment and the first network equipment contained in the configuration response message is specifically address information for receiving by the receiving subunit or transmitting by the transmitting subunit the data packet of the radio bearer configured with the PDCP duplication function.

Preferably, the first network equipment is a first base station, and the second network equipment is a second base station; or the first network equipment is a Central Unit (CU) in a base station, and the second network equipment is a Distributed Unit (DU) in the base station.

The present disclosure discloses a system supporting a Packet Data Convergence Protocol (PDCP) duplication function, including the first base station and the second base station or the CU and the DU in the base station described above; and the data of the radio bearer configured with the PDCP duplication function includes: a data packet of a data radio bearer configured with a PDCP duplication function and/or a data packet of a signaling radio bearer configured with a PDCP duplication function.

The present disclosure discloses a data transmission method supporting a PDCP duplication function, including the steps of:

transmitting, by a first network equipment and to a second network equipment, a configuration instruction message of a radio bearer supporting a PDCP duplication function; and performing, by the first network equipment and with the second network equipment, transmission of a data packet of the radio bearer configured with the PDCP duplication function.

Preferably, the first network equipment is a first base station, and the second network equipment is a second base station; or the first network equipment is a Central Unit (CU) in a base station, and the second network equipment is a Distributed Unit (DU) in the base station.

Compared with the prior art, the present disclosure has at least the following advantages: by an interface between a first network equipment and a second network equipment, the transmission of duplicated data packets between the first network equipment and the second network equipment is realized, and the reliability of data transmission is improved.

The present disclosure provides a method for transferring resource configuration information, including steps of:
acquiring, by a first network-side entity, Supplementary Uplink (SUL) carrier configuration information; and
sending, by the first network-side entity, a configuration message carrying the SUL carrier configuration information to a second network-side entity.

Preferably, the SUL carrier configuration information includes at least one of: SUL carrier configuration information of at least one first cell served by the first network-side entity;
SUL carrier configuration information of at least one first neighboring cell of a cell served by the first network-side entity;
SUL carrier configuration information of at least one second cell served by other base station;
SUL carrier configuration information of at least one second neighboring cell of a cell served by the other base station; and
SUL carrier configuration information of at least one first cell serving a User Equipment (UE), the first cell being served by the first network-side entity, and the UE being served by the first network-side entity.

Preferably, the configuration message further includes at least one of:
indication information related to an uplink carrier of a UE;
indication information related to a modification of an uplink carrier configuration of the UE;
indication information indicating to configure random access-related information on an SUL carrier for the UE;
indication information indicating to modify the random access-related information on the SUL carrier for the UE;
indication information indicating that the SUL carrier is supported by at least one first cell served by the first network-side entity;
indication information indicating that the SUL carrier is supported by at least one first neighboring cell of a cell served by the first network-side entity;
indication information indicating that the SUL carrier is supported by at least one second cell served by other base station; and
indication information indicating that the SUL carrier is supported by at least one second neighboring cell of a cell served by the other base station.

Preferably, before acquiring, by the first network-side entity, Supplementary Uplink (SUL) carrier configuration information, the method further includes:

receiving, by the first network-side entity, a request message sent by the second network-side entity for acquiring the SUL carrier configuration information, the request message carrying the SUL carrier configuration information acquired by the second network-side entity.

Preferably, the SUL carrier configuration information acquired by the second network-side entity includes at least one of:

SUL carrier configuration information of at least one first cell served by the second network-side entity;

SUL carrier configuration information of at least one first neighboring cell of a cell served by the second network-side entity;

SUL carrier configuration information of at least one second cell served by other base station; and SUL carrier configuration information of at least one second neighboring cell of a cell served by the other base station.

Preferably, the request message further carries at least one of:

indication information related to an uplink carrier of a UE;

indication information related to a modification of an uplink carrier configuration of the UE;

indication information indicating to configure random access-related information on an SUL carrier for the UE;

indication information indicating to modify the random access-related information on the SUL carrier for the UE;

indication information indicating that the SUL carrier is supported by at least one first cell served by the second network-side entity;

indication information indicating that the SUL carrier is supported by at least one first neighboring cell of a cell served by the second network-side entity;

indication information indicating that the SUL carrier is supported by at least one first cell served by other base station;

indication information indicating that the SUL carrier is supported by at least one second neighboring cell of a cell served by the other base station; and information related to a cell measurement result.

Preferably, after receiving, by the first network-side entity, a request message sent by the second network-side entity for acquiring the SUL carrier configuration information, the method further includes:

if the request message carries indication information related to an uplink carrier of a UE, the first network-side entity judges whether to transmit the SUL carrier configuration information to the second network-side entity according to the indication information related to the uplink carrier of the UE; and if so, performing the step of acquiring, by the first network-side entity, Supplementary Uplink (SUL) carrier configuration information.

Preferably, the indication information related to the uplink carrier of the UE includes at least one of:

indication information indicating to configure a non-Supplementary Uplink (non-SUL) carrier for a UE;

indication information indicating to configure an SUL carrier for the UE; and indication information indicating to configure a non-SUL carrier and an SUL carrier for the UE.

Preferably, after sending, by the first network-side entity, the configuration message carrying the SUL carrier configuration information to the second network-side entity, the method further includes:

receiving, by the first network-side entity, an acknowledge message sent by the second network-side entity, the acknowledge message comprising at least one of:

SUL carrier configuration information of at least one first cell served by the second network-side entity;

SUL carrier configuration information of at least one first neighboring cell of a cell served by the second network-side entity;

SUL carrier configuration information of at least one second cell served by other base station;

SUL carrier configuration information of at least one second neighboring cell of a cell served by the other base station;

indication information indicating that an SUL carrier is supported by at least one first cell served by the second network-side entity;

indication information indicating that the SUL carrier is supported by at least one first neighboring cell of a cell served by the second network-side entity;

indication information indicating that the SUL carrier is supported by at least one second cell served by other base station; and indication information indicating that the SUL carrier is supported by at least one second neighboring cell of a cell served by the other base station.

Preferably, the SUL carrier configuration information includes at least one of:

identification information of a cell where an SUL carrier is located;

identification information of a base station locating the cell where the SUL carrier is located;

a carrier frequency of the SUL carrier;

a bandwidth of the SUL carrier;

an initial uplink bandwidth portion of the SUL carrier;

signal strength threshold information of the SUL carrier;

configuration information related to a random access on the SUL carrier;

configuration information of a Physical Uplink Control Channel (PUCCH) on the SUL carrier;

configuration information of a Physical Uplink Shared Channel (PUSCH) on the SUL carrier; and configuration information of a Sounding Reference Signal, SRS, on the SUL carrier.

Preferably, the first network-side entity includes a first base station, and the second network-side entity includes a second base station; or the first network-side entity includes a distributed unit of the first base station, and the second network-side entity includes a central unit of the first base station.

In order to achieve the above objective, the present disclosure further provides a network-side device, including:

an SUL carrier configuration information acquiring module configured to acquire SUL carrier configuration information; and an SUL carrier configuration information transmitting module configured to transmit a configuration message carrying the SUL carrier configuration information to a network-side entity.

In order to achieve the above objective, the present disclosure further provides a method for transferring configuration optimization information, including steps of:
acquiring, by a first network-side entity, link failure-related information of a User Equipment (UE); and
optimizing, by the first network-side entity, configuration parameters of the UE severed by the first network-side entity according to the link failure-related information.

Preferably, acquiring, by the first network-side entity, link failure-related information of the User Equipment (UE) includes:
receiving, by the first network-side entity, a message sent by the UE to acquire the link failure-related information of the UE; or
receiving, by the first network-side entity, the link failure-related information of the UE sent by a second network-side entity.

Preferably, the link failure-related information of the UE sent by the second network-side entity is sent from a third network-side entity to the second network-side entity; or, the link failure-related information of the UE is received by the third network-side entity from the UE, and then forwarded to the second network-side entity; or the link failure-related information of the UE is sent to the second network-side entity by the UE.

Preferably, the link failure-related information includes at least one of:
cause information of a link failure of the UE; and information related to a use of a Supplementary Uplink (SUL) carrier by the UE.

Preferably, the first network-side entity includes a base station, and a central unit of the base station or a distributed unit of the base station; the second network-side entity includes a base station, and a central unit of the base station or a distributed unit of the base station; the third network-side entity comprises a base station, and a central unit of the base station or a distributed unit of the base station.

In order to achieve the above objective, the present disclosure further provides a network-side device, including:
a link failure information acquiring module configured to acquire link failure-related information of a User Equipment (UE); and
an optimization module configured to optimize configuration parameters of the served UE according to the link failure-related information.

In order to achieve the above objective, the present disclosure further provides a method for transferring configuration optimization information, including steps of:
acquiring, by a User Equipment (UE) link failure-related information; and
transmitting, by the UE, the link failure-related information to a network-side entity.

Preferably, the link failure-related information includes at least one of:
cause information of a link failure of the UE;
information related to a use of a Supplementary Uplink (SUL) carrier by the UE.

In order to achieve the above objective, the present disclosure further provides a user equipment, including:
a link failure information acquiring module configured to acquire link failure-related information; and
a link failure information transmitting module configured to transmit the link failure-related information to a network-side entity.

As compared with the prior art, the technical effects of the present disclosure include, but are not limited to: by transferring and exchanging the SUL carrier configuration information between the network-side entities, the present disclosure helps a base station (or a central unit of a base station) acquires an SUL carrier configuration of other base station (or a distributed unit of a base station), so that a network-side entity may determine whether to configure a cell containing the SUL carrier for the UE, thereby fully utilizing the SUL carrier to expand the system uplink coverage According to the disclosure, a method performed in a central unit of a base station is provided. The method includes: transmitting a connection mobility adjustment request message to the distributed unit of the base station; and receiving a connection mobility adjustment acknowledgement message from the distributed unit of the base station.

According to the disclosure, a central unit of a base station is provided. The central unit includes: a transmitting module configured to transmit a connection mobility adjustment request message to the distributed unit of the base station; and a receiving module configured to receive a connection mobility adjustment acknowledgement message from the distributed unit of the base station.

According to the disclosure, a method performed in a distributed unit of a base station is provided, which including: receiving a connection mobility adjustment request message from a central unit of the base station; and transmitting, in response to the received connection mobility adjustment request message, a connection mobility adjustment acknowledgement message to the central unit of the base station.

According to the disclosure, a distributed unit of a base station is provided. The distributed unit includes: a receiving module configured to receive a connection mobility adjustment request message from a central unit of the base station; and a transmitting module configured to transmit, in response to the received connection mobility adjustment request message, a connection mobility adjustment acknowledgement message to the central unit of the base station.

BRIEF DESCRIPTION OF THE DRAWINGS

FIG. 1 is a schematic structure diagram of a gNB-CU and a gNB-DU in the prior art;
FIG. 2 is a schematic flowchart of PDCP duplication in a carrier aggregation scenario in the prior art;
FIG. 3 is a schematic flowchart of PDCP duplication in a downlink dual-connectivity scenario in the prior art;
FIG. 4a is a schematic flowchart of PDCP duplication in an uplink dual-connectivity scenario in the prior art;
FIG. 4b is a schematic flowchart of PDCP duplication in a two-base-station scenario in the prior art; and
FIG. 5 is a schematic flowchart of a data transmission method supporting a PDCP duplication function on the first network equipment side according to the present disclosure.
FIG. 6 is a schematic diagram of a supplementary uplink carrier in an FDD system;
FIG. 7 is a schematic diagram of a supplementary uplink carrier in a TDD system;
FIG. 8 is a flowchart of a supplemental uplink carrier configuration method according to the present disclosure;
FIG. 9 is a schematic diagram of exchanging SUL carrier configuration information between two base stations according to Embodiment of the present disclosure;

FIG. 10 is a schematic diagram of exchanging SUL carrier configuration information between a central unit and a distributed unit of a base station according to Embodiment of the present disclosure;

FIG. 11 is a schematic diagram of an addition/modification/release of an SUL carrier decided by a central unit of a base station according to Embodiment of the present disclosure;

FIG. 12 is a schematic diagram of a selection of an SUL carrier by a UE for a random access according to Embodiment of the present disclosure;

FIG. 13 is a schematic diagram of an addition/modification/release of an SUL carrier decided by a distributed unit of a base station (assisted by a central unit) according to Embodiment of the present disclosure;

FIG. 14 is a schematic diagram of an addition/modification/release of an SUL carrier decided by a distributed unit of a base station according to Embodiment of the present disclosure;

FIG. 15 is a schematic diagram of a radio link failure mode of a UE according to Embodiment of the present disclosure;

FIG. 16 is a schematic diagram of another radio link failure mode of a UE according to Embodiment of the present disclosure;

FIG. 17 is a schematic diagram where a UE reports a link failure report to a network side according to Embodiment of the present disclosure;

FIG. 18 is a schematic diagram where a distributed unit of a base station reports a link failure report to a central unit according to Embodiment of the present disclosure; and FIG. 19 is a module block diagram of a network-side device for a supplemental uplink carrier configuration method according to the present disclosure.

FIG. 20 schematically shows a system architecture diagram of an example of a next generation mobile communication system;

FIG. 21 schematically shows a structural diagram of an example of a base station of a next generation mobile communication system;

FIGS. 22A and 22B schematically show a schematic diagram of a method for performing a connection mobility adjustment according to a first embodiment of the present disclosure;

FIGS. 23A and 23B schematically show a schematic diagram of a method for performing a connection mobility adjustment according to a second embodiment of the present disclosure;

FIGS. 24A and 24B schematically show a schematic diagram of a method for performing a connection mobility adjustment according to a third embodiment of the present disclosure;

FIGS. 25A and 25B schematically illustrate a schematic diagram of a method for performing a connection mobility adjustment according to a fourth embodiment of the present disclosure;

FIGS. 26A and 26B schematically illustrate a schematic diagram of a method for performing a connection mobility adjustment according to a fifth embodiment of the present disclosure;

FIG. 27 schematically illustrates a schematic diagram of a method for performing a connection mobility adjustment according to a sixth embodiment of the present disclosure;

FIG. 28 schematically illustrates a schematic diagram of a method for performing a connection mobility adjustment according to a second embodiment of the present disclosure;

FIG. 29 schematically shows a block diagram of a structural example of a central unit of a base station according to an embodiment of the present disclosure;

FIG. 30 schematically shows a block diagram of a structural example of a distributed unit of a base station according to an embodiment of the present disclosure.

DETAILED DESCRIPTION

The present disclosure provides a system, a data transmission method and a network equipment supporting a PDCP duplication function, a method and device for transferring supplementary uplink carrier configuration information, and a method and a device for performing a connection mobility adjustment. Specific implementations of the present disclosure will be described below in detail with reference to the accompanying drawings.

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present disclosure belongs. It should be further understood that terms, such as those defined in commonly used dictionaries, should be interpreted as having a meaning that is consistent with their meanings in the context of the prior art and will not be interpreted in an idealized or overly formal meaning unless expressly so defined herein.

It may be understood by those skilled in the art that the "terminal" and "user equipment" used herein include not only the radio signal receiver device which only has a radio signal receiver without any transmitting capability, but also the receiving and transmitting hardware device which is capable of reception and transmission in a two-way communication over a two-way communication link. Those devices may include a cellular or other communication device with a single-line display or a multi-line display or without any multi-line display; a Personal Communications Service (PCS) capable of combining voice, data processing, fax and/or data communication capabilities; a Personal Digital Assistant (PDA) which may include a radio receiver, a pager, an Internet/intranet access, a web browser, a notepad, calendar, and/or a Global Positioning System (GPS) receiver; a conventional laptop and/or a palmtop computer or other device having and/or including a radio frequency receiver. The "terminal" and "terminal device" used herein may be portable, transportable and mounted in a vehicle (aviation, marine, and/or land), or suitable and/or configured to run locally, and/or run at any other location on the earth and/or in the space in a distributed manner. The "terminal" and "terminal device" used herein may also be a communication terminal, an Internet terminal, a music/video playing terminal (e.g., PDA, Mobile Internet Device (MID)) and/or a mobile phone with a music/video playing function, a smart television, a set-top box, etc.

The base station involved in the present disclosure may be a base station of a NR system (gNB), a base station of an LTE system (eNB), or any other type of base station. An interface between base stations is an X2 interface or an Xn interface, or any other interface. In addition, one base station may include a central unit (CU) and a distributed unit (DU). The CU at least has a Radio Resource Control (RRC) layer and a Packet Data Convergence Protocol (PDCP) layer and the like, and may also include a Service Data Adaptation Protocol (SDAP) layer. The DU has a Radio Link Control (RLC) protocol layer, a Medium Access Control (MAC) layer, a physical layer, and the like. Between the CU and DU is a standardized public interface F1, or any other interface.

The name of any message mentioned in the present disclosure is just an example, and other name may also be used.

In the system supporting a PDCP duplication function provided by the present disclosure, a base station can be a gNB in a new generation network, including a gNB-CU and a gNB-DU; or, the base station can be a base station in other networks (e.g., an eNB in an LTE system). To facilitate understanding, the following embodiments 1 to 5 will be described by taking a base station supporting a PDCP duplication function as example, including a central unit and a distributed unit. In the Embodiments 1 to 5, a gNB-CU (a first network equipment) and a gNB-DU (a second network equipment) are taken as example; however, the central unit and the distributed unit included in the base station in other networks are also applicable to the present disclosure.

To facilitate understanding, the method for transmitting, between a central unit and a distributed unit, a data packet of a radio bearer supporting a PDCP duplication function in the present disclosure will be specifically described in the following embodiments of the present disclosure by using a PDCP PDU as the data packet. Of course, in an actual system, the format of the data packet is not limited thereto.

The PDCP duplication function mentioned in the present disclosure will be described by taking the data packet of the radio bearer supporting the PDCP duplication function being transmitted for two times as example. However, in an actual system, the data packet can be transmitted for multiple times. In this case, the data packet of the radio bearer can be transmitted within multiple cells by multiple RLC entities and corresponding channels thereof, and can be transmitted by one or more tunnels on an F1 interface. In the following embodiments 1 to 5 of the present disclosure, for convenience, the detail description will be given by taking the data packet being transmitted for two times as example.

In the present disclosure, a tunnel is used for transmitting data of a user plane.

The base station supporting a PDCP duplication function includes a Central Unit (CU) and a Distributed Unit (DU).

The CU is configured to:
transmit, to the DU, a configuration instruction message of a radio bearer supporting a PDCP duplication function, wherein the configuration instruction message of the radio bearer supporting the PDCP duplication function transmitted to the DU by the CU includes at least one of the following information:
information indicating the support of the PDCP duplication function;
part or all of configuration information of at least one RLC entity corresponding to a data bearer;
identifier information and/or configuration information of a logic channel corresponding to at least one RLC entity;
configuration information of at least one tunnel on the F1 interface;
information about a correspondence between at least one tunnel on the F1 interface and at least one RLC entity; and
indication information for identifying a duplicated data packet.

Further, the CU is further configured to receive a configuration response message returned by the DU, wherein the configuration response message includes configuration information of at least one tunnel on the F1 interface; and, the configuration message contains address information of the tunnel, which can be one or two pieces of address information.

The CU is further configured to perform, with the DU, transmission of a data packet of the radio bearer configured with the PDCP duplication function.

The DU is configured to: receive a configuration instruction message of a radio bearer supporting a PDCP duplication function transmitted by the CU; transmit, to the CU, a configuration response message carrying configuration information of at least one tunnel on an F1 interface, the configuration information containing address information of the tunnel, which can be one or two pieces of address information; and, perform, with the CU, transmission of a data packet of the radio bearer configured with the PDCP duplication function.

The configuration information of at least one tunnel on the F1 interface contained in the configuration instruction message of the radio bearer supporting the PDCP duplication function transmitted to the DU by the CU is specifically address information for receiving or transmitting, by the CU, the data packet of the radio bearer supporting the PDCP duplication function; and, the configuration information of at least one tunnel on the F1 interface contained in the received configuration response message returned by the DU is specifically address information for receiving or transmitting, on the DU side, the data packet of the radio bearer supporting the PDCP duplication function.

The data packet of the radio bearer configured with the PDCP duplication function includes: a data packet of a data radio bearer configured with a PDCP duplication function and/or a data packet of a signaling radio bearer configured with a PDCP duplication function.

The transmission of the data packet of the radio bearer configured with the PDCP duplication function between the CU and the DU will be specifically described for two situations, i.e., a situation where the data packet of the radio bearer configured with the PDCP duplication function is uplink data and a situation where the data packet of the radio bearer configured with the PDCP duplication function is downlink data.

When the data packet of the radio bearer configured with the PDCP duplication function is downlink data, the CU is configured to transmit, by an F1 interface between the CU and the DU, the data packet of the radio bearer configured with the PDCP duplication function; and the DU is configured to transmit the data packet of the radio bearer configured with the PDCP duplication function to two different cells, respectively.

When the CU and the DU activate the PDCP duplication function of the radio bearer supporting the PDCP duplication function, the CU is specifically configured to transmit, by a tunnel on the F1 interface, the data packet of the radio bearer configured with the PDCP duplication function to the DU; and the DU is specifically configured to duplicate the data packet of the radio bearer configured with the PDCP duplication function to obtain two identical data packets of the radio bearer configured with the PDCP duplication function, and transmit, by two different RLC entities and corresponding logic channels thereof and via an MAC layer, the two identical data packets of the radio bearer configured with the PDCP duplication function to two different cells, respectively. Or, the DU is specifically configured to transmit, by two different RLC entities and corresponding logic channels and via an MAC layer, the data packet of the radio bearer configured with the PDCP duplication function to two different cells once, respectively.

When the CU and the DU activate the PDCP duplication function of the radio bearer supporting the PDCP duplication function, the CU is specifically configured to duplicate the data packet of the radio bearer configured with the PDCP duplication function to obtain two identical data packets of the radio bearer configured with the PDCP duplication function, and transmit, by a tunnel on the F1 interface, the two identical data packets of the radio bearer configured with the PDCP duplication function to the DU, respectively; or, specifically configured to transmit, by a tunnel on the F1 interface, the data packet of the radio bearer configured with the PDCP duplication function to the DU for two times; and the DU is specifically configured to transmit, by two different RLC entities and corresponding logic channels and via an MAC layer, two identical data packets of the radio bearer configured with the PDCP duplication function to two different cells, respectively.

When the CU and the DU activate the PDCP duplication function of the radio bearer configured with the PDCP duplication function, the CU is specifically configured to transmit, by two different tunnels on the F1 interface, two identical data packets of the radio bearer configured with the PDCP duplication function to the DU, respectively; or, transmit, by a control plane message on the F1 interface, two identical data packets of the radio bearer configured with the PDCP duplication function to the DU, respectively.

When the CU and the DU do not activate the PDCP duplication function of the radio bearer supporting the PDCP duplication function, the CU is specifically configured to transmit, via the F1 interface, the data packet of the radio bearer configured with the PDCP duplication function to the DU so that the DU transmits, successively via a specified or self-selected RLC entity and a corresponding logic channel thereof, an MAC layer and a cell, the data packet to a user terminal; and the DU is specifically configured to receive the data packet of the radio bearer configured with the PDCP duplication function transmitted via the F1 interface by the CU, and transmit, successively via a specified or self-selected RLC entity and a corresponding logic channel thereof, an MAC layer and a cell, the data packet of the radio bearer configured with the PDCP duplication function to a user terminal.

When the CU transmits the data packet of the radio bearer configured with the PDCP duplication function to the user terminal, the transmission is realized by a tunnel on the F1 interface or a control plane message on the F1 interface; and when the CU transmits the data packet of the radio bearer configured with the PDCP duplication function to the user terminal, one tunnel on the F1 interface includes a specified tunnel or a self-selected tunnel.

When the data packet of the radio bearer configured with the PDCP duplication function is uplink data, the DU is configured to transmit the data packet of the radio bearer configured with the PDCP duplication function to the CU; and the CU is configured to process, by a PDCP layer, the received data packet of the radio bearer configured with the PDCP duplication function to obtain a PDCP SDU of the radio bearer configured with the PDCP duplication function.

When the CU and the DU activate the PDCP duplication function of the radio bearer supporting the PDCP duplication function, the DU is specifically configured to transmit, by one or two tunnels on the F1 interface or a control plane message on the F1 interface and to the CU, two identical data packets of the radio bearer configured with the PDCP duplication function acquired from two different cells, wherein the two identical data packets are obtained via physical layers of the cells, MAC layers, two different logic channels and corresponding RLC entities thereof.

When the CU and the DU do not activate the PDCP duplication function of the radio bearer supporting the PDCP duplication function, the DU is specifically configured to transmit, via the F1 interface and to the CU, a data packet of the radio bearer configured with the PDCP duplication function acquired from a cell, wherein the data packet is obtained via a physical layer of the cell, an MAC layer, a logic channel and a corresponding RLC entity thereof; and the CU is specifically configured to process, by a PDCP layer, the received data packet of the radio bearer configured with the PDCP duplication function to obtain a data packet of the radio bearer configured with the PDCP duplication function.

The DU transmits, by a tunnel on the F1 interface or a control plane message on the F1 interface and to the CU, the data packet of the radio bearer configured with the PDCP duplication function acquired from a cell, wherein the data packet is obtained via a physical layer of the cell, an MAC layer, a logic channel and a corresponding RLC entity thereof.

One tunnel on the F1 interface includes a specified tunnel or a self-selected tunnel, and the RLC entity includes a specified RLC entity or a self-selected RLC entity.

The data packet of the radio bearer configured with the PDCP duplication function includes: a data packet of a Data Radio Bearer (DRB) configured with a PDCP duplication function and/or a data packet of a Signaling Radio Bearer (SRB) configured with a PDCP duplication function.

Based on the base station including a CU and a DU provided by the present disclosure, the CU and the DU will be described below by dividing them into functional modules.

A Central Unit (CU) is provided, including:
    a transmitting subunit configured to transmit, to a distributed unit (DU), a configuration instruction message of a radio bearer supporting a PDCP duplication function; and
    a processing subunit configured to perform, with the DU, transmission of a data packet of the radio bearer configured with the PDCP duplication function.

When the data packet of the radio bearer configured with the PDCP duplication function is downlink data, the transmitting subunit is configured to transmit, by an F1 interface between the CU and the DU, the data packet of the radio bearer configured with the PDCP duplication function.

When the CU and the DU activate the PDCP duplication function of the radio bearer supporting the PDCP duplication function, the transmitting subunit is specifically configured to transmit, by a tunnel on the F1 interface, the data packet of the radio bearer configured with the PDCP duplication function to the DU; or the transmitting subunit is specifically configured to duplicate the data packet of the radio bearer configured with the PDCP duplication function to obtain two identical data packets of the radio bearer configured with the PDCP duplication function, and transmit, by a tunnel on the F1 interface, the two identical data packets of the radio bearer configured with the PDCP duplication function, respectively; or, specifically configured to transmit, by a tunnel on the F1 interface, the data packet of the radio bearer configured with the PDCP duplication function for two times; or the transmitting subunit is specifically configured to transmit, by two different tunnels on the F1 interface, the data packet of the radio bearer configured with the PDCP duplication function to the DU for two times; or the transmitting subunit is specifically configured to transmit, by a control plane message on the F1 interface, two identical data packets of the radio bearer configured with the PDCP duplication function to the DU.

When the CU does not activate the PDCP duplication function of the radio bearer supporting the PDCP duplication function, the transmitting subunit is specifically configured to transmit, via the F1 interface, the data packet of the radio bearer configured with the PDCP duplication function to the DU so that the DU transmits, successively by a specified or self-selected RLC entity and a corresponding logic channel thereof, an MAC layer and a cell, the data packet to a user terminal.

When the transmitting subunit transmits the data packet of the radio bearer configured with the PDCP duplication function to the DU, the transmission is realized by a tunnel on the F1 interface or a control plane message on the F1 interface; and when the transmitting subunit transmits the data packet of the radio bearer configured with the PDCP duplication function to the DU, one tunnel on the F1 interface includes a specified tunnel or a self-selected tunnel.

When the data packet of the radio bearer configured with the PDCP duplication function is uplink data, the CU further includes:
a receiving subunit configured to receive the data packet of the radio bearer configured with the PDCP duplication function transmitted by the DU; and
the processing subunit is configured to process, by a PDCP layer, the received data packet of the radio bearer configured with the PDCP duplication function to obtain a PDCP SDU of the radio bearer configured with the PDCP duplication function.

The configuration instruction message of the radio bearer supporting the PDCP duplication function transmitted to the DU by the transmitting subunit includes at least one of the following information:
information indicating the support of the PDCP duplication function;
part or all of configuration information of at least one RLC entity corresponding to a data bearer;
identifier information and/or configuration information of a logic channel corresponding to at least one RLC entity;
configuration information of at least one tunnel on the F1 interface;
information about a correspondence between at least one tunnel on the F1 interface and at least one RLC entity; and
indication information for identifying a duplicated data packet.

The CU further includes:
a receiving subunit configured to receive a configuration response message returned by the DU, wherein the configuration response message includes configuration information of at least one tunnel on the F1 interface.

The configuration information of at least one tunnel on the F1 interface contained in the configuration instruction message is specifically address information for receiving or transmitting, by the CU, the data packet of the radio bearer supporting the PDCP duplication function; and, the configuration information of at least one tunnel on the F1 interface contained in the configuration response message is specifically address information for receiving or transmitting, on the DU side, the data packet of the radio bearer supporting the PDCP duplication function.

The data packet of the radio bearer configured with the PDCP duplication function includes: a data packet of a data radio bearer configured with a PDCP duplication function and/or a data packet of a signaling radio bearer configured with a PDCP duplication function.

The present disclosure further provides a Distributed Unit (DU), including:
a receiving subunit configured to receive a configuration instruction message of a radio bearer supporting a PDCP duplication function transmitted by a central unit (CU); and
a processing subunit configured to perform, with the CU, transmission of a data packet of the radio bearer configured with the PDCP duplication function.

When the data packet of the radio bearer configured with the PDCP duplication function is downlink data, the DU further includes:
the receiving subunit configured to receive, by an F1 interface between the DU and the CU, the data packet of the radio bearer configured with the PDCP duplication function; and
a transmitting subunit configured to transmit the data packet of the radio bearer configured with the PDCP duplication function to two different cells, respectively.

When the CU and the DU activate the PDCP duplication function of the radio bearer supporting the PDCP duplication function, the receiving subunit is configured to receive, by a tunnel on the F1 interface, the data packet of the radio bearer configured with the PDCP duplication function transmitted by the CU; the processing subunit is specifically configured to duplicate the data packet of the radio bearer configured with the PDCP duplication function to obtain two identical data packets of the radio bearer configured with the PDCP duplication function; and the transmitting subunit is specifically configured to transmit, by two different RLC entities and corresponding logic channels thereof and via an MAC layer, the two identical data packets of the radio bearer configured with the PDCP duplication function to two different cells, respectively.

When the CU and the DU activate the PDCP duplication function of the radio bearer supporting the PDCP duplication function, the receiving subunit is configured to receive, by a tunnel on the F1 interface, the data packet of the radio bearer configured with the PDCP duplication function transmitted by the CU; and the transmitting subunit is specifically configured to transmit, by two different RLC entities and corresponding logic channels and via an MAC layer, the data packet of the radio bearer configured with the PDCP duplication function to two different cells once, respectively.

When the CU and the DU activate the PDCP duplication function of the radio bearer supporting the PDCP duplication function, the receiving subunit is configured to receive, by one or two tunnels on the F1 interface and via the receptions of two times, two identical data packets of the radio bearer configured with the PDCP duplication function transmitted by the CU; and the transmitting subunit is specifically configured to transmit, by two different RLC entities and corresponding logic channels thereof and via an MAC layer, two identical data packets of the radio bearer configured with the PDCP duplication function to two different cells, respectively.

When the CU and the DU activate the PDCP duplication function of the radio bearer supporting the PDCP duplication function, the receiving subunit is configured to receive, by a control plane message on the F1 interface and via the receptions of two times, two identical data packets of the radio bearer configured with the PDCP duplication function transmitted by the CU; and the transmitting subunit is specifically configured to transmit, by two different RLC entities and corresponding logic channels thereof and via an MAC layer, two identical data packets of the radio bearer configured with the PDCP duplication function to two different cells, respectively.

When the CU and the DU do not activate the PDCP duplication function of the radio bearer supporting the PDCP duplication function, the receiving subunit is specifically configured to receive the data packet of the radio bearer configured with the PDCP duplication function transmitted by the CU via the F1 interface; and the transmitting subunit is specifically configured to transmit, successively via a specified or self-selected RLC entity and a corresponding logic channel thereof, an MAC layer and a cell, the data packet of the radio bearer configured with the PDCP duplication function to a user terminal.

When the data packet of the radio bearer configured with the PDCP duplication function is uplink data, the DU further includes:

a transmitting subunit configured to transmit the data packet of the radio bearer configured with the PDCP duplication function to the CU.

When the CU and the DU activate the PDCP duplication function of the radio bearer supporting the PDCP duplication function, the transmitting subunit is specifically configured to transmit, by one or two tunnels on the F1 interface or a control plane message on the F1 interface, two identical data packets of the radio bearer configured with the PDCP duplication function acquired from two different cells to the CU, wherein the two identical data packets are obtained by physical layers of the cells, MAC layers, two different logic channels and corresponding RLC entities thereof.

When the CU and the DU do not activate the PDCP duplication function of the radio bearer supporting the PDCP duplication function, the transmitting subunit is specifically configured to transmit, via the F1 interface and to the CU, the data packet of the radio bearer configured with the PDCP duplication function acquired from a cell, wherein the data packet is obtained by a physical layer of the cell, an MAC layer, a logic channel and a corresponding RLC entity thereof.

The DU transmits, by a tunnel on the F1 interface or a control plane message on the F1 interface and to the CU, the data packet of the radio bearer configured with the PDCP duplication function acquired from a cell, wherein the data packet is obtained by a physical layer of the cell, an MAC layer, a logic channel and a corresponding RLC entity thereof.

One tunnel on the F1 interface includes a specified tunnel or a self-selected tunnel, and the RLC entity includes a specified RLC entity or a self-selected RLC entity.

The DU further includes:

a transmitting subunit configured to transmit, to the CU, a configuration response message carrying configuration information of at least one tunnel on the F1 interface.

The configuration information of at least one tunnel on the F1 interface contained in the configuration response message is specifically address information for receiving by the receiving subunit or transmitting by the transmitting subunit the data packet of the radio bearer configured with the PDCP duplication function.

The data packet of the radio bearer configured with the PDCP duplication function includes: a data packet of a data radio bearer configured with a PDCP duplication function and/or a data packet of a signaling radio bearer configured with a PDCP duplication function.

In the above embodiments, the transmission of a bearer supporting a PDCP duplication function on an F1 interface between a CU and a DU in a base station is mainly discussed; however, in an actual system, a bearer supporting a PDCP duplication function may also be transmitted on an interface (e.g., an X2 interface or an Xn interface) between two base stations (e.g., between an eNB and a gNB, between two eNBs, between two gNBs or the like). For the transmission of a bearer supporting a PDCP duplication function on an interface between two base stations, the processing procedure thereof is the same as the processing procedure of the transmission of a bearer supporting a PDCP duplication function on an F1 interface between a CU and a DU in a base station, and will not be specifically described here.

Based on this, the present disclosure further provides a data transmission method supporting a PDCP duplication function, as shown in FIG. 5, including the following steps.

Step 501: A first network equipment transmits, to a second network equipment, a configuration instruction message of a radio bearer supporting a PDCP duplication function.

Step 502: The first network equipment performs, with the second network equipment, transmission of a data packet of the radio bearer configured with the PDCP duplication function. The first network equipment is a first base station, and the second network equipment is a second base station; or, the first network equipment is a CU in a base station, and the second network equipment is a DU in the base station.

Based on the system and the data transmission method supporting a PDCP duplication function provided by the present disclosure, the following five embodiments will be specifically described below. Of course, in the five embodiments, the description is mainly given for a DU and a CU in a base station.

In the embodiment, the method includes the following steps.

Step A: A gNB-CU transmits, to a gNB-DU, a request message of configuring a data radio bearer supporting a PDCP duplication function, wherein, for each data radio bearer supporting the PDCP duplication function, the message at least contains one or more pieces of the following information:

1) Information indicating the support of the PDCP duplication function, wherein possible implementations are as follows:

way 1: indication information of supporting the PDCP duplication function, wherein the indication information indicates that the data radio bearer supports the PDCP duplication function;

way 2: type information of the data radio bearer, wherein the type information indicates that the data radio bearer is a data radio bearer supporting the PDCP duplication function; and way 3: identifier information of the data radio bearer, wherein one or more identifiers of the data radio bearer supporting the PDCP duplication function are predefined or preconfigured, and the data radio bearer supports the PDCP duplication function if the identifier of the data radio bearer indicates that the data radio bearer is a data radio bearer supporting the PDCP duplication function.

Further, the information indicating the support of the PDCP duplication function may further include indication information of uplink/downlink. The indication information indicates the support of the PDCP duplication function in uplink, or the support of the PDCP duplication function in downlink, or the support of the PDCP duplication function in both uplink and the downlink. If the indication information of uplink/downlink is not included, the information indicating the support of the PDCP duplication function may indicate the support of the PDCP duplication function in both uplink and downlink, the support of the PDCP duplication function in downlink, the support of the PDCP duplication function in uplink, or the support of the PDCP duplication function in a default direction (in uplink, in downlink or in both uplink and downlink).

2) Part or all of configuration information of at least one RLC entity corresponding to the data radio bearer. A data radio bearer supporting the PDCP duplication function will have two RLC entities. However, the configuration information may contain part or all of configuration information of one RLC entity, or part or all of configuration information of the two RLC entities. For example, in a situation where the configuration information contains configuration information of one RLC entity, it is indicated that the existing configuration information of the RLC entity of the data radio bearer can be reused and the contained configuration information of the RLC entity is specific to a newly added RLC entity. In a situation where the configuration information contains configuration information of two RLC entities, the newly received configuration information of the two RLC entities can cover the existing information, if the gNB-DU already has configuration information of at least one RLC entity of the data radio bearer; and, the gNB-DU directly uses the newly received configuration information of the two RLC entities, if the gNB-DU does not have any information of RLC entities corresponding to the data radio bearer. In addition, the configuration information of each RLC entity may contain indication information indicating whether the RLC entity is a main RLC entity (or referred to as a default RLC entity) (it is possible to not contain the indication information, if an RLC entity is not configured as a main RLC entity; in another way, a main RLC entity does not contain indication information, while a non-main RLC entity will add one piece of indication information to indicate that this RLC entity is a non-main RLC entity). The indication information may be optional or mandatory. The indication information has the following functions: for the downlink data transmission, the indication information is used for indicating how the gNB-DU distributes the received PDCP PDUs to two RLC entities configured for the data radio bearer; while for the uplink data transmission, the indication information is used for indicating how the gNB-DU distributes, to two RLC entities configured for the data radio bearer, data of the data radio bearer received from different cells. The indication information can indicate a RLC entity (e.g., a main RLC entity) to be used by the gNB-DU when only one RLC entity needs to be used. For example, when the data radio bearer is configured to support a PDCP duplication function and this function has not been activated, for downlink data, the PDCP PDU of the data radio bearer received from the gNB-CU is transmitted to only the main RLC entity, if one RLC entity is indicated as a main RLC entity; while for uplink data, the data of the data radio bearer received by the gNB-DU is transmitted to the main RLC entity via a logic channel corresponding to the main RLC entity. For another example, when the data radio bearer is configured to support a PDCP duplication function and this function has been activated, for downlink data, when a PDCP PDU belonging to the data radio bear is received from gNB-CU, the gNB-DU transmits the PDCP PDU to the main RLC entity, if the gNB-DU receives the PDCP PDU of the data radio bearer from the gNB-CU for the first time; and the gNB-DU transmits the PDCP PDU to the other RLC entity (the non-main RLC entity), if the gNB-DU receives the PDCP PDU of the data radio bearer from the gNB-CU for the second time.

3) Identifier information and/or configuration information of a logic channel corresponding to at least one configured RLC entity for the data radio bearer, wherein the configuration information contains restriction information for mapping the logic channel to indicate that the data of this logic channel can be transmitted to only a cell or a carrier indicated by the restriction information.

4) Configuration information of at least one tunnel for the data radio bearer. The information provides information of a tunnel established for the transmission of data of this data radio bearer on the F1 interface. The data radio bearer supporting the PDCP duplication function will have two tunnels. The information contains information of at least one tunnel on the gNB-CU side, and the information of each tunnel contains information on the gNB-CU side or address information, for example, gNB-CU GTP tunnel endpoint information (containing the address of a transport layer and a GTP TEID). For example, in a situation where configuration information of one tunnel is contained, it is indicated that the existing configuration information of the tunnel of the data radio bearer can be reused and the contained configuration information of the tunnel is specific to a newly added tunnel. In a situation where configuration information of two tunnels is contained, the newly received configuration information of two tunnels can cover the existing information, if there is already configuration information of at least one tunnel of the data radio bearer; and, the newly received configuration information of two tunnels is directly used, if there is no any configuration information of tunnels corresponding to the data radio bearer. In addition, the information further contains the indication information indicating whether the tunnel is a main tunnel (or a default tunnel) (it is possible to not contain the indication information, if a tunnel is not configured as a main tunnel; in another way, the indication information indicating whether the tunnel is a main tunnel (or a default tunnel) is not contained, while one piece of indication information for indicating that this tunnel is a non-main tunnel will be added in the configuration information of the non-main tunnel, if a tunnel is a main tunnel). The indication information may be optional or mandatory. The indication information has the following functions: for the downlink data transmission, the indication information is used for indicating how the gNB-CU transmits a PDCP PDU to the gNB-DU; while for the uplink data transmission, the indication information is used for indicating how the gNB-DU transmits a PDCP PDU to the gNB-CU. The indication information may indicate a tunnel (e.g., a main tunnel) to be used between the gNB-CU and the gNB-DU when only one tunnel is required. For example, when the data radio bearer is configured to support a PDCP duplication function and this function has not been activated, for downlink data, the PDCP PDU of the data radio bearer received from the gNB-CU is transmitted to the gNB-DU through the tunnel, if one tunnel is indicated as a main tunnel; while for uplink data, the data of the data radio bearer received by the gNB-DU is transmitted to the gNB-CU only through this tunnel. For another example, when the data radio bearer is configured to support a PDCP duplication function and this function has been activated, for uplink data, the PDCP PDU is transmitted to the gNB-CU through the main tunnel, if an RLC entity obtains a PDCP PDU of the data radio bearer for the first time; and the PDCP PDU is transmitted to the gNB-CU through the other tunnel (the non-main tunnel), if the RLC entity obtains a PDCP PDU of the data radio bearer for the second time.

5) Information about a correspondence between tunnels and RLC entities. As described above, each data radio bearer has two tunnels, two RLC entities, and identifier and configuration information of a logic channel corresponding to each RLC entity.

Wherein, the correspondence between RLC entities and tunnels on the F1 interface can be expressed in the following two ways:

way 1: each RLC entity corresponds to a tunnel on the F1 interface; for example, a tunnel 1 corresponds to an RLC entity 1, a tunnel 2 corresponds to an RLC entity 2, a main tunnel corresponds to a main RLC entity, a main tunnel corresponds to a non-main RLC entity, or a non-main tunnel corresponds to a main RLC entity; and way 2: there is no correspondence between RLC entities and tunnels on the F1 interface.

In accordance with the description of information in the request message in the step A, the structure of the configuration information of the data radio bearer can be as follows: when RLC entities have corresponding tunnels on the F1 interface, 1) information indicating the support of the PDCP duplication function;
2) configuration information of the RLC entity 1;
3) identifier and/or configuration information of a logic channel corresponding to the RLC entity 1;
4) gNB-CU side information or address information of the tunnel 1 corresponding to the RLC entity 1;
5) configuration information of the RLC entity 2;
6) identifier and/or configuration information of a logic channel corresponding to the RLC entity 2; and
7) gNB-CU side information or address information of the tunnel 2 corresponding to the RLC entity 2;

when there is no correspondence between RLC entities and tunnels on the F1 interface, 1) information indicating the support of the PDCP duplication function;
2) configuration information of the RLC entity 1;
3) identifier and/or configuration information of a logic channel corresponding to the RLC entity 1;
4) configuration information of the RLC entity 2;
5) identifier and/or configuration information of a logic channel corresponding to the RLC entity 2;
6) gNB-CU side information or address information of the tunnel 1; and
7) gNB-CU side information or address information of the tunnel 2.

Step B: The gNB-DU executes the related configuration, and the gNB-DU feeds back, to the gNB-CU, a response message of configuring the data radio bearer supporting the PDCP duplication function, if the gNB-DU accepts the configuration of the data radio bearer in the step A, wherein the message at least contains the following information:

information about tunnels for the data radio bearer, which provides information about a tunnel established for transmitting data of the data radio bearer on the F1 interface. The information contains gNB-DU side information of at least one established tunnel (e.g., gNB-DU side information of the tunnel 1 and gNB-DU side information of the tunnel 2), and the information about each tunnel contains address information on the gNB-DU side, for example, gNB-DU GTP tunnel endpoint information (containing the address of a transport layer and a GTP TEID). Step C: The PDCP duplication function is activated. This step is optional. This step includes activation of the PDCP duplication function on the gNB-CU side, the gNB-DU side and on the UE side. Possible implementations are as follows.

Way 1: The gNB-CU activates the PDCP duplication function of the data radio bearer on the gNB-DU side and/or the UE side. The gNB-CU transmits PDCP duplication function activation information to the gNB-DU and/or a UE. Then, the PDCP duplication function of the data radio bearer is activated on the gNB-DU side, and data of the data radio bearer will be transmitted according to the configuration information in the steps A and B; and, the PDCP duplication function of the data radio bearer is also activated on the UE side, and data of the data radio bearer will be transmitted according to the received RRC configuration message. Further, the activation information may indicate the activation of an uplink PDCP duplication function, the activation of a downlink PDCP duplication function or the activation of uplink and downlink PDCP duplication functions. If there is no indication information in the activation information, the activation information indicates the activation of uplink and downlink PDCP duplication functions, the activation of an uplink PDCP duplication function, the activation of a downlink PDCP duplication function or the activation of PDCP duplication function in a default direction (in uplink, in downlink or in both uplink and downlink). Here, the activation order is not restricted. It is possible to activate the PDCP duplication function on the gNB-DU side, followed by the PDCP duplication function on the UE side; or, it is possible to activate the PDCP duplication function on the UE side, followed by the PDCP duplication function on the gNB-DU side; or, it is also possible to simultaneously activate the PDCP duplication function on the gNB-DU side and the PDCP duplication function on the UE side. In addition, optionally, upon receiving the activation information transmitted by the gNB-CU, the gNB-DU may reply whether the activation is successful. If the activation being successful is replied, the PDCP duplication function on the gNB-DU side is activated; or otherwise, the PDCP duplication function on the gNB-DU side is not activated. Further, after the PDCP duplication function is activated, the gNB-CU may also transmit deactivation information to the gNB-DU and/or the UE. Optionally, the gNB-DU may reply whether the deactivation is successful. If the deactivation being successful is replied, the PDCP duplication function on the gNB-DU side is stopped; or otherwise, the PDCP duplication function on the gNB-DU side is used continuously.

Way 2: The gNB-DU activates the PDCP duplication function of the data radio bearer on the gNB-CU side and/or the UE side. The gNB-DU transmits PDCP duplication function activation information to the gNB-CU and/or a UE. Then, the PDCP duplication function of the data radio bearer is activated on the gNB-CU side, and data of the data radio bearer will be transmitted according to the configuration information in the steps A and B (a duplicated PDCP PDU is transmitted to the gNB-DU through the F1 interface or a duplicated PDCP PDU transmitted by the gNB-DU is received); and, the PDCP duplication function of the data radio bearer is also activated on the UE side, and data of the data radio bearer will be transmitted according to the received RRC configuration message. Further, the activation information may indicate the activation of an uplink PDCP duplication function, the activation of a downlink PDCP duplication function or the activation of uplink and downlink PDCP duplication functions. If there is no indication information in the activation information, the activation information indicates the activation of uplink and downlink PDCP duplication functions, the activation of an uplink PDCP duplication function, the activation of a downlink PDCP duplication function or the activation of PDCP duplication function in a default direction (in uplink or in downlink). Here, the activation order is not restricted. It is possible to activate the PDCP duplication function on the gNB-DU side, followed by the PDCP duplication function on the UE side; or, it is possible to activate the PDCP duplication function on the UE side, followed by the PDCP duplication function on the gNB-DU side; or, it is possible to simultaneously activate the PDCP duplication function on the gNB-DU side and the PDCP duplication function on the UE side. In addition, optionally, upon receiving the activation information transmitted by the gNB-DU, the gNB-CU may reply whether the activation is successful. If the activation being successful is replied, the PDCP duplication function on the gNB-CU side is activated; or otherwise, the PDCP duplication function on the gNB-CU side is not activated. Further, after the PDCP duplication function is activated, the gNB-DU may also transmit deactivation information to the gNB-CU and/or the UE. Optionally, the gNB-CU may reply whether the deactivation is successful. If the deactivation being successful is replied, the gNB-CU stops the PDCP duplication function; or otherwise, the PDCP duplication function is used continuously.

It is indicated that the PDCP duplication function of the data radio bearer has been activated on the gNB-CU side, the gNB-DU side and the UE side, if the step C has been executed, and a step D will be executed. There are two possibilities, if the step C has not been executed: 1) after the steps A and B have ended, the PDCP duplication function of the data radio bearer has been activated on the gNB-CU side, the gNB-DU side and the UE side (the activation on the UE side has been realized by an individual signaling), and step D will be executed in this case; and, 2) after the steps A and B have ended, the configuration of the PDCP duplication function has been completed on gNB-CU side, the gNB-DU side and the UE side but this function has not been activated, and step E will be executed in this case.

Step D: Data of the data radio bearer having the activated PDCP duplication function is transmitted. This step is performed after the PDCP duplication function of the data radio bearer has been activated (that is, data of the data radio bearer will be transmitted among the gNB-CU, the gNB-DU and the UE according to the configuration of the corresponding PDCP duplication function). As shown in FIG. 6, this step includes the following substeps, if the data radio bearer is downlink.

Substep D-a (downlink): The gNB-CU duplicates a PDCP PDU to obtain two identical PDCP PDUs, or transmits a PDCP PDU for two times.

Substep D-b (downlink): The two identical PDCP PDUs obtained in the substep D-a (downlink) are transmitted to the gNB-DU by two different tunnels (e.g., F1-U tunnel 1 and F1-U tunnel 2) on the F1 interface, respectively.

Substep D-c (downlink): The gNB-DU transmits the received two identical PDCP PDUs to two different RLC entities (e.g., RLC1 and RLC2), the two identical PDCP PDUs are then transmitted to an MAC layer by two different logic channels (e.g., a logic channel 1 and a logic channel 2), and the MAC layer transmits, by two different cells, data from the two different logic channels to two different cells (e.g., a cell 1 and a cell 2, where the two cells may be at different frequencies or at identical frequencies), respectively. On how the gNB-DU distributes the data received from two tunnels to two RLC entities, possible implementations are as follows.

Way 1: The data on each tunnel is transmitted to the specified RLC entity according to the specified correspondence, if there is a specified correspondence between each tunnel and each RLC entity. For example, data on the tunnel 1 is transmitted to the RLC1, and data on the tunnel 2 is transmitted to the RLC2.

Way 2: The implementation may be set by the gNB-DU, if there is no specified correspondence between each tunnel and each RLC entity. As an implementation, the gNB-DU sets that data on the tunnel 1 is transmitted to the RLC1 and data on the tunnel 2 is transmitted to the RLC2. As another implementation, for two identical PDCP PDUs received from two tunnels, the first received PDCP PDU is transmitted to the RLC1 and the second received PDCP PDU is transmitted to the RLC2. In this implementation, the gNB-DU needs to identify whether two PDCP PDUs received from two tunnels are identical. As still another implementation, once the gNB-DU receives a data packet (e.g., PDCP PDU1) from one of the two tunnels, the gNB-DU autonomously duplicates the data packet to obtain two identical data packets and then transmit the two identical data packets to two RLC entities (RLC1 and RLC2), respectively, or the gNB-DU autonomously transmits the data packet for two times to two RLC entities (RLC1 and RLC2); hereafter, the gNB-DU can discard this data packet since this data packet has been transmitted to different RLC entities, if the gNB-DU receives an identical data packet again (e.g., PDCP PDU1) (here, the gNB-DU also needs to have a function of identifying whether two PDCP PDUs received from two tunnels are identical); or, the gNB-DU can duplicate the data packet to obtain two identical data packets and then transmit the two identical data packets to two RLC entities (RLC1 and RLC2), respectively, or the gNB-DU autonomously transmits the data packet for two times to two RLC entities (RLC1 and RLC2). The implementation may also be determined by the gNB-DU according to the existing configuration. For example, for two identical PDCP PDUs, the first received PDU will be transmitted to a specific RLC entity (e.g., RLC1) by the gNB-DU, wherein the specific RLC entity may be the configured main RLC entity (or the default RLC entity); and, the second received PDU will be transmitted to the other RLC entity (the non-main RLC entity) by the gNB-DU. In this case, the gNB-DU needs to identify whether two PDCP PDUs received from two tunnels are identical.

This step includes the following substeps, if the data radio bearer is uplink.

Substep D-a (uplink): The gNB-DU receives data from two different cells (e.g., a cell 1 and a cell 2, where the two cells may be at different frequencies or at identical frequencies), and the data from the two different cells are processed by a physical layer and an MAC layer and then transmitted to two different RLC entities (e.g., RLC1 and RLC2) by two different logic channels (e.g., a logic channel 1 and a logic channel 2), respectively.

Substep D-b (uplink): The data processed by the two RLC entities will be transmitted to the gNB-CU by two different tunnels (e.g., a tunnel 1 and a tunnel 2) on the F1 interface. On how the gNB-DU distributes the data output from the two RLC entities to two tunnels, possible implementations are as follows.

Way 1: The data output from each RLC entity is transmitted to the specified tunnel according to the specified correspondence, if there is a specified correspondence between each tunnel and each RLC entity. For example, the data output from the RLC1 is transmitted to the gNB-CU via the tunnel 1, and the data output from the RLC2 is transmitted to the gNB-CU via the tunnel 2.

Way 2: The implementation may be set by the gNB-DU, if there is no specified correspondence between each tunnel and each RLC entity. As an implementation, the gNB-DU sets that the data output from the RLC1 is transmitted to the gNB-CU via the tunnel 1 and the data output from the RLC2 is transmitted to the gNB-CU via the tunnel 2. As another implementation, for two identical PDCP PDUs output from two RLC entities, the first output PDCP PDU is transmitted to the tunnel 1 and the second output PDCP PDU is transmitted to the tunnel 2. In this implementation, the gNB-DU needs to identify whether two PDCP PDUs output from the two RLC entities are identical. As still another implementation, once a data packet (e.g., PDCP PDU1) is output from one of two RLC entities on the gNB-DU, the gNB-DU autonomously duplicates the data packet to obtain two identical data packets and then transmits the two identical data packets to two tunnels (a tunnel 1 and a tunnel 2), respectively; hereafter, the gNB-DU can discard this data packet since this data packet has been transmitted to the gNB-CU, or the gNB-DU can duplicate the data packet to obtain two identical data packets and then transmit the two identical data packets to two tunnels (a tunnel 1 and a tunnel 2), if the gNB-DU receives an identical data packet (e.g., PDCP PDU1) again (here, the gNB-DU needs to have a function of identifying whether two PDCP PDUs output from the two RLC entities are identical). The implementation may also be determined by the gNB-DU according to the existing configuration. For example, for two identical PDCP PDUs output from two RLC entities, the first output PDU will be transmitted to a specified tunnel (e.g., the tunnel 1) by the gNB-DU, wherein the specified tunnel may be a main tunnel (or referred to as a default tunnel); while the second output PDU will be transmitted to the other tunnel (e.g., the non-main tunnel) by the gNB-DU. In this implementation, the gNB-DU needs to identify whether two PDCP PDUs output from two RLC entities are identical.

Substep D-c (uplink): The gNB-CU processes the received PDCP PDUs (e.g., discards a duplicated PDCP PDU) by a PDCP layer to obtain a PDCP SDU.

Step E: Data of the data radio bearer configured with the PDCP duplication function which has not been activated is transmitted. For the downlink data transmission, implementations may be as follows.

Way 1: The gNB-CU transmits, by the specified tunnel (e.g., the main tunnel or default tunnel) on the F1 interface, a PDCP PDU of the data radio bearer to the specified RLC entity (e.g., the main RLC entity or default RLC entity), and the PDCP PDU is transmitted to an MAC layer via a logic channel corresponding to the specified RLC entity and then transmitted to a user via a cell, if a tunnel (e.g., the main tunnel or default tunnel) and an RLC entity (e.g., the main RLC entity or default RLC entity) to be used when the PDCP duplication function is configured but not activated have been specified in the step A and/or B.

Way 2: the gNB-CU transmits, by the specified tunnel (e.g., the main tunnel or default tunnel) on the F1 interface, a PDCP PDU of the data radio bearer to gNB-DU, the gNB-DU autonomously selects a configured RLC entity, and the PDCP PDU is transmitted to an MAC layer via a logic channel corresponding to this RLC entity and then transmitted to a user via a cell, if a tunnel (e.g., the main tunnel or default tunnel) to be used when the PDCP duplication function is configured but not activated has been specified in the step A and/or B but an RLC entity to be used is not specified.

Way 3: the gNB-CU autonomously determines a configured tunnel and transmits a PDCP PDU of the data radio bearer to the gNB-DU through this tunnel, the gNB-DU transmits the received PDCP PDU to the specified RLC entity (e.g., the main RLC entity or default RLC entity), and the PDCP PDU is transmitted to an MAC layer via a logic channel corresponding to the specified RLC entity and then transmitted to a user via a cell, if an RLC entity (e.g., the main RLC entity or default RLC entity) to be used when the PDCP duplication function is configured but not activated has been specified in the step A and/or B but a tunnel is not specified.

Way 4: the CU autonomously determines a configured tunnel and transmits a PDCP PDU of the data radio bearer to the gNB-DU through this tunnel, the gNB-DU autonomously selects a configured RLC entity, and the PDCP PDU is transmitted to an MAC layer via a logic channel corresponding to this RLC entity and then transmitted to a user via a cell, if a tunnel and an RLC entity to be used when the PDCP duplication function is configured but not activated have not been specified in the step A and/or B.

For the uplink data transmission, implementations may be as follows.

Way 1: The gNB-DU transmits, via a specified logic channel (the specified logic channel corresponds to the specified RLC entity) and to the specified RLC entity for processing (e.g., the main RLC entity or default RLC entity), the data of the data radio bearer which is received from a cell and processed by a physical layer and an MAC layer, and the processed PDCP PDU is transmitted to the gNB-CU by the specified tunnel (e.g., the main tunnel or default tunnel) on the F1 interface and then processed by a PDCP layer to obtain a PDCP SDU, if a tunnel (e.g., the main tunnel or default tunnel) and an RLC entity (e.g., the main RLC entity or default RLC entity) to be used when the PDCP duplication function is configured but not activated have been specified in the step A and/or B.

Way 2: The gNB-DU transmits, via a logic channel and to a corresponding RLC entity for processing, the data of the data radio bearer which is received from a cell and processed by a physical layer and an MAC layer, and the processed PDCP PDU is transmitted to the gNB-CU by the specified tunnel (e.g., the main tunnel or default tunnel) on the F1 interface and then processed by a PDCP layer to obtain a PDCP SDU, if a tunnel (e.g., the main tunnel or default tunnel) to be used when the PDCP duplication function is configured but not activated has been specified in the step A and/or B but an RLC entity is not specified.

Way 3: the gNB-DU transmits, via a specified logic channel (the specified logic channel corresponds to the specified RLC entity) and to the specified RLC entity for processing (e.g., the main RLC entity or default RLC entity), the data which is received from a cell and processed by a physical layer and an MAC layer, and the processed PDCP PDU is transmitted to the gNB-CU by a tunnel (which is autonomously selected by the gNB-DU) on the F1 interface and then processed by a PDCP layer to obtain a PDCP SDU, if an RLC entity (e.g., the main RLC entity or default RLC entity) to be used when the PDCP duplication function is configured but not activated has been specified in the step A and/or B but a tunnel is not specified.

Way 4: the gNB-DU transmits, via a logic channel and to a corresponding RLC entity for processing, the data of the data radio bearer which is received from a cell and processed by a physical layer and an MAC layer, and the processed PDCP PDU is transmitted to the gNB-CU by a tunnel (which is autonomously selected by the gNB-DU) on the F1 interface and then processed by a PDCP layer to obtain a PDCP SDU, if a tunnel and an RLC entity to be used when the PDCP duplication function is configured but not activated have not been specified in the step A and/or B.

The message names in the steps A and B are merely exemplary, and the involved configuration information can be carried in other messages for transmission, for example, a UE context setup request and a UE context setup response, a bearer setup request and a bearer setup response, a DL RRC message transfer and a UL RRC message transfer, or the like.

In addition, the existing configuration of the data radio bearer can be modified by the steps A and B. In order to improve the reliability of data transmission of this data radio bearer, it is required to configure the data radio bearer as a data radio bearer supporting the PDCP duplication function, if the data radio bearer has been configured as an ordinary bearer which does not support the PDCP duplication function. In this case, the configuration of this data radio bearer can be modified by the steps A and B, that is, the configuration messages in the steps A and B are transmitted through messages, such as a bearer modification request and a bearer modification response. In another way, in the steps A and B, only the newly added information or the configuration information to be modified is contained. For example, when this data radio bearer does not support the PDCP duplication function, the following information has been configured: configuration information of the RLC entity 1;
  identifier information of a logic channel corresponding to the RLC entity 1;
  configuration information of a logic channel corresponding to the RLC entity 1; and
  gNB-CU side and gNB-DU side tunnel information of a tunnel 1 on the F1 interface established for the data radio bearer.

When the data radio bearer will be configured as a data radio bearer supporting the PDCP duplication function, based on the existing configuration information, the modified existing configuration information and the newly added information will be transmitted to the gNB-DU in the step A. For example, the modified existing configuration information includes: updated part of the configuration information of the RLC entity 1, for example, added indication information for indicating whether the entity is a main RLC entity;
  updated part of the configuration information of the logic channel corresponding to the RLC entity 1, for example, added restriction information for mapping the logic channel; and
  updated part of the information of the tunnel 1 on the F1 interface established for the data radio bearer, for example, added indication information for indicating whether the tunnel is a main tunnel.

The newly added information includes:
configuration information of the RLC entity 2;
identifier information of a logic channel corresponding to the RLC entity 2;
configuration information of a logic channel corresponding to the RLC entity 2; and CU side tunnel information of a tunnel 2 on the F1 interface established for the data radio bearer.

The information transmitted by the gNB-DU in the step B includes:
  gNB-DU side tunnel information of the tunnel 2 on the F1 interface established for the data radio bearer.

In the last embodiment, two tunnels are established for each data radio bearer, and two identical PDCP PDUs obtained by duplication (or two PDCP PDUs obtained by transmitting a PDCP PDU for two times) will be transmitted by two different tunnels; however, in this embodiment, two identical PDCP PDUs obtained by duplication (or two PDCP PDUs obtained by transmitting a PDCP PDU for two times) will be transmitted by a same tunnel, and in a gNB-DU, two RLC entities and an identifier and/or configuration of a logic channel corresponding to each RLC entity are configured for the data radio bearer. The method includes the following steps.

Step A: A gNB-CU transmits, to a gNB-DU, a request message of configuring of a data radio bearer supporting a PDCP duplication function, wherein, for each data radio bearer supporting the PDCP duplication function, the message at least contains one or more pieces of the following information.

1) Information indicating the support of the PDCP duplication function, wherein possible implementations are as follows:
  way 1: indication information of supporting the PDCP duplication function, wherein the indication information indicates that the data radio bearer supports the PDCP duplication function;
  way 2: type information of the data radio bearer, wherein the type information indicates that the data radio bearer is a data radio bearer supporting the PDCP duplication function; and
  way 3: identifier information of the data radio bearer, wherein one or more identifiers of the data radio bearer supporting the PDCP duplication function are predefined or preconfigured, and the data radio bearer supports the PDCP duplication function if the identifier of the data radio bearer indicates that the data radio bearer is a data radio bearer supporting the PDCP duplication function.

Further, the information indicating the support of the PDCP duplication function may further include indication information of uplink/downlink. The indication information indicates the support of the PDCP duplication function in uplink, or the support of the PDCP duplication function in downlink, or the support of the PDCP duplication function in both uplink and the downlink. If the indication information of uplink/downlink is not included, the information indicating the support of the PDCP duplication function may indicate the support of the PDCP duplication function in both uplink and downlink, the support of the PDCP duplication function in downlink, the support of the PDCP duplication function in uplink, or the support of the PDCP duplication function in a default direction (in uplink, in downlink or in both uplink and downlink).

2) Part or all of configuration information of at least one RLC entity corresponding to the data radio bearer. The data radio bearer supporting the PDCP duplication function will have two RLC entities, but the configuration information can contain part or all of configuration information of one RLC entity or contain part or all of configuration information of two RLC entities (it is indicated that the configuration information not contained in the configuration information can reuse the existing configuration, if only part of configuration information is contained in the configuration information). For example, in a situation where the configuration information of one RLC entity is contained, it is indicated that the existing configuration information of the RLC entity of the data radio bearer can be reused and the contained configuration information of the RLC entity is specific to a newly added RLC entity. In a situation where the configuration information of two RLC entities is contained, the newly received configuration information of the two RLC entities can cover the existing information, if the gNB-DU already has configuration information of at least one RLC entity of the data radio bearer; and, the gNB-DU directly uses the newly received configuration information of the two RLC entities, if the gNB-DU does not have any information of RLC entities corresponding to the data radio bearer. In addition, the configuration information of each RLC entity may contain indication information for indicating whether the RLC entity is a main RLC entity (or referred to as a default RLC entity) (it is possible to not contain the indication information, if an RLC entity is not configured as a main RLC entity; in another way, a main RLC entity does not contain indication information, while a non-main RLC entity will contain one piece of indication information to indicate that this RLC entity is a non-main RLC entity). The indication information may be optional or mandatory. The indication information has the following functions: for the downlink data transmission, the indication information is used for indicating how the gNB-DU distributes the received PDCP PDU to two RLC entities configured for the data radio bearer; while for the uplink data transmission, the indication message is used for indicating how the gNB-DU distributes, to two RLC entities configured for the data radio bearer, data of the data radio bearer received from different cells. The indication information can indicate a RLC entity (e.g., a main RLC entity) to be used by the gNB-DU when only one RLC entity needs to be used. For example, for downlink data, the PDCP PDU of the data radio bearer received from the gNB-CU is transmitted to only the main RLC entity, if an RLC entity is indicated as a main RLC entity, and when the data radio bearer is configured to support a PDCP duplication function and this function has not been activated; while for uplink data, all data of the data radio bearer received by the gNB-DU is transmitted to the main RLC entity. For another example, when the data radio bearer is configured to support a PDCP duplication function and this function has been activated, for downlink data, the gNB-DU transmits the PDCP PDU to the main RLC entity, if the gNB-DU receives a PDCP PDU of the data radio bearer from the gNB-CU for the first time; and the gNB-DU transmits the PDCP PDU to the other RLC entity (the non-main RLC entity), if the gNB-DU receives a PDCP PDU of the data radio bearer from the gNB-CU for the second time.

3) Identifier information and/or configuration information of a logic channel corresponding to at least one configured RLC entity for the data radio bearer, wherein the configuration information contains restriction information for mapping the logic channel to indicate that the data of this logic channel can be transmitted to only a cell or a carrier indicated by the restriction information.

4) Configuration information of a tunnel for the data radio bearer. The information provides information about a tunnel established for the transmission of data of this data radio bearer on the F1 interface. The information contains information of one tunnel on the gNB-CU side, for example, gNB-CU GTP tunnel endpoint information (including the address of a transport layer and a GTP TEID).

5) Indication information for identifying a duplicated PDCP PDU. The indication information indicates the kind of information according to which the gNB-DU identifies whether the received PDCP PDUs are identical. For example, the indication information indicates that the gNB-DU identifies, according to a sequence number of G-PDU, a sequence number of the user plane of the F1 interface or a PDCP SN in an extended header contained in the GTP-PDU, whether the received two PDCP PDUs are two identical PDUs. The information is optional. The gNB-DU can be identified by a default setup, if the information is not contained. The default setup can be default identification according to the sequence number of the G-PDU, default identification according to the sequence number of the user plane of the F1 interface, or default identification according to the PDCP SN in the extended header contained in the GTP-PDU, or default identification by comparing the received PDCP PDUs.

Step B: The gNB-DU executes the related configuration, and the gNB-DU feeds back, to the gNB-CU, a response message of configuring the data radio bearer supporting the PDCP duplication function in order to indicate whether the gNB-DU accepts the configuration of the data radio bearer in the step A, if the gNB-DU accepts the configuration of the data radio bearer in the step A. This response message is optional. The response message contains gNB-DU side information of a tunnel, for example, gNB-DU GTP tunnel endpoint information (including the address of a transport layer and a GTP TEID).

Step C: The PDCP duplication function is activated. This step is optional. This step includes activation of the PDCP duplication function on the gNB-CU side, the gNB-DU side and the UE side. Possible implementations are as follows.

Way 1: The gNB-CU activates the PDCP duplication function of the data radio bearer on the gNB-DU side and/or the UE side. The gNB-CU transmits PDCP duplication function activation information to the gNB-DU and/or a UE. Then, the PDCP duplication function of the data radio bearer is activated on the gNB-DU side, and data of the data radio bearer will be transmitted according to the configuration information in the steps A and B; and, the PDCP duplication function of the data radio bearer is also activated on the UE side, and data of the data radio bearer will be transmitted according to the received RRC configuration message. Further, the activation information may indicate the activation of an uplink PDCP duplication function, the activation of a downlink PDCP duplication function or the activation of uplink and downlink PDCP duplication functions. If there is no indication information in the activation information, the activation information indicates the activation of uplink and downlink PDCP duplication functions, the activation of an uplink PDCP duplication function, the activation of a downlink PDCP duplication function or the activation of PDCP duplication function in a default direction (in uplink, in downlink or in both uplink and downlink). Here, the activation order is not restricted. It is possible to activate the PDCP duplication function on the gNB-DU side, followed by the PDCP duplication function on the UE side; or, it is possible to activate the PDCP duplication function on the UE side, followed by the PDCP duplication function on the gNB-DU side; or, it is also possible to simultaneously activate the PDCP duplication function on the gNB-DU side and the PDCP duplication function on the UE side. In addition, optionally, upon receiving the activation information transmitted by the gNB-CU, the gNB-DU may reply whether the activation is successful. If the activation being successful is replied, the PDCP duplication function on the gNB-DU side is activated; or otherwise, the PDCP duplication function on the gNB-DU side is not activated. Further, after the PDCP duplication function is activated, the gNB-CU may also transmit deactivation information to the gNB-DU and/or the UE. Optionally, the gNB-DU may reply whether the deactivation is successful. If the deactivation being successful is replied, the PDCP duplication function on the gNB-DU side is stopped; or otherwise, the PDCP duplication function is used continuously.

Way 2: The gNB-DU activates the PDCP duplication function of the data radio bearer on the gNB-CU side and/or the UE side. The gNB-DU transmits PDCP duplication function activation information to the gNB-CU and/or a UE. Then, the PDCP duplication function of the data radio bearer is activated on the gNB-CU side, and data of the data radio bearer will be transmitted according to the configuration information in the steps A and B (a duplicated PDCP PDU is transmitted to the gNB-DU through the F1 interface or a duplicated PDCP PDU transmitted by the gNB-DU is received); and, the PDCP duplication function of the data radio bearer is also activated on the UE side, and data of the data radio bearer will be transmitted according to the received RRC configuration message. Further, the activation information may indicate the activation of an uplink PDCP duplication function, the activation of a downlink PDCP duplication function or the activation of uplink and downlink PDCP duplication functions. If there is no indication information in the activation information, the activation information indicates the activation of uplink and downlink PDCP duplication functions, the activation of an uplink PDCP duplication function, the activation of a downlink PDCP duplication function or the activation of PDCP duplication function in a default direction (in uplink, in downlink or in both uplink and downlink). Here, the activation order is not restricted. It is possible to activate the PDCP duplication function on the gNB-DU side, followed by the PDCP duplication function on the UE side; or, it is possible to activate the PDCP duplication function on the UE side, followed by the PDCP duplication function on the gNB-DU side; or, it is also possible to simultaneously activate the PDCP duplication function on the gNB-DU side and the PDCP duplication function on the UE side. In addition, optionally, upon receiving the activation information transmitted by the gNB-DU, the gNB-CU may reply whether the activation is successful. If the activation is successful, the PDCP duplication function on the gNB-CU side is activated; or otherwise, the PDCP duplication function on the gNB-CU side is not activated. Further, after the PDCP duplication function is activated, the gNB-DU may also transmit deactivation information to the gNB-CU and/or the UE. Optionally, the gNB-CU may reply whether the deactivation is successful. If the deactivation is successful, the PDCP duplication function on the gNB-CU side is stopped; or otherwise, the PDCP duplication function is used continuously.

It is indicated that the PDCP duplication function of the data radio bearer has been activated on the gNB-CU side, the gNB-DU side and the UE side, if the step C has been executed, and step D will be executed. There are two possibilities, if the step C has not been executed: 1) after the steps A and B have ended, the PDCP duplication function of the data radio bearer has been activated on the gNB-CU side, the gNB-DU side and the UE side (the activation on the UE side has been realized by an individual signaling), and step D will be executed in this case; and, 2) after the steps A and B have ended, the configuration of the PDCP duplication function has been completed on the gNB-CU side, the gNB-DU side and the UE side but this function has not been activated, and step E will be executed in this case.

Step D: Data of the data radio bearer having the activated PDCP duplication function is transmitted. This step is performed after the PDCP duplication function of the data radio bearer has been activated (that is, data of the data radio bearer will be transmitted among the gNB-CU, the gNB-DU and the UE according to the configuration of the corresponding PDCP duplication function). This step includes the following substeps, if the data radio bearer is downlink.

Substep D-a (downlink): The gNB-CU duplicates a PDCP PDU to obtain two identical PDCP PDUs, or transmits a PDCP PDU for two times to obtain two identical PDCP PDUs.

Substep D-b (downlink): The two identical PDCP PDUs obtained in the substep D-a (downlink) are transmitted to the gNB-DU through a tunnel on the F1 interface, and an identical identifier is added to the two identical PDCP PDUs to assist the gNB-DU in identifying the two identical PDCP PDUs. For example, the two identical PDCP PDUs can be identified by a G-PDU sequence number, and in this case, a same G-PDU sequence number is assigned to the two identical PDCP PDUs during the generation of a G-PDU; the two identical PDCP PDUs can also be identified by a sequence number of the user plane of the F1 interface, and in this case, a same sequence number of the user plane of the F1 interface is assigned to the two identical PDCP PDUs during the generation of a data packet of the user plane of the F1 interface; or, the two identical PDCP PDUs can also be identified by a PDCP SN in an extended header contained in the GTP-PDU, and in this case, an extended header having a PDCP SN identifier is contained in the GTP-PDU. In addition, the gNB-CU can also add no identifier to the two identical PDCP PDUs, and identical PDCP PDUs can be judged by the gNB-DU itself.

Substep D-c (downlink): The gNB-DU identifies two identical PDCP PDUs. The two identical PDCP PDUs can be identified according to the indication information for identifying a duplicated PDCP PDU contained in the configuration information in the step A; or, identical PDCP PDUs can be identified according to a default setup (the default setup can be default identification according to the sequence number of the G-PDU, or default identification according to the sequence number of the user plane of the F1 interface, or default identification according to the PDCP SN in the extended header contained in the GTP-PDU); or, two received PDCP PDUs are compared to judge whether the two PDCP PDUs are identical. The gNB-DU transmits the received two identical PDCP PDUs to two different RLC entities (e.g., RLC1 and RLC2), the two identical PDCP PDUs are then transmitted to an MAC layer by two different logic channels (e.g., a logic channel 1 and a logic channel 2), and the MAC layer transmits, by physical layers of two different cells, data from the two different logic channels to two different cells (e.g., a cell 1 and a cell 2, where the two cells may be at different frequencies or at identical frequencies), respectively. On how the gNB-DU distributes the received data to two RLC entities, possible implementations are as follows.

Way 1: The gNB-DU makes a decision according to the existing configuration. For example, for two identical PDCP PDUs, the first received PDU will be transmitted to a specific RLC entity (e.g., RLC1) by the gNB-DU, wherein the specific RLC entity may be the configured main RLC entity (or the default RLC entity); while the second received PDU will be transmitted to the other RLC entity (the non-main RLC entity) by the gNB-DU.

Way 2: The implementation is set by the gNB-DU. As an implementation, for two identical PDCP PDUs, the first received PDCP PDU is transmitted to the RLC1 and the second received PDCP PDU is transmitted to the RLC2. As another implementation, once the gNB-DU receives a data packet (e.g., PDCP PDU1) from a tunnel, the gNB-DU autonomously duplicates the data packet to obtain two identical data packets and then transmits the two identical data packets to two RLC entities (RLC1 and RLC2), respectively; or, the gNB-DU autonomously transmits the data packet for two times to two RLC entities (RLC1 and RLC2), respectively. Hereafter, the gNB-DU may discard this data packet since this data packet has been transmitted to different RLC entities, if the gNB-DU receives an identical data packet (e.g., PDCP PDU1) again; or, the gNB-DU duplicates this data packet to obtain two identical data packets and then transmits the two identical data packets to two RLC entities (RLC1 and RLC2), or the gNB-DU autonomously transmits this data packet for two times to two RLC entities (RLC1 and RLC2), respectively.

This step includes the following substeps, if the data radio bearer is uplink.

Substep D-a (uplink): The gNB-DU receives data from two different cells (e.g., a cell 1 and a cell 2, where the two cells may be at different frequencies or at identical frequencies), and the data from the two different cells are processed by a physical layer and an MAC layer and then transmitted to two different RLC entities (e.g., RLC1 and RLC2) by two different logic channels (e.g., a logic channel 1 and a logic channel 2), respectively.

Substep D-b (uplink): The data processed by the two RLC entities will be transmitted to the gNB-CU through a tunnel on the F1 interface.

Substep D-c (uplink): The gNB-CU processes the received PDCP PDUs (e.g., discarding the duplicated PDCP PDU) by a PDCP layer to obtain a PDCP SDU.

Step E: Data of the data radio bearer configured with the PDCP duplication function which has not been activated is transmitted. For the downlink data transmission, implementations may be as follows.

Way 1: The gNB-CU transmits, by a tunnel on the F1 interface, a PDCP PDU of the data radio bearer to the specified RLC entity (e.g., the main RLC entity or default RLC entity), and the PDCP PDU is transmitted to an MAC layer via a logic channel corresponding to the specified RLC entity and then transmitted to a user via a cell, if an RLC entity (e.g., the main RLC entity or default RLC entity) to be used when the PDCP duplication function is configured but not activated has been specified in the step A and/or B.

Way 2: The gNB-CU transmits a PDCP PDU of the data radio bearer to the gNB-DU through a tunnel, the gNB-DU autonomously selects a configured RLC entity, and the PDCP PDU is transmitted to an MAC layer via a logic channel corresponding to this RLC entity and then transmitted to a user via a cell, if an RLC entity to be used when the PDCP duplication function is configured but not activated has not been specified in the step A and/or B.

For the uplink data transmission, implementations may be as follows.

Way 1: The gNB-DU transmits, via a specified logic channel (the specified logic channel corresponds to the specified RLC entity) and to the specified RLC entity (e.g., the main RLC entity or default RLC entity), the data of the data radio bearer which is received from a cell and processed by a physical layer and an MAC layer, and the processed PDCP PDU is transmitted to the gNB-CU by a tunnel on the F1 interface and then processed by a PDCP layer to obtain a PDCP SDU, if an RLC entity (e.g., the main RLC entity or default RLC entity) to be used when the PDCP duplication function is configured but not activated has been specified in the step A and/or B.

Way 2: The gNB-DU transmits, via a logic channel and to a corresponding RLC entity (the logic channel and the RLC entity are autonomously determined by the gNB-DU), the data of the data radio bearer which is received from a cell and processed by a physical layer and an MAC layer, and the processed PDCP PDU is transmitted to the gNB-CU through a tunnel on the F1 interface by the gNB-DU and then processed by a PDCP layer to obtain a PDCP SDU, if an RLC entity to be used when the PDCP duplication function is configured but not activated has not been specified in the step A and/or B.

The message names in the steps A and B are merely exemplary, and the involved configuration information may be carried in other messages for transmission, for example, a UE context setup request and a UE context setup response, a bearer setup request and a bearer setup response, a DL RRC message transfer and a UL RRC message transfer, or the like.

In addition, the existing configuration of the data radio bearer can be modified by the steps A and B. In order to improve the reliability of data transmission of this data radio bearer, it is required to configure the data radio bearer as a data radio bearer supporting the PDCP duplication function, if the data radio bearer has been configured as an ordinary bearer which does not support the PDCP duplication function. In this case, the configuration of this data radio bearer can be modified by the steps A and B, that is, the configuration messages in the steps A and B are transmitted by a bearer modification request and a bearer modification response. In another way, in the steps A and B, only the newly added information or the configuration information to be modified is contained. For example, when this data radio bearer does not support the PDCP duplication function, the following information has been configured:

configuration information of the RLC entity 1;
    identifier information and/or configuration information of a logic channel corresponding to the RLC entity 1; and
    gNB-CU side and gNB-DU side tunnel information of a tunnel 1 on the F1 interface established for the data radio bearer.

When the data radio bearer will be configured as a data radio bearer supporting the PDCP duplication function, based on the existing configuration information, the modified existing configuration information and the newly added information will be transmitted to the gNB-DU in the step A.

For example, the modified existing configuration information includes: updated part of the configuration information of the RLC entity 1, for example, added indication information for indicating whether the entity is a main RLC entity; and updated part of the configuration information of the logic channel corresponding to the RLC entity 1, for example, added restriction information for mapping the logic channel.

The newly added information includes:
configuration information of the RLC entity 2; and
identifier information and/or configuration information of a logic channel corresponding to the RLC entity 2.

In this embodiment, a data radio bearer is configured with a PDCP duplication function, and on an F1 interface, a tunnel is established for the data radio bearer to transmit data of this data radio bearer. In a DU, two RLC entities and an identifier and/or configuration of a logic channel corresponding to each RLC entity are configured for this data radio bearer. For downlink transmission, a DU will duplicate each received PDCP PDU to obtain two identical PDCP PDUs, or the DU will transmit each PDCP PDU for two times (in this method, the CU does not duplicate the PDCP PDU). The method includes the following steps.

Step A: A gNB-CU transmits, to a gNB-DU, a request message of configuring a data radio bearer supporting a PDCP duplication function, wherein, for each data radio bearer supporting the PDCP duplication function, the message at least contains one or more pieces of the following information.

1) Information indicating the support of the PDCP duplication function, wherein possible implementations are as follows:
  way 1: indication information of supporting the PDCP duplication function, wherein the indication information indicates that the data radio bearer supports the PDCP duplication function;
  way 2: type information of the data radio bearer, wherein the type information indicates that the data radio bearer is a data radio bearer supporting the PDCP duplication function; and
  way 3: identifier information of the data radio bearer, wherein one or more identifiers of the data radio bearer supporting the PDCP duplication function are predefined or preconfigured, and the data radio bearer supports the PDCP duplication function if the identifier of the data radio bearer indicates that the data radio bearer is a data radio bearer supporting the PDCP duplication function.

Further, the information indicating the support of the PDCP duplication function may further include indication information of uplink/downlink. The indication information indicates the support of the PDCP duplication function in uplink, or the support of the PDCP duplication function in downlink, or the support of the PDCP duplication function in both uplink and the downlink. If the indication information of uplink/downlink is not included, the information indicating the support of the PDCP duplication function may indicate the support of the PDCP duplication function in uplink and downlink, the support of the PDCP duplication function in downlink, the support of the PDCP duplication function in uplink, or the support of the PDCP duplication function in a default direction (in uplink, in downlink or in both uplink and downlink).

2) Part or all of configuration information of at least one RLC entity corresponding to the data radio bearer. The data radio bearer supporting the PDCP duplication function will have two RLC entities, but the configuration message can contain part or all of configuration information of one RLC entity or contain part or all of configuration information of two RLC entities (it is indicated that the configuration information not contained in the configuration message can reuse the existing configuration, if only part of configuration information is contained in the configuration information). For example, in a situation where the configuration information of one RLC entity is contained, it is indicated that the existing configuration information of the RLC entity of the data radio bearer can be reused and the contained configuration information of the RLC entity is specific to a newly added RLC entity. In a situation where the configuration information of two RLC entities is contained, the newly received configuration information of the two RLC entities can cover the existing information, if the gNB-DU already has configuration information of at least one RLC entity of the data radio bearer; and, the gNB-DU directly uses the newly received configuration information of the two RLC entities, if the gNB-DU does not have any information of RLC entities corresponding to the data radio bearer. In addition, the configuration information of each RLC entity may contain indication information for indicating whether the RLC entity is a main RLC entity (or referred to as a default RLC entity) (it is possible to not contain the indication information, if an RLC entity is not configured as a main RLC entity; in another way, a main RLC entity does not contain indication information, while a non-main RLC entity will contain one piece of indication information to indicate that this RLC entity is a non-main RLC entity). The indication information may be optional or mandatory. The indication information has the following functions: for the downlink data transmission, the indication information is used for indicating how the gNB-DU distributes the received PDCP PDU to two RLC entities configured for the data radio bearer; while for the uplink data transmission, the indication information is used for indicating how the gNB-DU distributes, to two RLC entities configured for the data radio bearer, data of the data radio bearer received from different cells. The indication information can indicate a RLC entity (e.g., a main RLC entity) to be used by the gNB-DU when only one RLC entity needs to be used. For example, for downlink data, the PDCP PDU of the data radio bearer received from the gNB-CU is transmitted to only the main RLC entity, if an RLC entity is indicated as a main RLC entity, and when the data radio bearer is configured to support a PDCP duplication function and this function has not been activated; while for uplink data, all data of the data radio bearer received by the gNB-DU is transmitted to the main RLC entity. For another example, when the data radio bearer is configured to support a PDCP duplication function and this function has been activated, for downlink data, the gNB-DU transmits the PDCP PDU to the main RLC entity, if the gNB-DU receives a PDCP PDU of the data radio bearer from the gNB-CU for the first time; and the gNB-DU transmits the PDCP PDU to the other RLC entity (the non-main RLC entity), if the gNB-DU receives a PDCP PDU of the data radio bearer from the gNB-CU for the second time.

3) Identifier information and/or configuration information of a logic channel corresponding to at least one configured RLC entity for the data radio bearer, wherein the configuration information contains restriction information for mapping the logic channel, for indicating that the data of this logic channel only can be transmitted to a cell or a carrier indicated by the restriction information.

4) Configuration information of a tunnel for the data radio bearer. The information provides information about a tunnel established for the transmission of data of this data radio bearer on the F1 interface. The information contains information of a tunnel on gNB-CU side, for example, gNB-CU GTP tunnel endpoint information (including the address of a transport layer and a GTP TEID).

Step B: The gNB-DU executes the related configuration, and the gNB-DU feeds back, to the gNB-CU, a response message of configuring the data radio bearer supporting the PDCP duplication function in order to indicate whether the gNB-DU accepts the configuration of the data radio bearer in the step A, if the gNB-DU accepts the configuration of the data radio bearer in the step A. This response message is optional. The response message may contain gNB-DU side information of a tunnel, for example, gNB-DU GTP tunnel endpoint information (including the address of a transport layer and a GTP TEID).

Step C: The PDCP duplication function is activated. This step is optional. This step includes activation of the PDCP duplication function on the gNB-DU side and the UE side. Possible implementations are as follows.

Way 1: The gNB-CU activates the PDCP duplication function of the data radio bearer on the gNB-DU side and/or the UE side. The gNB-CU transmits PDCP duplication function activation information to the gNB-DU and/or a UE. Then, the PDCP duplication function of the data radio bearer is activated on the gNB-DU side, and data of the data radio bearer will be transmitted according to the configuration information in the steps A and B; and, the PDCP duplication function of the data radio bearer is also activated on the UE side, and data of the data radio bearer will be transmitted according to the received RRC configuration information. Further, the activation information may indicate the activation of an uplink PDCP duplication function, the activation of a downlink PDCP duplication function or the activation of uplink and downlink PDCP duplication functions. If there is no indication information in the activation information, the activation information indicates the activation of uplink and downlink PDCP duplication functions, the activation of an uplink PDCP duplication function, the activation of a downlink PDCP duplication function or the activation of PDCP duplication function in a default direction (in uplink, in downlink or in both uplink and downlink). Here, the activation order is not restricted. It is possible to activate the PDCP duplication function on the gNB-DU side, followed by the PDCP duplication function on the UE side; or, it is possible to activate the PDCP duplication function on the UE side, followed by the PDCP duplication function on the gNB-DU side; or, it is also possible to simultaneously activate the PDCP duplication function on the gNB-DU side and the PDCP duplication function on the UE side. In addition, optionally, upon receiving the activation information transmitted by the gNB-CU, the gNB-DU may reply whether the activation is successful. If the activation being successful is replied, the PDCP duplication function on the gNB-DU side is activated; or otherwise, the PDCP duplication function on the gNB-DU side is not activated. Further, after the PDCP duplication function is activated, the gNB-CU may also transmit deactivation information to the gNB-DU and/or the UE. Optionally, the gNB-DU may reply whether the deactivation is successful. If the deactivation is successful, the PDCP duplication function is stopped on the gNB-DU side; or otherwise, the PDCP duplication function is used continuously.

Way 2: The gNB-DU activates the PDCP duplication function of the data radio bearer on the UE side. The gNB-DU transmits PDCP duplication function activation information to a UE. Then, the PDCP duplication function of the data radio bearer is activated on the UE side, and data of the data radio bearer will be transmitted according to the received RRC configuration message.

It is indicated that the PDCP duplication function of the data radio bearer has been activated on the gNB-DU side and the UE side, if the step C has been executed, and step D will be executed. There are two possibilities, if the step C has not been executed: 1) after the steps A and B have ended, the PDCP duplication function of the data radio bearer has been activated on the gNB-DU side and the UE side (the activation on the UE side has been realized by an individual signaling), and step D will be executed in this case; and, 2) after the steps A and B have ended, the configuration of the PDCP duplication function has been completed on the gNB-DU side and the UE side but this function has not been activated, and step E will be executed in this case.

Step D: Data of the data radio bearer having the activated PDCP duplication function is transmitted. This step is performed after the PDCP duplication function of the data radio bearer has been activated (that is, data of the data radio bearer will be transmitted between the gNB-DU and the UE according to the configuration of the corresponding PDCP duplication function). This step includes the following sub-steps, if the data radio bearer is downlink.

Substep D-a (downlink): The gNB-CU generates PDCP PDUs of the data radio bearer, but does not duplicate each PDCP PDU.

Substep D-b (downlink): The PDCP PDUs obtained in the substep D-a (downlink) are transmitted to the gNB-DU through a tunnel on the F1 interface. In another way, for the data radio bearer supporting the PDCP duplication function, its data can be transmitted on the F1 interface by an SCTP/RUDP (Reliable UDP) protocol, or transmitted by a control plane message of the F1 interface.

Substep D-c (downlink): The gNB-DU duplicates each received PDCP PDU to obtain two identical PDCP PDUs and then transmits the two identical PDCP PDUs to two different RLC entities (e.g., RLC1 and RLC2), respectively, or the gNB-DU transmits each received PDCP PDU for two times to two different RLC entities (e.g., RLC1 and RLC2); then, the two identical PDCP PDUs are transmitted to an MAC layer through two different logic channels (e.g., a logic channel 1 and a logic channel 2); and, the MAC layer transmits, by physical layers of two different cells, the data from the two different logic channels to two different cells (e.g., a cell 1 and a cell 2, where the two cells may be at different frequencies or at identical frequencies).

This step includes the following substeps, if the data radio bearer is uplink.

Substep D-a (uplink): The gNB-DU receives data from two different cells (e.g., a cell 1 and a cell 2, where the two cells may be at different frequencies or at identical frequencies), and the data from the two different cells are processed by a physical layer and an MAC layer and then transmitted to two different RLC entities (e.g., RLC1 and RLC2) via two different logic channels (e.g., a logic channel 1 and a logic channel 2), respectively.

Substep D-b (uplink): The data processed by the two RLC entities will be transmitted to the gNB-CU through a tunnel on the F1 interface; or, one PDCP PDU is discarded, and the remaining PDCP PDU is transmitted to the gNB-CU through a tunnel on the F1 interface, if the gNB-DU finds two identical PDCP PDUs in the data output from the RLC entities (the gNB-DU can identify whether two PDCP PDUs output from the RLC entities are identical).

Substep D-c (uplink): The gNB-CU processes the received PDCP PDUs (e.g., discarding the duplicated PDCP PDU) by a PDCP layer to obtain a PDCP SDU.

Step E: Data of the data radio bearer configured with the PDCP duplication function which has not been activated is transmitted. For the downlink data transmission, implementations may be as follows.

Way 1: The gNB-CU transmits, by a tunnel on the F1 interface, a PDCP PDU of the data radio bearer to the gNB-DU, the gNB-DU transmits the PDU to the specified RLC entity (e.g., the main RLC entity or default RLC entity), and the PDCP PDU is transmitted to an MAC layer via a logic channel corresponding to the specified RLC entity and then transmitted to a user via a cell, if an RLC entity (e.g., the main RLC entity or default RLC entity) to be used when the PDCP duplication function is configured but not activated has been specified in the step A and/or B.

Way 2: The gNB-CU transmits a PDCP PDU of the data radio bearer to the gNB-DU through a tunnel, the gNB-DU autonomously selects a configured RLC entity, and the PDCP PDU is transmitted to an MAC layer via a logic channel corresponding to this RLC entity and then transmitted to a user via a cell, if an RLC entity to be used when the PDCP duplication function is configured but not activated has not been specified in the step A and/or B.

For the uplink data transmission, implementations may be as follows.

Way 1: The gNB-DU transmits, via a specified logic channel (the specified logic channel corresponds to the specified RLC entity) and to the specified RLC entity (e.g., the main RLC entity or default RLC entity), the data of the data radio bearer which is received from a cell and processed by a physical layer and an MAC layer, and the processed PDCP PDU is transmitted to the gNB-CU by a tunnel on the F1 interface and then processed by a PDCP layer to obtain a PDCP SDU, if an RLC entity (e.g., the main RLC entity or default RLC entity) to be used when the PDCP duplication function is configured but not activated has been specified in the step A and/or B.

Way 2: The gNB-DU transmits, via a logic channel and to a corresponding RLC entity (the logic channel and the RLC entity are autonomously determined by the gNB-DU), the data of the data radio bearer which is received from a cell and processed by a physical layer and an MAC layer, and the processed PDCP PDU is transmitted to the gNB-CU through a tunnel on the F1 interface by the gNB-DU and then processed by a PDCP layer to obtain a PDCP SDU, if an RLC entity to be used when the PDCP duplication function is configured but not activated has not been specified in the step A and/or B.

The message names in the steps A and B are merely exemplary, and the involved configuration information may be carried in other messages for transmission, for example, a UE context setup request and a UE context setup response, a bearer setup request and a bearer setup response, a DL RRC message transfer and a UL RRC message transfer, or the like.

In addition, the existing configuration of the data radio bearer can be modified by the steps A and B. In order to improve the reliability of data transmission of this data radio bearer, it is required to configure the data radio bearer as a data radio bearer supporting the PDCP duplication function, if the data radio bearer has been configured as an ordinary bearer which does not support the PDCP duplication function. In this case, the configuration of this data radio bearer can be modified by the steps A and B, that is, the configuration messages in the steps A and B are transmitted by a bearer modification request and a bearer modification response. In another way, in the steps A and B, only the newly added information or the configuration information to be modified is contained. For example, when this data radio bearer does not support the PDCP duplication function, the following information has been configured:

configuration information of the RLC entity 1;
identifier information and/or configuration information of a logic channel corresponding to the RLC entity 1; and
gNB-CU side and gNB-DU side tunnel information of a tunnel on the F1 interface established for the data radio bearer.

When the data radio bearer will be configured as a data radio bearer supporting the PDCP duplication function, based on the existing configuration information, the modified existing configuration information and the newly added information will be transmitted to the gNB-DU in the step A. For example, the modified existing configuration information includes:

updated part of the configuration information of the RLC entity 1, for example, added indication information for indicating whether the entity is a main RLC entity; and
updated part of the configuration information of the logic channel corresponding to the RLC entity 1, for example, added restriction information for mapping the logic channel.

The newly added information includes:

configuration information of the RLC entity 2; and
identifier information and/or configuration information of a logic channel corresponding to the RLC entity 2.

In this embodiment, a Signaling Radio Bearer (SRB, e.g., SRB1/SRB1S, SRB2/SRB2S, SRB3 and the like) is configured with a PDCP duplication function, and in a gNB-DU, two RLC entities and a logic channel identifier and/or configuration corresponding to each RLC entity are configured for the signaling radio bearer. For downlink transmission, a PDCP layer on a gNB-CU duplicates each PDCP PDU of the signaling radio bearer to obtain two identical PDCP PDUs or transmits each PDCP PDU for two times to obtain two identical PDCP PDUs, and the two identical PDCP PDUs are transmitted to the gNB-DU by the F1 control plane message (F1-C message); and, the gNB-DU transmits, to two configured RLC entities, the received two identical PDCP PDUs of a same signaling radio bearer. In this embodiment, the method includes the following steps.

Step A: A gNB-CU transmits, to a gNB-DU, a request message of configuring a signaling radio bearer supporting a PDCP duplication function, wherein the message at least contains one or more pieces of the following information.

1) Information indicating the support of the PDCP duplication function, wherein possible implementations are as follows:

way 1: indication information of supporting the PDCP duplication function, wherein the indication information indicates that the signaling radio bearer supports the PDCP duplication function;
way 2: type information of the signaling radio bearer, wherein the type information indicates that the signaling radio bearer is a signaling radio bearer supporting the PDCP duplication function; and
way 3: identifier information of the signaling radio bearer, wherein one or more identifiers of the signaling radio bearer supporting the PDCP duplication function are predefined or preconfigured, and the signaling radio bearer supports the PDCP duplication function if the identifier of the signaling radio bearer indicates that the signaling radio bearer is a signaling radio bearer supporting the PDCP duplication function.

Further, the information indicating the support of the PDCP duplication function may further include indication information of uplink/downlink. The indication information indicates the support of the PDCP duplication function in uplink, or the support of the PDCP duplication function in downlink, or the support of the PDCP duplication function in both uplink and the downlink. If the indication information of uplink/downlink is not included, the information indicating the support of the PDCP duplication function may indicate the support of the PDCP duplication function in both uplink and downlink, the support of the PDCP duplication function in downlink, the support of the PDCP duplication function in uplink, or the support of the PDCP duplication function in a default direction (in uplink, in downlink or in both uplink and downlink).

2) Part or all of configuration information of at least one RLC entity corresponding to the signaling radio bearer. The signaling radio bearer supporting the PDCP duplication function will have two RLC entities, but the configuration information can contain part or all of configuration information of one RLC entity or contain part or all of configuration information of two RLC entities (it is indicated that the configuration information not contained in the configuration message can reuse the existing configuration, if only part of configuration information is contained in the configuration information). For example, in a situation where the configuration information of one RLC entity is contained, it is indicated that the existing configuration information of the RLC entity of the signaling radio bearer can be reused and the contained configuration information of the RLC entity is specific to a newly added RLC entity. In a situation where the configuration information of two RLC entities is contained, the newly received configuration information of the two RLC entities can cover the existing information, if the gNB-DU already has configuration information of at least one RLC entity of the signaling radio bearer; and, the gNB-DU directly uses the newly received configuration information of the two RLC entities, if the gNB-DU does not have any information of RLC entities corresponding to the signaling radio bearer. In addition, the configuration information of each RLC entity may contain indication information for indicating whether the RLC entity is a main RLC entity (or referred to as a default RLC entity) (it is possible to not contain the indication information, if an RLC entity is not configured as a main RLC entity; in another way, a main RLC entity does not contain indication information, while a non-main RLC entity will contain one piece of indication information to indicate that this RLC entity is a non-main RLC entity). The indication information may be optional or mandatory. The indication information has the following functions: for the downlink data transmission, the indication message is used for indicating how the gNB-DU distributes the received PDCP PDU to two RLC entities configured for the signaling radio bearer; while for the uplink data transmission, the indication message is used for indicating how the gNB-DU distributes, to two RLC entities configured for the signaling radio bearer, data of the signaling radio bearer received from different cells. The indication information can indicate a RLC entity (e.g., a main RLC entity) to be used by the gNB-DU when only one RLC entity needs to be used. For example, for downlink data, the PDCP PDU of the signaling radio bearer received from the gNB-CU is transmitted to only the main RLC entity, if an RLC entity is indicated as a main RLC entity, and when the signaling radio bearer is configured to support a PDCP duplication function and this function has not been activated; while for uplink data, all data of the signaling radio bearer received by the gNB-DU is transmitted to the main RLC entity. For another example, when the signaling radio bearer is configured to support a PDCP duplication function and this function has been activated, for downlink data, the gNB-DU transmits the PDCP PDU to the main RLC entity, if the gNB-DU receives a PDCP PDU of the signaling radio bearer from the gNB-CU for the first time; and the gNB-DU transmits the PDCP PDU to the other RLC entity (the non-main RLC entity), if the gNB-DU receives a PDCP PDU of the signaling radio bearer from the gNB-CU for the second time.

3) Identifier information and/or configuration information of a logic channel corresponding to at least one configured RLC entity for the signaling radio bearer, wherein the configuration information contains restriction information for mapping the logic channel to indicate that the data of this logic channel can be transmitted to only a cell or a carrier indicated by the restriction information; or, restriction information of a mapping corresponding to at least one configured RLC entity, for example, data from an RLC entity 1 being transmitted to a cell 1 or a carrier 1 indicated by the restriction information, data from an RLC entity 2 being transmitted to a cell 2 or a carrier 2 indicated by the restriction information.

4) Indication information for assisting the gNB-DU in identifying whether to transmit PDCP PDUs of a same signaling radio bearer to different RLC entities, wherein the indication information indicates the gNB-DU that two PDCP PDUs of the signaling radio bearer received from the F1 interface should be transmitted to different RLC entities.

Step B: The gNB-DU executes the related configuration, and the gNB-DU feeds back, to the gNB-CU, a response message of configuring the signaling radio bearer supporting the PDCP duplication function in order to indicate whether the gNB-DU accepts the configuration of the signaling radio bearer in the step A, if the gNB-DU accepts the configuration of the signaling radio bearer in the step A. This response message is optional.

Step C: The PDCP duplication function is activated. This step is optional. This step includes activation of the PDCP duplication function on the gNB-CU side, the gNB-DU side and the UE side. Possible implementations are as follows.

Way 1: The gNB-CU activates the PDCP duplication function of the signaling radio bearer on the gNB-DU side and/or the UE side. The gNB-CU transmits PDCP duplication function activation information to the gNB-DU and/or a UE. Then, the PDCP duplication function of the signaling radio bearer is activated on the gNB-DU side, and data of the signaling radio bearer will be transmitted according to the configuration information in the steps A and B; and, the PDCP duplication function of the signaling radio bearer is also activated on the UE side, and data of the signaling radio bearer will be transmitted according to the received RRC configuration message. Further, the activation information may indicate the activation of an uplink PDCP duplication function, the activation of a downlink PDCP duplication function or the activation of uplink and downlink PDCP duplication functions. If there is no indication information in the activation information, the activation information indicates the activation of uplink and downlink PDCP duplication functions, the activation of an uplink PDCP duplication function, the activation of a downlink PDCP duplication function or the activation of PDCP duplication function in a default direction (in uplink, in downlink or in both uplink and downlink). Here, the activation order is not restricted. It is possible to activate the PDCP duplication function on the gNB-DU side, followed by the PDCP duplication function on the UE side; or, it is possible to activate the PDCP duplication function on the UE side, followed by the PDCP duplication function on the gNB-DU side; or, it is also possible to simultaneously activate the PDCP duplication function on the gNB-DU side and the PDCP duplication function on the UE side. In addition, optionally, upon receiving the activation information transmitted by the gNB-CU, the gNB-DU may reply whether the activation is successful. If the activation being successful is replied, the PDCP duplication function on the gNB-DU side is activated; or otherwise, the PDCP duplication function on the gNB-DU side is not activated. Further, after the PDCP duplication function is activated, the gNB-CU may also transmit deactivation information to the gNB-DU and/or the UE. Optionally, the gNB-DU may reply whether the deactivation is successful. If the deactivation being successful is replied, the PDCP duplication function is stopped on the gNB-DU side; or otherwise, the PDCP duplication function is used continuously.

Way 2: The gNB-DU activates the PDCP duplication function of the signaling radio bearer on the gNB-CU side and/or the UE side. The gNB-DU transmits PDCP duplication function activation information to the gNB-CU and/or the UE. Then, the PDCP duplication function of the signaling radio bearer is activated on the gNB-CU side, and data of the signaling radio bearer will be transmitted according to the configuration information in the steps A and B (a duplicated PDCP PDU is transmitted to the gNB-DU through the F1 interface or a duplicated PDCP PDU transmitted by the gNB-DU is received through the F1 interface); and, the PDCP duplication function of the signaling radio bearer is also activated on the UE side, and data of the signaling radio bearer will be transmitted according to the received RRC configuration information. Further, the activation information may indicate the activation of an uplink PDCP duplication function, the activation of a downlink PDCP duplication function or the activation of uplink and downlink PDCP duplication functions. If there is no indication information in the activation information, the activation information indicates the activation of uplink and downlink PDCP duplication functions, the activation of an uplink PDCP duplication function, the activation of a downlink PDCP duplication function or the activation of PDCP duplication function in a default direction (in uplink, in downlink or in both uplink and downlink). Here, the activation order is not restricted. It is possible to activate the PDCP duplication function on the gNB-CU side, followed by the PDCP duplication function on the UE side; or, it is possible to activate the PDCP duplication function on the UE side, followed by the PDCP duplication function on the gNB-CU side; or, it is also possible to simultaneously activate the PDCP duplication function on the gNB-CU side and the PDCP duplication function on the UE side. In addition, optionally, upon receiving the activation information transmitted by the gNB-DU, the gNB-CU may reply whether the activation is successful. If the activation being successful is replied, the PDCP duplication function on the gNB-CU side is activated; or otherwise, the PDCP duplication function on the gNB-CU side is not activated. Further, after the PDCP duplication function is activated, the gNB-DU may also transmit deactivation information to the gNB-CU and/or the UE. Optionally, the gNB-CU may reply whether the deactivation is successful. If the deactivation being successful is replied, the PDCP duplication function is stopped on the gNB-CU side; or otherwise, the PDCP duplication function is used continuously.

It is indicated that the PDCP duplication function of the signaling radio bearer has been activated on the gNB-CU side, the gNB-DU side and the UE side, if the step C has been executed, and step D will be executed. There are two possibilities, if the step C has not been executed: 1) after the steps A and B have ended, the PDCP duplication function of the signaling radio bearer has been activated on the gNB-CU side, the gNB-DU side and the UE side (the activation on the UE side has been realized by an individual signaling), and step D will be executed in this case; and, 2) after the steps A and B have ended, the configuration of the PDCP duplication function has been completed on gNB-CU side, the gNB-DU side and the UE side but this function has not been activated, and step E will be executed in this case.

Step D: Data of the signaling radio bearer having the activated PDCP duplication function is transmitted by an F1-C message. This step is performed after the PDCP duplication function of the signaling radio bearer has been activated (that is, data of the signaling radio bearer will be transmitted among the gNB-CU, the gNB-DU and the UE according to the configuration of the corresponding PDCP duplication function). this step includes the following sub-steps, if the signaling radio bearer is downlink:

Sub step D-a (downlink): The gNB-CU duplicates a PDCP PDU of the signaling radio bearer to obtain two identical PDCP PDUs or transmits a PDCP PDU of the signaling radio bearer for two times to obtain two identical PDCP PDUs.

Substep D-b (downlink): The two identical PDCP PDUs obtained in the substep D-a (downlink) are transmitted to the gNB-DU by a control plane message on the F1 interface (an F1-C message). Possible implementations are as follows.

Way 1: The two identical PDCP PDUs of the signaling radio bearer are carried in an F1-C message (e.g., RRC MESSAGE TRANSFER). Optionally, the F1-C message further indicates the gNB-DU to transmit the two PDCP PDUs to different RLC entities or transmit the two PDCP PDUs by different logic channels or transmit the two PDCP PDUs by different cells, or indicates the gNB-DU to respectively transmit the two PDCP PDUs to specified RLC entities or transmit the two PDCP PDUs by specified logic channels or transmit the two PDCP PDUs by specified cells.

Way 2: The two identical PDCP PDUs of the signaling radio bearer are carried in two F1-C messages (e.g., RRC MESSAGE TRANSFER). Each message contains a piece of indication information for assisting the gNB-DU in identifying that the PDCP PDUs from the two F1-C messages should be transmitted to different RLC entities. For example, the indication information contained in each F1-C message indicates that the PDCP PDU of the signaling radio bearer contained in this F1-C message should be transmitted to which RLC entity or transmitted by which logic channel or transmitted by which cell, or indicates whether the PDCP PDU of the signaling radio bearer contained in this F1-C message is a duplicated PDU (a non-original PDCP PDU), or indicates whether the PDCP PDU of the signaling radio bearer contained in this F1-C message is an original PDCP PDU (a non-duplicated PDCP PDU); or, two pieces of indication information contained in the two F1-C messages indicate that the PDCP PDUs of the signaling radio bearer contained in the two F1-C messages should be transmitted to different RLC entities. As another implementation, one piece of indication information for assisting in identifying whether the PDCP PDU of the signaling radio bearer contained in one message is identical to the PDCP PDU of the same signaling radio bearer contained in the other message is added into each F1-C message. Possible indications are as follows: a sequence number is assigned to the PDCP PDU of a signaling radio bearer contained in each F1-C message; it is indicated that the two PDCP PDUs contained in the two messages are two identical PDUs of a same signaling radio bearer, if a same sequence number is contained in the two messages; or, it is indicated that the two PDCP PDUs contained in the two messages are two identical PDUs of a same signaling radio bearer, if there are two F1-C messages, one of which contains an odd number (or an even number) while the other one of which contains an even number (or an odd number) that is 1 greater than the odd number (or the even number). As still another implementation, a new F1-C message is defined. This message is specially used for transmitting duplicated PDCP PDUs. For example, an original PDCP PDU will be transmitted for two times after it has been duplicated, specifically, the original PDCP PDU is transmitted on the F1 interface by the RRC MESSAGE TRANSFER for one time, and the original PDCP PDU is transmitted by the newly defined F1-C message (e.g., RRC MESSAGE COPY TRANSFER) for another time. In this way, in the gNB-DU, the PDCP PDUs transmitted by the RRC MESSAGE TRANSFER and the RRC MESSAGE COPY TRANSFER need to be transmitted by different RLC entities and different cells.

Substep D-c (downlink): The gNB-DU transmits the received two identical PDCP PDUs of the same signaling radio bearer to two different RLC entities (e.g., RLC1 and RLC2), the two identical PDCP PDUs are then transmitted to an MAC layer by a logic channel or two different logic channels (e.g., a logic channel 1 and a logic channel 2), and the MAC layer transmits, by physical layers of two different cells, data from a logic channel or the two different logic channels to two different cells (e.g., a cell 1 and a cell 2, where the two cells may be at different frequencies or at identical frequencies), respectively. In this step, the gNB-DU may receive two identical PDCP PDUs of a same signaling radio bearer. On how the gNB-DU distributes the received data to two RLC entities, possible implementations are as follows.

Way 1: The implementation is determined by gNB-DU according to the existing configuration. For example, the gNB-DU transmits the received PDCP PDUs of the signaling radio bearer to a specific RLC entity, or transmits the received PDCP PDUs by a specified logic channel, or transmits the received PDCP PDUs to a specified cell, according to the indication message in the F1-C message in the substep D-b (downlink). As another example, for two identical PDCP PDUs, the first received PDU will be transmitted to a specific RLC entity (e.g., RLC1) by the gNB-DU, wherein the specific RLC entity may be the configured main RLC entity (or the default RLC entity); while the second received PDU will be transmitted to the other RLC entity (the non-main RLC entity) by the gNB-DU.

Way 2: The implementation is set by the gNB-DU autonomously. As an implementation, the gNB-DU autonomously transmits the two PDCP PDUs to two different RLC entities, if the gNB-DU has identified that the two PDCP PDUs of the signaling radio bearer need to be transmitted to different RLC entities. As another implementation, for two identical PDCP PDUs, the first received PDCP PDU is transmitted to the RLC1, and the second received PDCP PDU is transmitted to the RLC2. As still another implementation, once the gNB-DU receives a data packet (e.g., PDCP PDU1), the gNB-DU autonomously duplicates this data packet to obtain two identical data packets and then transmits the two identical data packets to two RLC entities (RLC1 and RLC2), respectively, or the gNB-DU transmits this data packet for two times to obtain two identical data packets and then transmits the two identical data packets to two different RLC entities, respectively. Hereafter, the gNB-DU may discard this data packet since this data packet has been transmitted to different RLC entities, if the gNB-DU receives an identical data packet (e.g., PDCP PDU1) again; or, the gNB-DU may duplicate this data packet to obtain two identical data packets and then transmit the two identical data packets to two RLC entities (RLC1 and RLC2), respectively, or may transmit this data packet for two times to obtain two identical data packets and then transmit the two identical data packets to two different RLC entities, respectively.

This step includes the following substeps, if the signaling radio bearer is uplink.

Substep D-a (uplink): The gNB-DU receives data from two different cells (e.g., a cell 1 and a cell 2, where the two cells may be at different frequencies or at identical frequencies) respectively, and the data from the two different cells are processed by a physical layer and an MAC layer and then transmitted to two different RLC entities (e.g., RLC1 and RLC2) by a logic channel or two different logic channels (e.g., a logic channel 1 and a logic channel 2), respectively.

Substep D-b (uplink): The data processed by the two RLC entities will be transmitted to the gNB-CU by an F1-C message (the data may be carried in a same F1-C message or carried in different F1-C message; or, it is also possible to discard one of two identical PDCP PDUs and transmit the remaining PDCP PDU to the gNB-CU by an F1-C message).

Substep D-c (uplink): The gNB-CU processes the received PDCP PDUs (e.g., discards a duplicated PDCP PDU) by a PDCP layer to obtain a PDCP SDU.

Step E: Data of the signaling radio bearer configured with the PDCP duplication function which has not been activated is transmitted. For the downlink data transmission, implementations may be as follows.

Way 1: The gNB-CU transmits, by an F1-C message, a PDCP PDU of the signaling radio bearer to the specified RLC entity (e.g., the main RLC entity or default RLC entity), and the PDCP PDU is transmitted to an MAC layer via a logic channel corresponding to the specified RLC entity and then transmitted to a user via a cell, if an RLC entity (e.g., the main RLC entity or default RLC entity) to be used when the PDCP duplication function is configured but not activated has been specified in the step A and/or B.

Way 2: The gNB-CU transmits a PDCP PDU of the signaling radio bearer to the gNB-DU by an F1-C message, the gNB-DU autonomously selects a configured RLC entity, and the PDCP PDU is transmitted to an MAC layer via a logic channel corresponding to this RLC entity and then transmitted to a user via a cell, if an RLC entity to be used when the PDCP duplication function is configured but not activated has not been specified in the step A and/or B.

For the uplink data transmission, implementations may be as follows.

Way 1: The gNB-DU transmits, via a specified logic channel (the specified logic channel corresponds to the specified RLC entity) and to the specified RLC entity (e.g., the main RLC entity or default RLC entity), the data of the signaling radio bearer which is received from a cell and processed by a physical layer and an MAC layer, and the processed PDCP PDU is transmitted to the gNB-CU by an F1-C message and then processed by a PDCP layer to obtain a PDCP SDU, if an RLC entity (e.g., the main RLC entity or default RLC entity) to be used when the PDCP duplication function is configured but not activated has been specified in the step A and/or B.

Way 2: The gNB-DU transmits, via a logic channel and to a corresponding RLC entity (the logic channel and the RLC entity are autonomously determined by the gNB-DU), the data of the signaling radio bearer which is received from a cell and processed by a physical layer and an MAC layer, and the processed PDCP PDU is transmitted to the gNB-CU through an F1-C message by the gNB-DU and then processed by a PDCP layer to obtain a PDCP SDU, if an RLC entity to be used when the PDCP duplication function is configured but not activated has not been specified in the step A and/or B.

The message names in the steps A and B are merely exemplary, and may be other messages as well.

In addition, the existing configuration of the signaling radio bearer can be modified by the steps A and B. In order to improve the reliability of data transmission of this signaling radio bearer, it is required to configure the signaling radio bearer as a signaling radio bearer supporting the PDCP duplication function, if the signaling radio bearer has been configured as an ordinary bearer which does not support the PDCP duplication function. In this case, the configuration of this signaling radio bearer can be modified by the steps A and B. In another way, in the steps A and B, only the newly added information or the configuration information to be modified is contained. For example, when this signaling radio bearer does not support the PDCP duplication function, the following information has been configured:

configuration information of the RLC entity 1; and
identifier information and/or configuration information of a logic channel corresponding to the RLC entity 1.

When the signaling radio bearer will be configured as a signaling radio bearer supporting the PDCP duplication function, based on the existing configuration information, the modified existing configuration information and the newly added information will be transmitted to the gNB-DU in the step A. For example, the modified existing configuration information includes: updated part of the configuration information of the RLC entity 1, for example, added indication information for indicating whether the entity is a main RLC entity; and updated part of the configuration information of the logic channel corresponding to the RLC entity 1, for example, added restriction information for mapping the logic channel.

The newly added information includes:
configuration information of the RLC entity 2; and
identifier information and/or configuration information of a logic channel corresponding to the RLC entity 2.

In this embodiment, a Signaling Radio Bearer (SRB, e.g., SRB1/SRB1S, SRB2/SRB2S, SRB3 and the like) is configured with a PDCP duplication function, and in a DU, two RLC entities and an identifier and/or configuration of a logic channel corresponding to each RLC entity are configured for this signaling radio bearer. For downlink transmission, a CU transmits each PDCP PDU of the signaling radio bearer to the DU through an F1 control plane message (the CU does not duplicate the PDCP PDU), and the DU duplicates the received PDCP PDU of the signaling radio bearer and then transmits the PDCP PDU to the two configured RLC entities, or transmits the PDCP PDU for the two times to the two configured RLC entities respectively. In this embodiment, the method includes the following steps.

Step A: A gNB-CU transmits, to a gNB-DU, a request message of configuring a signaling radio bearer supporting a PDCP duplication function, wherein the message at least contains one or more pieces of the following information.

1) Information indicating the support of the PDCP duplication function, wherein possible implementations are as follows:

way 1: indication information of supporting the PDCP duplication function, wherein the indication information indicates that the signaling radio bearer supports the PDCP duplication function;

way 2: type information of the signaling radio bearer, wherein the type information indicates that the signaling radio bearer is a signaling radio bearer supporting the PDCP duplication function; and way 3: identifier information of the signaling radio bearer, wherein one or more identifiers of the signaling radio bearer supporting the PDCP duplication function are predefined or preconfigured, and the signaling radio bearer supports the PDCP duplication function if the identifier of the signaling radio bearer indicates that the signaling radio bearer is a signaling radio bearer supporting the PDCP duplication function.

Further, the information indicating the support of the PDCP duplication function may further include indication information of uplink/downlink. The indication information indicates the support of the PDCP duplication function in uplink, or the support of the PDCP duplication function in downlink, or the support of the PDCP duplication function in both uplink and the downlink. If the indication information of uplink/downlink is not included, the information indicating the support of the PDCP duplication function may indicate the support of the PDCP duplication function in both uplink and downlink, the support of the PDCP duplication function in downlink, the support of the PDCP duplication function in uplink, or the support of the PDCP duplication function in a default direction (in uplink, in downlink or in both uplink and downlink).

2) Part or all of configuration information of at least one RLC entity corresponding to the signaling radio bearer. The signaling radio bearer supporting the PDCP duplication function will have two RLC entities, but the configuration message can contain part or all of configuration information of one RLC entity or contain part or all of configuration information of two RLC entities (it is indicated that the configuration information not contained in the configuration message can reuse the existing configuration, if only part of configuration information is contained in the configuration message). For example, in a situation where the configuration information of one RLC entity is contained, it is indicated that the existing configuration information of the RLC entity of the signaling radio bearer can be reused and the contained configuration information of the RLC entity is specific to a newly added RLC entity. In a situation where the configuration information of two RLC entities is contained, the newly received configuration information of the two RLC entities can cover the existing information, if the gNB-DU already has configuration information of at least one RLC entity of the signaling radio bearer; and, the gNB-DU directly uses the newly received configuration information of the two RLC entities, if the gNB-DU does not have any information of RLC entities corresponding to the signaling radio bearer. In addition, the configuration information of each RLC entity may contain indication information for indicating whether the RLC entity is a main RLC entity (or referred to as a default RLC entity) (it is possible to not contain the indication information, if an RLC entity is not configured as a main RLC entity; in another way, a main RLC entity does not contain indication information, while a non-main RLC entity will contain one piece of indication information for indicating that this RLC entity is a non-main RLC entity). The indication information may be optional or mandatory. The indication information has the following functions: for the downlink data transmission, the indication message is used for indicating how the gNB-DU distributes the received PDCP PDU to two RLC entities configured for the signaling radio bearer; while for the uplink data transmission, the indication message is used for indicating how the gNB-DU distributes, to two RLC entities configured for the signaling radio bearer, data belonging to the signaling radio bearer received from different cells. The indication information can indicate a RLC entity (e.g., a main RLC entity) to be used by the gNB-DU when only one RLC entity needs to be used. For example, for downlink data, the PDCP PDU belonging to the signaling radio bearer received from the gNB-CU is transmitted to only the main RLC entity, if an RLC entity is indicated as a main RLC entity, and when the signaling radio bearer is configured to support a PDCP duplication function and this function has not been activated; while for uplink data, all data belonging to the signaling radio bearer received by the gNB-DU is transmitted to the main RLC entity. For another example, when the signaling radio bearer is configured to support a PDCP duplication function and this function has been activated, for downlink data, the gNB-DU transmits the PDCP PDU to the main RLC entity, if the gNB-DU receives a PDCP PDU belonging to the signaling radio bearer from the gNB-CU for the first time; and the gNB-DU transmits the PDCP PDU to the other RLC entity (the non-main RLC entity), if the gNB-DU receives a PDCP PDU belonging to the signaling radio bearer from the gNB-CU for the second time.

3) Identifier information and/or configuration information of a logic channel corresponding to at least one configured RLC entity for the signaling radio bearer, wherein the configuration information contains restriction information for mapping the logic channel to indicate that the data of this logic channel can be transmitted to only a cell or a carrier indicated by the restriction information; or, restriction information of a mapping corresponding to at least one configured RLC entity, for example, data from an RLC entity 1 being transmitted to a cell 1 or a carrier 1 indicated by the restriction information, data from an RLC entity 2 being transmitted to a cell 2 or a carrier 2 indicated by the restriction information.

Step B: The gNB-DU executes the related configuration, and the gNB-DU feeds back, to the gNB-CU, a response message of configuring the signaling radio bearer supporting the PDCP duplication function in order to indicate whether the gNB-DU accepts the configuration of the signaling radio bearer in the step A, if the gNB-DU accepts the configuration of the signaling radio bearer in the step A. This response message is optional.

Step C: The PDCP duplication function is activated. This step is optional. This step includes activation of the PDCP duplication function on the gNB-DU side and the UE side. Possible implementations are as follows.

Way 1: The gNB-CU activates the PDCP duplication function of the signaling radio bearer on the gNB-DU side and/or the UE side. The gNB-CU transmits PDCP duplication function activation information to the gNB-DU and/or a UE. Then, the PDCP duplication function of the signaling radio bearer is activated on the gNB-DU side, and data of the signaling radio bearer will be transmitted according to the configuration information in the steps A and B; and, the PDCP duplication function of the signaling radio bearer is also activated on the UE side, and data of the signaling radio bearer will be transmitted according to the received RRC configuration message. Further, the activation information may indicate the activation of an uplink PDCP duplication function, the activation of a downlink PDCP duplication function or the activation of uplink and downlink PDCPPDCP duplication functions. If there is no indication information in the activation information, the activation information indicates the activation of uplink and downlink PDCPPDCP duplication functions, the activation of an uplink PDCP duplication function, the activation of a downlink PDCP duplication function or the activation of PDCP duplication function in a default direction (in uplink, in downlink or in both uplink and downlink). Here, the activation order is not restricted. It is possible to activate the PDCP duplication function on the gNB-DU side, followed by the PDCP duplication function on the UE side; or, it is possible to activate the PDCP duplication function on the UE side, followed by the PDCP duplication function on the gNB-DU side; or, it is also possible to simultaneously activate the PDCP duplication function on the gNB-DU side and the PDCP duplication function on the UE side. In addition, optionally, upon receiving the activation information transmitted by the gNB-CU, the gNB-DU may reply whether the activation is successful. If the activation being successful is replied, the PDCP duplication function on the gNB-DU side is activated; or otherwise, the PDCP duplication function on the gNB-DU side is not activated. Further, after the PDCP duplication function is activated, the gNB-CU may also transmit deactivation information to the gNB-DU and/or the UE. Optionally, the gNB-DU may reply whether the deactivation is successful. If the deactivation being successful is replied, the PDCP duplication function is stopped on the gNB-DU side; or otherwise, the PDCP duplication function is used continuously.

Way 2: The gNB-DU activates the PDCP duplication function of the signaling radio bearer on the UE side. The gNB-DU transmits PDCP duplication function activation information to a UE. Then, the PDCP duplication function of the signaling radio bearer is activated on the UE side, and data of the signaling radio bearer will be transmitted according to the received RRC configuration message.

It is indicated that the PDCP duplication function of the signaling radio bearer has been activated on the gNB-DU side and the UE side, if the step C has been executed, and step D will be executed. There are two possibilities, if the step C has not been executed: 1) after the steps A and B have ended, the PDCP duplication function of the signaling radio bearer has been activated on the gNB-DU side and the UE side (the activation on the UE side has been realized by an individual signaling), and step D will be executed in this case; and, 2) after the steps A and B have ended, the configuration of the PDCP duplication function has been completed on the gNB-DU side and the UE side but this function has not been activated, and step E will be executed in this case.

Step D: Data of the signaling radio bearer having the activated PDCP duplication function is transmitted by an F1-C message. This step is performed after the PDCP duplication function of the signaling radio bearer has been activated (that is, data of the signaling radio bearer will be transmitted between the gNB-DU and the UE according to the configuration of the corresponding PDCP duplication function). This step includes the following substeps, if the signaling radio bearer is downlink.

Substep D-a (downlink): The gNB-CU generates a PDCP PDU of the signaling radio bearer, but does not duplicate the PDCP PDU.

Substep D-b (downlink): The PDCP PDU obtained in the substep D-a (downlink) is transmitted to the gNB-DU by a control plane message on the F1 interface (an F1-C message).

Substep D-c (downlink): The gNB-DU duplicates the received PDCP PDU of the signaling radio bearer to obtain two identical PDUs and then transmits the two identical PDCP PDUs to two different RLC entities (e.g., RLC1 and RLC2), or the gNB-DU transmits the PDCP PDU for two times to two different RLC entities (e.g., RLC1 and RLC2) respectively; then, the two identical PDCP PDUs are transmitted to an MAC layer through a logic channel or two different logic channels (e.g., a logic channel 1 and a logic channel 2); and, the MAC layer transmits, by physical layers of two different cells, the data from the logic channel or the two different logic channels to two different cells (e.g., a cell 1 and a cell 2, where the two cells may be at different frequencies or at identical frequencies).

This step includes the following substeps, if the signaling radio bearer is uplink. Substep D-a (uplink): The gNB-DU receives data from two different cells (e.g., a cell 1 and a cell 2, where the two cells may be at different frequencies or at identical frequencies), and the data are processed by a physical layer and an MAC layer and then transmitted to two different RLC entities (e.g., RLC1 and RLC2) via a logic channel or two different logic channels (e.g., a logic channel 1 and a logic channel 2), respectively.

Substep D-b (uplink): The data processed by the two RLC entities will be transmitted to the gNB-CU by an F1-C message (the data may be carried in a same F1-C message or carried in different F1-C message; or, it is also possible to discard one of two identical PDCP PDUs and transmit the remaining PDCP PDU to the gNB-CU by an F1-C message).

Substep D-c (uplink): The gNB-CU processes the received PDCP PDUs (e.g., discarding a duplicated PDCP PDU) by a PDCP layer to obtain a PDCP SDU.

Step E: Data of the signaling radio bearer configured with the PDCP duplication function which has not been activated is transmitted. For the downlink data transmission, implementations may be as follows.

Way 1: The gNB-CU transmits, by an F1-C message, a PDCP PDU of the signaling radio bearer to the specified RLC entity (e.g., the main RLC entity or default RLC entity), and the PDCP PDU is transmitted to an MAC layer via a logic channel corresponding to the specified RLC entity and then transmitted to a user via a cell, if an RLC entity (e.g., the main RLC entity or default RLC entity) to be used when the PDCP duplication function is configured but not activated has been specified in the step A and/or B.

Way 2: The gNB-CU transmits a PDCP PDU of the signaling radio bearer to the gNB-DU by an F1-C message, the gNB-DU autonomously selects a configured RLC entity, and the PDCP PDU is transmitted to an MAC layer via a logic channel corresponding to this RLC entity and then transmitted to a user via a cell, if an RLC entity to be used when the PDCP duplication function is configured but not activated has not been specified in the step A and/or B.

For the uplink data transmission, implementations may be as follows.

Way 1: The gNB-DU transmits, via a specified logic channel (the specified logic channel corresponds to the specified RLC entity) and to the specified RLC entity (e.g., the main RLC entity or default RLC entity), the data of the signaling radio bearer which is received from a cell and processed by a physical layer and an MAC layer, and the processed PDCP PDU is transmitted to the gNB-CU by an F1-C message and then processed by a PDCP layer to obtain a PDCP SDU, if an RLC entity (e.g., the main RLC entity or default RLC entity) to be used when the PDCP duplication function is configured but not activated has been specified in the step A and/or B.

Way 2: The gNB-DU transmits, via a logic channel and to a corresponding RLC entity (the logic channel and the RLC entity are autonomously determined by the gNB-DU), the data of the signaling radio bearer which is received from a cell and processed by a physical layer and an MAC layer, and the processed PDCP PDU is transmitted to the gNB-CU through an F1-C message by the gNB-DU and then processed by a PDCP layer to obtain a PDCP SDU, if an RLC entity to be used when the PDCP duplication function is configured but not activated has not been specified in the step A and/or B.

The message names in the steps A and B are merely exemplary, and may be other messages as well.

In addition, the existing configuration of the signaling radio bearer can be modified by the steps A and B. In order to improve the reliability of data transmission of this signaling radio bearer, it is required to configure the signaling radio bearer as a signaling radio bearer supporting the PDCP duplication function, if the signaling radio bearer has been configured as an ordinary bearer which does not support the PDCP duplication function. In this case, the configuration of this signaling radio bearer can be modified by the steps A and B. In another way, in the steps A and B, only the newly added information or the configuration information to be modified is contained. For example, when this signaling radio bearer does not support the PDCP duplication function, the following information has been configured:

configuration information of the RLC entity 1; and identifier information and/or configuration information of a logic channel corresponding to the RLC entity 1.

When the signaling radio bearer will be configured as a signaling radio bearer supporting the PDCP duplication function, based on the existing configuration information, the modified existing configuration information and the newly added information will be transmitted to the gNB-DU in the step A. For example, the modified existing configuration information includes: updated part of the configuration information of the RLC entity 1, for example, added indication information for indicating whether the entity is a main RLC entity; and updated part of the configuration information of the logic channel corresponding to the RLC entity 1, for example, added restriction information for mapping the logic channel.

the newly added information includes:

configuration information of the RLC entity 2; and identifier information and/or configuration information of a logic channel corresponding to the RLC entity 2.

In the present disclosure, by an F1 interface between a gNB-CU and a gNB-DU, the transmission of duplicated PDCP PDUs between the gNB-CU and the gNB-DU is realized, and the reliability of data transmission is improved.

In the above embodiments, the transmission of a bearer supporting a PDCP duplication function on an F1 interface between a CU and a DU in a base station is mainly discussed; however, in an actual system, a bearer supporting a PDCP duplication function may also be transmitted on an interface (e.g., an X2 interface or an Xn interface) between two base stations (e.g., between an eNB and a gNB, between two eNBs, between two gNBs or the like).

For example, for a Data Radio Bearer (DRB) supporting a PDCP duplication function, a PDCP layer for transmitting data of this DRB is located in a base station 1, while other protocol layers (e.g., an RLC layer, an MAC layer and a PHY layer) for transmitting the data of this DRB are located in a base station 2. In order to support the transmission of the DRB between the base station 1 and the base station 2, the mechanisms described in Embodiments 1 to 3 may be applied between the base station 1 and the base station 2 (the interface between the two interfaces may be an X2 interface or an Xn interface). That is, the gNB-CU in the description of Embodiments 1 to 3 is replaced with the base station 1, the gNB-DU in the description of Embodiments 1 to 3 is replaced with the base station 2, and the F1 interface in the description of Embodiments 1 to 3 is replaced with the interface (e.g., an X2 interface or an Xn interface) between the base station 1 and the base station 2.

For example, for a Signaling Radio Bearer (SRB) supporting a PDCP duplication function, a PDCP layer for transmitting data of this SRB is located in a base station 1, while other protocol layers (e.g., an RLC layer, an MAC layer and a PHY layer) for transmitting the data of this SRB are located in a base station 2. In order to support the transmission of the SRB between the base station 1 and the base station 2, the mechanisms described in Embodiments 4 to 5 may be applied between the base station 1 and the base station 2 (the interface between the two interfaces may be an X2 interface or an Xn interface). That is, the gNB-CU in the description of Embodiments 4 to 5 is replaced with the base station 1, the gNB-DU in the description of Embodiments 4 to 5 is replaced with the base station 2, and the F1 interface in the description of Embodiments 4 to 5 is replaced with the interface (e.g., an X2 interface or an Xn interface) between the base station 1 and the base station 2.

The present disclosure further provides a system supporting a Packet Data Convergence Protocol (PDCP) duplication function, including a first station and a second station, or a central unit and a distributed unit in a base station.

The data packet of the radio bearer configured with the PDCP duplication function includes: a data packet of a data radio bearer configured with a PDCP duplication function and/or a data packet of a signaling radio bearer configured with a PDCP duplication function.

The SUL carrier configuration information mentioned in the present disclosure includes at least one of:
1. Identification information of a cell where the SUL carrier is located.
2. Identification information of a base station locating the cell where the SUL carrier is located.
3. Basic parameters of the SUL carrier (refer to FrequencyInfoUL in TS38.331), which include at least one of:
   1) a carrier frequency of the SUL carrier;
   2) a bandwidth of the SUL carrier; and
   3) an initial uplink bandwidth portion of the SUL carrier.
4. Signal strength threshold information of the SUL carrier, having the function that when a UE initially accesses a cell, if the measured signal strength (RSRP) of the cell is lower than the threshold, the UE may perform a random access process on the SUL carrier to access the cell. Please refer to sul-RSRP-Threshold in TS38.331.
5. Configuration information related to a random access on the SUL carrier, which may be Cell-specific (i.e., cell-specific configuration information related to the random access), or UE-specific (i.e., UE-specific configuration information related to the random access), and may also include the both. Please refer to RACH-ConfigCommon and RACH-ConfigDedicated in TS38.331.
6. Configuration information of a Physical Uplink Control Channel (PUCCH) on the SUL carrier, which may be Cell-specific (i.e., cell-specific configuration information related to the PUCCH) or UE-specific (i.e., UE-specific configuration information related to the PUCCH), and may include the both. Please refer to PUCCH-Config in TS38.331.
7. Configuration information of a Physical Uplink Shared Channel (PUSCH) on the SUL carrier, which may be Cell-specific (i.e., cell-specific configuration information related to the PUSCH) or UE-specific (i.e., UE-specific configuration information related to the PUSCH), and may include the both. Please refer to PUSCH-Config in TS38.331.
8. Configuration information of a Sounding Reference Signal (SRS) on the SUL carrier, which may be Cell-specific (i.e., cell-specific configuration information related to the SRS) or UE-specific (i.e., UE-specific configuration information related to the UE), and may include the both. Please refer to SRS-Config in TS38.331.

Referring to FIG. 8, a method for transferring supplemental uplink carrier configuration information disclosed in the present disclosure includes steps of:

Step 101: A first network-side entity acquires SUL carrier configuration information;

Step 102: The first network-side entity sends a configuration message carrying the SUL carrier configuration information to a second network-side entity, so that the second network-side entity acquires a resource configuration status of the first network-side entity. Further, the second network-side entity may configure a UE with an SUL carrier.

The method for transferring supplemental uplink carrier configuration information disclosed in the present disclosure specifically includes two aspects:
  I. How to exchange the SUL carrier configuration information between network-side entities (between base stations, or between a central unit and a distributed unit of a base station).
  II. How to perform an addition/modification/release of an SUL carrier between network-side entities (between base stations, or between a central unit and a distributed unit of a base station).

The method for transferring configuration optimization information disclosed in the present disclosure specifically includes:
  III. How the UE reports radio link failure information related to the SUL carrier to the network side entities.

The embodiments of the above three aspects are given as follows, respectively.

I. SUL carrier configuration information is exchanged between two base stations (base station 1 and base station 2), and an interface between the base stations may be X2, Xn, or of other interface type. Please refer to FIG. 9.

Step 1: The base station 1 sends a message 1 (a request message for acquiring an SUL carrier configuration) to the base station 2, the message 1 including at least one of:
  1. Identification information of at least one cell served by the base station 1.
  2. SUL carrier configuration information of the at least one cell served by the base station 1, the information indicating that the at least one cell served by the base station 1 supports the SUL carrier. If each cell served by the base station 1 does not support the SUL carrier, the information will not be included.
  3. Identification information of at least one neighboring cell of the at least one cell served by the base station 1, namely, the identification information of the at least one neighboring cell, which is a neighboring cell of any cell served by the base station 1.
  4. SUL carrier configuration information of the at least one neighboring cell of the at least one cell served by the base station 1, namely, the SUL carrier configuration information of the at least one neighboring cell, which is a neighboring cell of any cell served by the base station 1, the information indicating that the at least one neighboring cell of the at least one cell served by the base station 1 supports the SUL carrier. If each neighbor cell of any cell served by the base station 1 does not support the SUL carrier, the information will not be included.

5. Identification information of at least one cell served by other base station.
6. SUL carrier configuration information of the at least one cell served by the other base station, the information indicating that the at least one cell served by the other base station supports the SUL carrier. If each cell served by the other base station does not support the SUL carrier, the information will not be included.
7. Identification information of at least one neighboring cell of the at least one cell served by the other base station, namely, the identification information of the at least one neighboring cell, which is a neighboring cell of any cell served by the other base station.
8. SUL carrier configuration information of the at least one neighboring cell of the at least one cell served by the other base station, namely, the SUL carrier configuration information of the at least one neighboring cell, which is a neighboring cell of any cell served by the other base station, the information indicating that the at least one neighbor cell of the at least one cell served by the other base station supports the SUL carrier. If each neighboring cell of any cell served by the base station 1 does not support the SUL carrier, the information will not be included.
9. Indication information indicating that the at least one cell served by the base station 1 supports the SUL carrier.
10. Indication information indicating that the at least one neighboring cell of the at least one cell served by the base station 1 supports the SUL carrier.
11. Indication information indicating that the at least one cell served by the other base station supports the SUL carrier.
12. Indication information indicating that the at least one neighboring cell of the at least one cell served by the other base station supports the SUL carrier.

The information related to the other base station may be transmitted to the base station 1 from the other base station.

Step 2: The base station 2 sends a message 2 (a configuration message carrying SUL carrier configuration information) to the base station 1, the message 2 including at least one of:

1. Identification information of at least one cell served by the base station 2.
2. SUL carrier configuration information of the at least one cell served by the base station 2, the information indicating that the at least one cell served by the base station 2 supports the SUL carrier. If each cell served by the base station 2 does not support the SUL carrier, the information will not be included.
3. Identification information of at least one neighboring cell of the at least one cell served by the base station 2, namely, the identification information of the at least one neighboring cell, which is a neighboring cell of any cell served by the base station 2.
4. SUL carrier configuration information of the at least one neighboring cell of the at least one cell served by the base station 2, namely, the SUL carrier configuration information of the at least one neighboring cell, which is a neighboring cell of any cell served by the base station 2, the information indicating that the at least one neighboring cell of the at least one cell served by the base station 2 supports the SUL carrier. If each neighbor cell of any cell served by the base station 2 does not support the SUL carrier, the information will not be included.
5. Identification information of at least one cell served by other base station.
6. SUL carrier configuration information of the at least one cell served by the other base station, the information indicating that the at least one cell served by the other base station supports the SUL carrier. If each cell served by the other base station does not support the SUL carrier, the information will not be included.
7. Identification information of at least one neighboring cell of the at least one cell served by the other base station, namely, the identification information of the at least one neighboring cell, which is a neighboring cell of any cell served by the other base station.
8. SUL carrier configuration information of the at least one neighboring cell of the at least one cell served by the other base station, namely, the SUL carrier configuration information of the at least one neighboring cell, which is a neighboring cell of any cell served by the other base station, the information indicating that the at least one neighbor cell of the at least one cell served by the other base station supports the SUL carrier. If each neighboring cell of any cell served by the base station 1 does not support the SUL carrier, the information will not be included.
9. Indication information indicating that the at least one cell served by the base station 2 supports the SUL carrier.
10. Indication information indicating that the at least one neighboring cell of the at least one cell served by the base station 2 supports the SUL carrier.
11. Indication information indicating that the at least one cell served by the other base station supports the SUL carrier.
12. Indication information indicating that the at least one neighboring cell of the at least one cell served by the other base station supports the SUL carrier.

The information related to the other base station may be transmitted to the base station 2 from the other base station.

In the above two steps, the messages 1 and 2 respectively may be an EN-DC X2 Setup request message and an EN-DC X2 Setup response message, an Xn Setup request message and an Xn Setup response message, an EN-DC Configuration update message and an EN-DC Configuration update acknowledge message, an Xn Configuration update message and an Xn Configuration update acknowledge message, or messages with other names.

Through the exchange by the above two steps, it helps each base station to acquire whether the cell supported by the other base station supports the SUL carrier, and obtain related SUL carrier configuration information.

II. SUL carrier configuration information is exchanged between a central unit and a distributed unit of a base station (triggered by the distributed unit). Please refer to FIG. 10 (*a*).

Step 1: The distributed unit sends a message 3a (a configuration message carrying SUL carrier configuration information) to the central unit, the message 3a including at least one of:

1. Identification information of at least one cell served by the distributed unit of the base station.
2. SUL carrier configuration information of the at least one cell served by the distributed unit of the base station, the information indicating that the at least one cell served by the distributed unit of the base station supports the SUL carrier. If each cell served by the distributed unit of the base station does not support the SUL carrier, the information will not be included.
3. Identification information of at least one neighboring cell of the at least one cell served by the distributed unit of the base station, namely, the identification information of the at least one neighboring cell, which is a neighboring cell of any cell served by the distributed unit of the base station.
4. SUL carrier configuration information of the at least one neighboring cell of the at least one cell served by the distributed unit of the base station, namely, the SUL carrier configuration information of the at least one neighboring cell, which is a neighboring cell of any cell served by the distributed unit of the base station, the information indicating that the at least one neighboring cell of the at least one cell served by the distributed unit of the base station supports the SUL carrier. If each neighbor cell of any cell served by the distributed unit of the base station does not support the SUL carrier, the information will not be included.
5. Identification information of at least one cell served by other base station.
6. SUL carrier configuration information of the at least one cell served by the other base station, the information indicating that the at least one cell served by the other base station supports the SUL carrier. If each cell served by the other base station does not support the SUL carrier, the information will not be included.
7. Identification information of at least one neighboring cell of the at least one cell served by the other base station, namely, the identification information of the at least one neighboring cell, which is a neighboring cell of any cell served by the other base station.
8. SUL carrier configuration information of the at least one neighboring cell of the at least one cell served by the other base station, namely, the SUL carrier configuration information of the at least one neighboring cell, which is a neighboring cell of any cell served by the other base station, the information indicating that the at least one neighbor cell of the at least one cell served by the other base station supports the SUL carrier. If each neighboring cell of any cell served by the base station 1 does not support the SUL carrier, the information will not be included.
9. Indication information indicating that the at least one cell served by the distributed unit of the base station supports the SUL carrier.
10. Indication information indicating that the at least one neighboring cell of the at least one cell served by the distributed unit of the base station supports the SUL carrier.
11. Indication information indicating that the at least one cell served by the other base station supports the SUL carrier.
12. Indication information indicating that the at least one neighboring cell of the at least one cell served by the other base station supports the SUL carrier.

The information related to the other base station may be transmitted to the distributed unit of the base station from the other base station, or firstly transmitted to the central unit of the base station and then to the distributed unit of the base station.

Step 2: The central unit feeds back a message 4a (an acknowledge message of the SUL carrier configuration message) to the distributed unit, indicating that the central unit has received the message 3a sent by the distributed unit. Further, optionally the message 4a may include at least one of:

1. Identification information of at least one cell served by the central unit.
2. SUL carrier configuration information of the at least one cell served by the central unit, the information indicating that the at least one cell served by the central unit supports the SUL carrier. If each cell served by the central unit does not support the SUL carrier, the information will not be included.
3. Identification information of at least one neighboring cell of the at least one cell served by the central unit, namely, the identification information of the at least one neighboring cell, which is a neighboring cell of any cell served by the central unit.
4. SUL carrier configuration information of the at least one neighboring cell of the at least one cell served by the central unit, namely, the SUL carrier configuration information of the at least one neighboring cell, which is a neighboring cell of any cell served by the central unit, the information indicating that the at least one neighboring cell of the at least one cell served by the central unit supports the SUL carrier. If each neighbor cell of any cell served by the central unit does not support the SUL carrier, the information will not be included.
5. Identification information of at least one cell served by other base station.
6. SUL carrier configuration information of the at least one cell served by the other base station, the information indicating that the at least one cell served by the other base station supports the SUL carrier. If each cell served by the other base station does not support the SUL carrier, the information will not be included.
7. Identification information of at least one neighboring cell of the at least one cell served by the other base station, namely, the identification information of the at least one neighboring cell, which is a neighboring cell of any cell served by the other base station and acquired by the base station or the central unit of the base station from the other base station.
8. SUL carrier configuration information of the at least one neighboring cell of the at least one cell served by the other base station, namely, the SUL carrier configuration information of the at least one neighboring cell, which is a neighboring cell of any cell served by the other base station and acquired by the base station or the central unit of the base station from the other base station, the information indicating that the at least one neighbor cell of the at least one cell served by the other base station supports the SUL carrier. If each neighboring cell of any cell served by the other base station does not support the SUL carrier, the information will not be included.
9. Indication information indicating that the at least one cell served by the central unit supports the SUL carrier.
10. Indication information indicating that the at least one neighboring cell of the at least one cell served by the central unit supports the SUL carrier.

11. Indication information indicating that the at least one cell served by the other base station supports the SUL carrier.
  12. Indication information indicating that the at least one neighboring cell of the at least one cell served by the other base station supports the SUL carrier.

The information related to the other base station may be transmitted to the central unit of the base station from the other base station.

In the above two steps, the messages 3a and 4a respectively may be an F1 Setup request message and an F1 Setup response message, a gNB-DU Configuration Update message and a gNB-DU Configuration Update Acknowledge, or messages with other names.

Through the exchange by the above two steps, on one hand, it helps the central unit of each base station to acquire whether the cell served by the distributed unit supports the SUL carrier and obtain related SUL carrier configuration, also to acquire whether the neighboring cell of the cell served by the distributed unit supports the SUL carrier and obtain related SUL carrier configuration; on the other hand, it helps the distributed unit of each base station to acquire whether the cell served by the other base station supports the SUL carrier and obtain related SUL carrier configuration, also to acquire whether the neighboring cell of the cell served by the other base station supports the SUL carrier and obtain related SUL carrier configuration.

III. SUL carrier configuration information is exchanged between a central unit and a distributed unit of a base station (triggered by the central unit). Please refer to FIG. 10 (*b*).

Step 1: The central unit sends a message 3b (a request message for acquiring an SUL carrier configuration) to the central unit, the message 3b including at least one of:
  1. Identification information of at least one cell served by the central unit.
  2. SUL carrier configuration information of the at least one cell served by the central unit of the base station, the information indicating that the at least one cell served by the central unit of the base station supports the SUL carrier. If each cell served by the central unit of the base station does not support the SUL carrier, the information will not be included.
  3. Identification information of at least one neighboring cell of the at least one cell served by the central unit of the base station, namely, the identification information of the at least one neighboring cell, which is a neighboring cell of any cell served by the central unit of the base station.
  4. SUL carrier configuration information of the at least one neighboring cell of the at least one cell served by the central unit, namely, the SUL carrier configuration information of the at least one neighboring cell, which is a neighboring cell of any cell served by the central unit, the information indicating that the at least one neighboring cell of the at least one cell served by the central unit supports the SUL carrier. If each neighbor cell of any cell served by the central unit does not support the SUL carrier, the information will not be included.
  5. Identification information of at least one cell served by other base station.
  6. SUL carrier configuration information of the at least one cell served by the other base station, the information indicating that the at least one cell served by the other base station supports the SUL carrier. If each cell served by the other base station does not support the SUL carrier, the information will not be included.
  7. Identification information of at least one neighboring cell of the at least one cell served by the other base station, namely, the identification information of the at least one neighboring cell, which is a neighboring cell of any cell served by the other base station and acquired by the base station or the central unit of the base station from the other base station.
  8. SUL carrier configuration information of the at least one neighboring cell of the at least one cell served by the other base station, namely, the SUL carrier configuration information of the at least one neighboring cell, which is a neighboring cell of any cell served by the other base station and acquired by the base station or the central unit of the base station from the other base station, the information indicating that the at least one neighbor cell of the at least one cell served by the other base station supports the SUL carrier. If each neighboring cell of any cell served by the other base station does not support the SUL carrier, the information will not be included.
  9. Indication information indicating that the at least one cell served by the central unit supports the SUL carrier.
  10. Indication information indicating that the at least one neighboring cell of the at least one cell served by the central unit supports the SUL carrier.
  11. Indication information indicating that the at least one cell served by the other base station supports the SUL carrier.
  12. Indication information indicating that the at least one neighboring cell of the at least one cell served by the other base station supports the SUL carrier.

The information related to the other base station may be transmitted to the central unit of the base station from the other base station.

Step 2: The distributed unit feeds back a message 4b (a configuration message carrying the SUL carrier configuration information) to the central unit, indicating that the distributed unit has received the message 3b sent by the central unit. Further, optionally the message 4b may include at least one of:
  1. Identification information of at least one cell served by the distributed unit of the base station.
  2. SUL carrier configuration information of the at least one cell served by the distributed unit of the base station, the information indicating that the at least one cell served by the distributed unit of the base station supports the SUL carrier. If each cell served by the distributed unit of the base station does not support the SUL carrier, the information will not be included.
  3. Identification information of at least one neighboring cell of the at least one cell served by the distributed unit of the base station, namely, the identification information of the at least one neighboring cell, which is a neighboring cell of any cell served by the distributed unit of the base station.
  4. SUL carrier configuration information of the at least one neighboring cell of the at least one cell served by the distributed unit of the base station, namely, the SUL carrier configuration information of the at least one neighboring cell, which is a neighboring cell of any cell served by the distributed unit of the base station, the information indicating that the at least one neighboring cell of the at least one cell served by the distributed unit of the base station supports the SUL carrier. If each neighbor cell of any cell served by the distributed unit of the base station does not support the SUL carrier, the information will not be included.

5. Identification information of at least one cell served by other base station.
6. SUL carrier configuration information of the at least one cell served by the other base station, the information indicating that the at least one cell served by the other base station supports the SUL carrier. If each cell served by the other base station does not support the SUL carrier, the information will not be included.
7. Identification information of at least one neighboring cell of the at least one cell served by the other base station, namely, the identification information of the at least one neighboring cell, which is a neighboring cell of any cell served by the other base station.
8. SUL carrier configuration information of the at least one neighboring cell of the at least one cell served by the other base station, namely, the SUL carrier configuration information of the at least one neighboring cell, which is a neighboring cell of any cell served by the other base station, the information indicating that the at least one neighbor cell of the at least one cell served by the other base station supports the SUL carrier. If each neighboring cell of any cell served by the base station 1 does not support the SUL carrier, the information will not be included.
9. Indication information indicating that the at least one cell served by the distributed unit of the base station supports the SUL carrier.
10. Indication information indicating that the at least one neighboring cell of the at least one cell served by the distributed unit of the base station supports the SUL carrier.
11. Indication information indicating that the at least one cell served by the other base station supports the SUL carrier.
12. Indication information indicating that the at least one neighboring cell of the at least one cell served by the other base station supports the SUL carrier.

The information related to the other base station may be transmitted to the distributed unit of the base station from the other base station, or firstly transmitted to the central unit of the base station and then to the distributed unit of the base station.

In the above two steps, the messages 3b and 4b respectively may be a gNB-CU Configuration Update message and a gNB-CU Configuration Update Acknowledge, or messages with other names.

Through the exchange by the above two steps, on one hand, it helps the distributed unit of each base station to acquire whether the cell served by the other base station supports the SUL carrier and obtain related SUL carrier configuration, also to acquire whether the neighboring cell of the cell served by the other base station supports the SUL carrier and obtain related SUL carrier configuration; on the other hand, it helps the central unit of each base station to acquire whether the cell served by the distributed unit supports the SUL carrier and obtain related SUL carrier configuration, also to acquire whether the neighboring cell of the cell served by the distributed unit supports the SUL carrier and obtain related SUL carrier configuration.

For one UE, the addition/modification/release of SUL carrier between a central unit and a distributed unit of a base station may be implemented in one of the following manners.

Manner 1: the central unit of the base station determines the addition/modification/release of the SUL carrier. Please refer to FIG. 11.

Step 1: The central unit of the base station sends a message 5 (a request message for acquiring an SUL carrier configuration) to the distributed unit of the base station, the message 5 at least includes information related to the SUL carrier configuration of a cell and generated at the central unit side, and the information is related to the SUL carrier configuration of at least one cell serving the user. For one cell serving the user, the information includes at least one of:
1. Identification information of a cell which may be a Primary Cell (PCell), a Primary Secondary cell (PSCell), a Secondary cell (SCell), or a Secondary Cell Group (SCG) SCell.
2. Indication information related to an uplink carrier of the UE; the information may be explicit or implicit indication information, and may be used to represent at least one of:
   1) Indication information indicating to only configure a non-SUL carrier for the UE. In another embodiment, the indication information may also be represented in a manner not including the "information related to an uplink carrier of the UE".
   2) Indication information indicating to only configure an SUL carrier for the UE. In another embodiment, the indication information may also be represented in a manner not including the "information related to an uplink carrier of the UE".
   3) Indication information indicating to configure a non-SUL carrier and an SUL carrier for the UE, or indication information indicating to configure an SUL carrier for the UE, or indication information indicating to activate the SUL carrier, or indication information indicating to add an SUL carrier for the UE. The indication information indicates that if the "information related to an uplink carrier of the UE" is not included, it is defaulted to only configure a non-SUL carrier for the UE, and if the "information related to an uplink carrier of the UE" is included, it is indicated to configure a non-SUL carrier and an SUL carrier for the UE. In another embodiment, the indication information may also be represented in a manner not including the "information related to an uplink carrier of the UE".
3. Indication information related to a modification of the uplink carrier configuration of the UE; the information may be explicit or implicit indication information, and may be used to represent at least one of:
   1) indication information indicating to modify an SUL carrier configuration of the UE;
   2) indication information indicating to modify a non-SUL carrier configuration of the UE; and
   3) indication information indicating to modify an SUL carrier configuration and a non-SUL carrier configuration of the UE.
4. Indication information indicating to configure random access-related information (cell-specific or UE-specific) on the SUL carrier for the UE.
5. Indication information indicating to modify random access-related information (cell-specific and/or UE-specific) on the SUL carrier for the UE.

The cell serving the user in the above information may be a cell newly added for the user in one embodiment, or a cell currently serving the user in another embodiment.

II. Information related to measurement results of a cell, which may include at least one of:
1. identification information of the cell;
2. signal strength information (RSRP), or signal quality information (RSRQ), or Signal to Interference and Noise Ratio (SINR) information, etc. of the cell; and 3. measurement information related to a Synchronization Signal block (SSB, including PSS, SSS and PBCH) of the cell; the measurement information may be acquired by measuring signals (e.g., PSS, SSS, PBCH, DM-RS and CSI-RS) in the signal block, and may include at least one of:
  1) identification information of at least one synchronization signal block; further, the identification information may be used to indicate location information of the synchronization signal block;
  2) measurement results of the at least one synchronization signal block, such as RSRP, RSRQ, SINR, etc.;
  3) identification information of at least one suitable synchronization signal block selected by the UE; further, the identification information may be used to indicate location information of the synchronization signal block; and
  4) measurement results of at least one suitable synchronization signal block selected by the UE, such as RSRP, RSRQ, SINR, etc.

In addition, the information related to the measurement results of the cell may also include the measurement results of other cells not serving the user.

Step 2: The distributed unit of the base station sends a message 6 (a configuration message carrying the SUL carrier configuration information) to the central unit of the base station. The message 6 is a response message to the message 5 in step 1 and at least includes information related to the SUL carrier configuration of the cell generated at the distributed unit side. The information is related to the SUL carrier configuration of at least one cell serving the user. For a cell serving the user, the information includes at least one of:

1. identification information of the cell;
2. indication information related to an uplink carrier of the UE; the information may be explicit or implicit indication information, and may be used to represent at least one of:
  1) Indication information indicating to only configure a non-SUL carrier for the UE. In another embodiment, the indication information may also be represented in a manner not including the "information related to an uplink carrier of the UE".
  2) Indication information indicating to only configure an SUL carrier for the UE. In another embodiment, the indication information may also be represented in a manner not including the "information related to an uplink carrier of the UE".
  3) Indication information indicating to configure a non-SUL carrier and an SUL carrier for the UE, or indication information indicating to configure an SUL carrier for the UE, or indication information indicating to activate the SUL carrier, or indication information indicating to add an SUL carrier for the UE. The indication information indicates that if the "information related to an uplink carrier of the UE" is not included, it is defaulted to only configure a non-SUL carrier for the UE, and if the "information related to an uplink carrier of the UE" is included, it is indicated to configure a non-SUL carrier and an SUL carrier for the UE. In another embodiment, the indication information may also be represented in a manner not including the "information related to an uplink carrier of the UE".
3. Indication information related to a modification of the uplink carrier configuration of the UE; the information may be explicit or implicit indication information, and may be used to represent at least one of:
  1) indication information indicating to modify an SUL carrier configuration of the UE;
  2) indication information indicating to modify a non-SUL carrier configuration of the UE; and
  3) indication information indicating to modify an SUL carrier configuration and a non-SUL carrier configuration of the UE.
4. Indication information indicating to configure random access-related information (cell-specific and/or UE-specific) on the SUL carrier for the UE.
5. Indication information indicating to modify random access-related information (cell-specific and/or UE-specific) on the SUL carrier for the UE.
6. SUL carrier configuration information of the cell.
7. Non-SUL carrier configuration information of the cell. For the configuration parameters that might be included in the configuration information, please refer to the configuration parameters included in the SUL carrier configuration information.

The cell serving the user in the above information may be a cell newly added for the user in one embodiment, or a cell currently serving the user in another embodiment. The information related to the SUL carrier configuration may be generated by the distributed unit according to the message of step 1 or determined by the distributed unit itself.

Before step 1, optionally there may be step 0. That is, the central unit of the base station receives information related to the measurement results of the cell and reported by the UE. The information is transmitted by the UE to the distributed unit and then by the distributed unit to the central unit, or received by the central unit of the base station from other base station. The information related to the measurement results of the cell includes at least one of (the cell included in the information may not be the cell serving the user):

1. identification information of the cell;
2. signal strength information (RSRP), or signal quality information (RSRQ), or Signal to Interference and Noise Ratio (SINR) information, etc. of the cell; and
3. measurement information related to a Synchronization Signal block (SSB, including PSS, SSS and PBCH) of the cell; the measurement information may be acquired by measuring signals (e.g., PSS, SSS, PBCH, DM-RS and CSI-RS) in the signal block, and may include at least one of:
  1) identification information of at least one synchronization signal block; further, the identification information may be used to indicate location information of the synchronization signal block;
  2) measurement results of the at least one synchronization signal block, such as RSRP, RSRQ, SINR, etc.;
  3) identification information of at least one suitable synchronization signal block selected by the UE; further, the identification information may be used to indicate location information of the synchronization signal block; and
  4) measurement results of at least one suitable synchronization signal block selected by the UE, such as RSRP, RSRQ, SINR, etc.

After step 2, optionally there may be step 3. That is, the configuration information received in step 2 may be transmitted by the central unit of the base station to the UE through the distributed unit or other base station.

The above steps 1 and 2 may be applied to the UE context setup procedure between the central unit and the distributed unit, or the UE context modification procedure initiated by the central unit, or any other procedure. The messages 5 and 6 respectively may be a UE Context Setup Request message and a UE Context Setup Response message, a UE Context Modification Request message and an UE Modification Response message, or messages with other names.

Through the exchange by the above two steps, it helps the distributed unit of the base station to generate a non-SUL carrier configuration and/or an SUL carrier configuration for the UE and finally transmit to the UE.

The manner may be extensionally applied to the case of two base stations (base stations 1 and 2) (the interface between the two base stations may be X2/Xn, or any other interface) to achieve an addition/modification/release of the SUL carrier of the UE initiated by the base station 1. The specific method is similar to the above description, i.e., the central unit in steps 1 and 2 is changed to be base station 1, and the distributed unit is changed to be base station 2. For step 0, the base station 1 may acquire cell measurement information (refer to the foregoing description) reported by the UE. The measurement information may be reported by the UE or transmitted by other base station. For step 3, the configuration information of the UE may be transmitted to the UE through the base station 1 or the base station 2. The exchange between the above two base stations may be applied to a handover process, then the messages 5 and 6 in steps 1 and 2 are a Handover Request message and a Handover Request Acknowledge message, respectively; the above exchange may also be applied to a dual-connection establishment process, then the messages 5 and 6 in steps 1 and 2 are an S-Node Addition Request and an S-Node Addition Request Acknowledge, respectively, or an SgNB Addition Request message and an SgNB Addition Request Acknowledge message, respectively; the above exchange may further be applied to a dual-connection modification process, then the messages 5 and 6 in steps 1 and 2 are an S-Node Modification Request and an S-Node Modification Request Acknowledge, respectively, or an SgNB Modification Request message and an SgNB Modification Request Acknowledge message, respectively. In addition, the above exchange may also be applied to other process and other messages may be used.

In addition, for the initial access by the UE, if the UE selects a process of performing a random access on the SUL carrier, the distributed unit may transmit to the central unit indication information indicating that the UE select to perform a random access on the SUL carrier. Further, the indication information may indicate that the distributed unit has provided the SUL carrier configuration information to the central unit. Optionally, after receiving the indication information, the central unit may trigger the distributed unit to provide the SUL carrier configuration information in the manner of steps 1 and 2. Please refer to FIG. 12.

Step 0a: The distributed unit acquires that the UE performs a random access on the SUL carrier. The distributed unit may determine whether to perform a random access on the SUL carrier according to the carrier receiving the random access signal.

Step 0b: The distributed unit transmits to the central unit indication information indicating that a random access is performed on the SUL carrier. The indication information may be transmitted in an Initial UL RRC message or any other message. Optionally, the message may further carry the SUL carrier configuration information.

Optionally, the SUL carrier may be further configured according to the above steps 1 and 2.

Step 3: The central unit of the base station transmits the SUL carrier configuration information to the UE. The SUL carrier configuration information may be transmitted to the UE through the distributed unit or other base station.

Manner 2: The distributed unit of the base station determines the addition/modification/release of the SUL carrier (the central unit provides auxiliary information). Please refer to FIG. 13.

Step 1: The central unit of the base station sends a message 7 (a request message for acquiring an SUL carrier configuration) to the distributed unit of the base station, the message 7 at least including information related to measurement results of a cell (the cell included in the information may not be the cell serving the user), and specifically including at least one of:

1. identification information of the cell;
2. signal strength information (RSRP), or signal quality information (RSRQ), or Signal to Interference and Noise Ratio (SINR) information, etc. of the cell;
3. measurement information related to a Synchronization Signal block (SSB, including PSS, SSS and PBCH) of the cell; the measurement information may be acquired by measuring signals (e.g., PSS, SSS, PBCH, DM-RS and CSI-RS) in the signal block, and may include at least one of:
   1) identification information of at least one synchronization signal block; further, the identification information may be used to indicate location information of the synchronization signal block;
   2) measurement results of the at least one synchronization signal block, such as RSRP, RSRQ, SINR, etc.;
   3) identification information of at least one suitable synchronization signal block selected by the UE; further, the identification information may be used to indicate location information of the synchronization signal block; and
   4) measurement results of at least one suitable synchronization signal block selected by the UE, such as RSRP, RSRQ, SINR, etc.

Step 2: The distributed unit of the base station sends a message 8 (a configuration message carrying the SUL carrier configuration information) to the central unit of the base station. The message 8 is a response message to the message 7 in step 1 and at least includes information related to the SUL carrier configuration of the cell generated at the distributed unit side. The information is related to the SUL carrier configuration of at least one cell serving the user. For a cell serving the user, the information includes at least one of:

1. identification information of the cell;
2. indication information related to an uplink carrier of the UE; the information may be explicit or implicit indication information, and may be used to represent at least one of:
   1) Indication information indicating to only configure a non-SUL carrier for the UE. In another embodiment, the indication information may also be represented in a manner not including the "information related to an uplink carrier of the UE".
   2) Indication information indicating to only configure an SUL carrier for the UE. In another embodiment, the indication information may also be represented in a manner not including the "information related to an uplink carrier of the UE".
   3) Indication information indicating to configure a non-SUL carrier and an SUL carrier for the UE, or indication information indicating to configure an SUL carrier for the UE, or indication information indicating to activate the SUL carrier, or indication information indicating to add an SUL carrier for the UE. The indication information indicates that if the "information related to an uplink carrier of the UE" is not included, it is defaulted to only configure a non-SUL carrier for the UE, and if the "information related to an uplink carrier of the UE" is included, it is indicated to configure a non-SUL carrier and an SUL carrier for the UE. In another embodiment, the indication information may also be represented in a manner not including the "information related to an uplink carrier of the UE".

3. Indication information related to a modification of the uplink carrier configuration of the UE; the information may be explicit or implicit indication information, and may be used to represent at least one of:
   1) indication information indicating to modify an SUL carrier configuration of the UE;
   2) indication information indicating to modify a non-SUL carrier configuration of the UE; and
   3) indication information indicating to modify an SUL carrier configuration and a non-SUL carrier configuration of the UE.

4. Indication information indicating to configure random access-related information (cell-specific and/or UE-specific) on the SUL carrier for the UE.

5. Indication information indicating to modify random access-related information (cell-specific and/or UE-specific) on the SUL carrier for the UE.

6. SUL carrier configuration information of the cell.

7. Non-SUL carrier configuration information of the cell. For the configuration parameters that might be included in the configuration information, please refer to the configuration parameters included in the SUL carrier configuration information.

The cell serving the user in the above information may be a cell newly added for the user in one embodiment, or a cell currently serving the user in another embodiment. The information related to the SUL carrier configuration may be generated by the distributed unit according to the message of step 1 or determined by the distributed unit itself.

Before step 1, optionally there may be step 0. That is, the central unit of the base station receives information related to the measurement results of the cell and reported by the UE. The information is transmitted by the UE to the distributed unit and then by the distributed unit to the central unit, or received by the central unit of the base station from other base station. The information related to the measurement results of the cell includes at least one of (the cell included in the information may not be the cell serving the user):
   1. identification information of the cell;
   2. signal strength information (RSRP), or signal quality information (RSRQ), or Signal to Interference and Noise Ratio (SINR) information, etc. of the cell; and
   3. measurement information related to a Synchronization Signal block (SSB, including PSS, SSS and PBCH) of the cell; the measurement information may be acquired by measuring signals (e.g., PSS, SSS, PBCH, DM-RS and CSI-RS) in the signal block, and may include at least one of:
      1) identification information of at least one synchronization signal block; further, the identification information may be used to indicate location information of the synchronization signal block;
      2) measurement results of at least one synchronization signal block, such as RSRP, RSRQ, SINR, etc.;
      3) identification information of at least one suitable synchronization signal block selected by the UE; further,
      the identification information may be used to indicate location information of the synchronization signal block; and
      4) measurement results of at least one suitable synchronization signal block selected by the UE, such as RSRP, RSRQ, SINR, etc.

After step 2, optionally there may be step 3. That is, the configuration information received in step 2 may be transmitted by the central unit of the base station to the UE through the distributed unit or other base station.

The above steps 1 and 2 may be applied to the UE context setup procedure between the central unit and the distributed unit, or the UE context modification procedure initiated by the central unit, or any other procedure. The messages 7 and 8 respectively may be a UE Context Setup Request message and a UE Context Setup response message, a UE Context Modification Request message and a UE Context Modification Response message, or messages with other names.

Through the exchange by the above two steps, it helps the distributed unit of the base station to generate a non-SUL carrier configuration and/or an SUL carrier configuration for the UE and finally transmits the same to the UE.

The manner may be extensionally applied to the case of two base stations (base stations 1 and 2) (the interface between the two base stations may be X2/Xn, or any other interface) to achieve an addition/modification/release of the SUL carrier determined by the base station 2. The specific method is similar to the above description, i.e., the central unit in steps 1 and 2 is changed to be base station 1, and the distributed unit is changed to be base station 2. For step 0, the base station 1 may acquire cell measurement information (refer to the foregoing description) reported by the UE. The measurement information may be reported by the UE or transmitted by other base station. For step 3, the configuration information of the UE may be transmitted to the UE through the base station 1 or the base station 2. The exchange between the above two base stations may be applied to a handover process, then the messages 7 and 8 in steps 1 and 2 are a Handover Request message and a Handover Request Acknowledge message, respectively; the above exchange may also be applied to a dual-connection establishment process, then the messages 7 and 8 in steps 1 and 2 are an S-Node Addition Request and an S-Node Addition Request Acknowledge, respectively, or an SgNB Addition Request message and an SgNB Addition Request Acknowledge message, respectively; the above exchange may further be applied to a dual-connection modification process, then the messages 7 and 8 in steps 1 and 2 are an S-Node Modification Request and an S-Node Modification Request Acknowledge, respectively, or an SgNB Modification Request message and an SgNB Modification Request Acknowledge message, respectively. In addition, the above exchange may also be applied to other process and other messages may be used.

Manner 3: the distributed unit of the base station determines the addition/modification/release of the SUL carrier. Please refer to FIG. 14.

Step 1: The distributed unit of the base station sends a message 9 (a configuration message carrying the SUL carrier configuration information) to the central unit of the base station. The message 9 at least includes information related to the SUL carrier configuration of the cell generated at the distributed unit side. The information is related to the SUL carrier configuration of at least one cell serving the user. For a cell serving the user, the information includes at least one of:

1. identification information of the cell;
2. indication information related to an uplink carrier of the UE; the information may be explicit or implicit indication information, and may be used to represent at least one of:
   1) Indication information indicating to only configure a non-SUL carrier for the UE. In another embodiment, the indication information may also be represented in a manner not including the "information related to an uplink carrier of the UE".
   2) Indication information indicating to only configure an SUL carrier for the UE. In another embodiment, the indication information may also be represented in a manner not including the "information related to an uplink carrier of the UE".
   3) Indication information indicating to configure a non-SUL carrier and an SUL carrier for the UE, or indication information indicating to configure an SUL carrier for the UE, or indication information indicating to activate the SUL carrier, or indication information indicating to add an SUL carrier for the UE. The indication information indicates that if the "information related to an uplink carrier of the UE" is not included, it is defaulted to only configure a non-SUL carrier for the UE, and if the "information related to an uplink carrier of the UE" is included, it is indicated to configure a non-SUL carrier and an SUL carrier for the UE. In another embodiment, the indication information may also be represented in a manner not including the "information related to an uplink carrier of the UE".
3. Indication information related to a modification of the uplink carrier configuration of the UE; the information may be explicit or implicit indication information, and may be used to represent at least one of:
   1) indication information indicating to modify an SUL carrier configuration of the UE;
   2) indication information indicating to modify a non-SUL carrier configuration of the UE; and
   3) indication information indicating to modify an SUL carrier configuration and a non-SUL carrier configuration of the UE.
4. Indication information indicating to configure random access-related information (cell-specific and/or UE-specific) on the SUL carrier for the UE.
5. Indication information indicating to modify random access-related information (cell-specific and/or UE-specific) on the SUL carrier for the UE.
6. SUL carrier configuration information of the cell.
7. Non-SUL carrier configuration information of the cell. For the configuration parameters that might be included in the configuration information, please refer to the configuration parameters included in the SUL carrier configuration information.

The cell serving the user in the above information may be a cell newly added for the user in one embodiment, or a cell currently serving the user in another embodiment. The information related to the SUL carrier configuration may be generated by the distributed unit according to the message of step 1 or determined by the distributed unit itself.

Step 2: The central unit of the base station sends a message 10 (an acknowledge message of the SUL carrier configuration) to the distributed unit of the base station, the message 10 acknowledging the correct reception of the message 9.

Before step 1, optionally there may be step 0. That is, the distributed unit of the base station acquires information related to the measurement results of the cell from the central unit. The information may be transmitted by the UE to the central unit through the distributed unit, or received by the central unit of the base station from other base station. The information includes at least one of (the cell included in the information may not be the cell serving the user):
1. identification information of the cell;
2. signal strength information (RSRP), or signal quality information (RSRQ), or Signal to Interference and Noise Ratio (SINR) information, etc. of the cell; and
3. measurement information related to a Synchronization Signal block (SSB, including PSS, SSS and PBCH) of the cell; the measurement information may be acquired by measuring signals (e.g., PSS, SSS, PBCH, DM-RS and CSI-RS) in the signal block, and may include at least one of:
   1) identification information of at least one synchronization signal block; further, the identification information may be used to indicate location information of the synchronization signal block;
   2) measurement results of the at least one synchronization signal block, such as RSRP, RSRQ, SINR, etc.;
   3) identification information of at least one suitable synchronization signal block selected by the UE; further, the identification information may be used to indicate location information of the synchronization signal block;
   4) measurement results of at least one suitable synchronization signal block selected by the UE, such as RSRP, RSRQ, SINR, etc.

After step 2, optionally there may be step 3. That is, the configuration information received in step 1 may be transmitted by the central unit of the base station to the UE through the distributed unit or other base station.

The above steps 1 and 2 may be applied to the UE context modification procedure initiated by the distributed unit, or any other procedure. The messages 9 and 10 respectively may be a UE Context Modification Required message and a UE Context Modification Confirm message, or messages with other names.

Through the exchange by the above two steps, it helps the distributed unit of the base station to generate a non-SUL carrier configuration and/or an SUL carrier configuration for the UE and finally transmits the same to the UE.

The manner may be extensionally applied to the case of two base stations (base stations 1 and 2) (the interface between the two base stations may be X2/Xn, or any other interface) to achieve an addition/modification/release of the SUL carrier initiated by the base station 2. The specific method is similar to the above description, i.e., the central unit in steps 1 and 2 is changed to be base station 1, and the distributed unit is changed to be base station 2. For step 0, the base station 2 may acquire cell measurement information (refer to the foregoing description) reported by the UE. For step 3, the configuration information of the UE may be transmitted to the UE through the base station 1 or the base station 2. The exchange between the above two base stations may be applied to a dual-connection modification process, then the messages 9 and 10 in steps 1 and 2 are an S-Node Modification Required message and an S-Node Modification Confirm message, respectively, or an SgNB Modification Required message and an SgNB Modification Confirm message, respectively. In addition, the above exchange may also be applied to other process and other messages may be used.

In a case where a failure occurs after UE is connected to a network, the UE cannot be communicated with a base station or a distributed unit in the base station.

I. If a cell of the UE served by the base station or the distributed unit of the base station is a PCell (or MCG PCell) and further may include an SCell (or MCG SCell), as shown in FIG. 15, the cause of the failure may be one of the following "cause information 1" (please refer to related indication information in RLF-Report in TS36.331 or TS38.331 for an implementation):
 1. The timer expires. For example, T310 expires and T312 expires, and please refer to t310-Expiry and t312-Expiry in TS36.331 or TS38.331 for an implementation.
 2. The random access problem. In one embodiment, the random access problem indicates that a random access failure occurs in the PCell (or MCG PCell), or in the SCell (or MCG SCell) of the base station, and please refer to randomAccessProblem in TS36.331 or TS38.331 for an implementation.
 3. The number of retransmissions of the RLC layer of the UE exceeds the maximum number of retransmissions thereof, and please refer to rlc-MaxNumRetx in TS36.331 or TS38.331 for an implementation; or it may be indicated that an RLC is failed.
 4. The cause of connection failure, such as a radio link failure or a handover failure, and please refer to connectionFailureType in TS36.331 or TS38.331 for an implementation.

II. If a cell of the UE served by the base station or the distributed unit of the base station is a PSCell (or SCG PSCell) and further may include an SCG SCell, as shown in FIG. 16, the cause of the failure may be one of the following "cause information 2" (please refer to related indication information in SCGFailureInformation or FailureReportSCG-ToOtherRAT in TS36.331 or TS38.331 for an implementation):
 1. The timer expires. For example, T313 expires, and please refer to t313-Expiry in TS36.331 or TS38.331 for an implementation.
 2. The random access problem. In one embodiment, the random access problem indicates that a random access failure occurs in the PSCell (or SCG PSCell), or in the SCG SCell, and please refer to randomAccessProblem in TS36.331 or TS38.331 for an implementation.
 3. The number of retransmissions of the RLC layer of the UE exceeds the maximum number of retransmissions thereof. This event occurs at a base station where the SCG is located, and please refer to rlc-MaxNumRetx in TS36.331 or TS38.331 for an implementation; or it may be indicated that an RLC is failed.
 4. The SCG change is failed. This event indicates that the UE fails to change the base station or the distributed unit thereof serving the SCG, and please refer to scg-ChangeFailure in TS36.331 or TS38.331 for an implementation.
 5. The maximum uplink transmission time difference is exceeded, and please refer to maxUL-TimingDiff in TS36.331 or TS38.331 for an implementation.
 6. The SCG reconfiguration is failed. This event indicates that the reconfiguration of the SCG of the UE is failed, and please refer to scg-reconfigFailure in TS36.331 or TS38.331 for an implementation.
 7. The integrity protection of signaling sent in the SCG is failed, and please refer to srb3-IntegrityFailure in TS36.331 or TS38.331 for an implementation.

After the SUL carrier is introduced, the above failures of the UE may occur when the UE uses the SUL carrier, or the non-SUL carrier, or both of them to communicate with the network. However, in the prior art, when the UE reports the causes of failures, it is not indicated whether those failures occur when the SUL carrier, or the non-SUL carrier, or both of them are used. Thus, the present disclosure provides the following mechanisms of reporting the causes of the failures.

Mechanism I: The UE reports to the network side entities. Please refer to FIG. 17.

Step 1: The UE sends to the network side entities a failure report message containing information related to a link failure, and at least including one of:
 I. Cause information of the UE failure, including at least one of the cause information 1 and/or the cause information 2.
 II. Information related to the use of the SUL carrier by the UE, which may be at least one of:
  1. indication information indicating that the UE uses the non-SUL carrier; in one embodiment, the indication information indicates that the UE uses the non-SUL carrier; in another embodiment, the indication information indicates that in the failure judging process, the UE uses the non-SUL carrier; in still another embodiment, the indication information indicates that the UE failure is caused by the use of the non-SUL carrier; in yet another embodiment, the indication information indicates that at a moment when the UE judges the link to be failed, the UE uses the non-SUL carrier;
  2. indication information indicating that the UE uses the SUL carrier; in one embodiment, the indication information indicates that the UE uses the SUL carrier; in another embodiment, the indication information indicates that in the failure judging process, the UE uses the SUL carrier; in still another embodiment, the indication information indicates that the UE failure is caused by the use of the SUL carrier; in yet another embodiment, the indication information indicates that at a moment when the UE judges the link to be failed, the UE uses the SUL carrier; and
  3. indication information indicating that the UE uses the SUL carrier and the non-SUL carrier; in one embodiment, the indication information indicates that the UE uses the SUL carrier and the non-SUL carrier; in another embodiment, the indication information indicates that in the failure judging process, the UE uses the SUL carrier and the non-SUL carrier; in still another embodiment, the indication information indicates that the UE failure is caused by the use of the SUL carrier and the non-SUL carrier; in yet another embodiment, the indication information indicates that at a moment when the UE judges the link to be failed, the UE uses the SUL carrier and the non-SUL carrier.

For example, if the information reported by the UE includes: 1) the random access problem, and 2) indication information indicating that the UE uses the SUL carrier, it means that the UE fails because a failure occurs during the random access on the SUL carrier. For another example, if the information reported by the UE includes: 1) the problem that the number of retransmissions of the RLC layer of the UE exceeds the maximum number of retransmissions thereof, and 2) indication information indicating that the UE uses the SUL carrier, it means that the UE fails because when the SUL carrier is used for communications, the number of retransmissions of the RLC layer exceeds the maximum number of retransmissions thereof.

In addition, the "cause information of the UE failure" and the "information related to the use of the SUL carrier" may also be represented just with one piece of indication information. In this step, there are two possibilities for the UE to report to the network:

Possibility 1: after the failure, the UE is reconnected to a cell (cell 2) which may be different from the serving cell (cell 1) when the UE fails. In one embodiment, the cells 1 and 2 are located in different base stations, or in different distributed units of the same base station, or in the same base station. The UE reports the information to the base station where the cell 2 is located, or to the distributed unit of the base station where the cell 2 is located and then the distributed unit reports the information to the central unit of the base station.

Possibility 2: after the failure, the UE still remains a connection with another base station or another distributed unit of the same base station (before the failure, the UE is communicated with two base stations or two distributed units of one base station), and the UE reports the information to the base station remained in connection, or to the distributed unit of the base station remained in connection and then the distributed unit reports the information to the central unit of the base station.

Optionally, there may be step 0 before step 1: the base station sends a failure report request message to the UE to request the UE to report failure cause information; or the central unit of the base station sends a failure report request message to the distributed unit, and then the distributed unit sends the request message to the UE.

Optionally, there may be step 2 after step 1: the base station or the central unit thereof receiving the "information related to a link failure" sends a failure notification message including a part or whole of the "information related to a link failure" to the base station (or the central unit thereof) where the UE is failed. This step may occur when the base station or the central unit thereof receiving the "information related to a link failure" is different from the base station where the UE is failed.

The effect of this mechanism is to help the base station to determine the uplink carrier used by the UE in the event of a failure, and further help the base station to optimize the configuration parameters of the user served by the base station and to reduce the probability of failure.

Mechanism II: the distributed unit reports to the central unit. Please refer to FIG. 18.

Step 1: The distributed unit sends to the central unit a failure report message that is generated by the distributed unit based on a failure occurring in a communication with the UE and contains information related to a link failure, at least including one of:

I. Cause information of the UE failure, including at least one of the cause information 1 and/or the cause information 2.

II. Information related to the use of the SUL carrier by the UE, which may be at least one of:

1. indication information indicating that the UE uses the non-SUL carrier; in one embodiment, the indication information indicates that the UE uses the non-SUL carrier; in another embodiment, the indication information indicates that in the failure judging process, the UE uses the non-SUL carrier; in still another embodiment, the indication information indicates that the UE failure is caused by the use of the non-SUL carrier; in yet another embodiment, the indication information indicates that at a moment when the UE judges the link to be failed, the UE uses the non-SUL carrier;

2. indication information indicating that the UE uses the SUL carrier; in one embodiment, the indication information indicates that the UE uses the SUL carrier; in another embodiment, the indication information indicates that in the failure judging process, the UE uses the SUL carrier; in still another embodiment, the indication information indicates that the UE failure is caused by the use of the SUL carrier; in yet another embodiment, the indication information indicates that at a moment when the UE judges the link to be failed, the UE uses the SUL carrier; and 3. indication information indicating that the UE uses the SUL carrier and the non-SUL carrier; in one embodiment, the indication information indicates that the UE uses the SUL carrier and the non-SUL carrier; in another embodiment, the indication information indicates that in the failure judging process, the UE uses the SUL carrier and the non-SUL carrier; in still another embodiment, the indication information indicates that the UE failure is caused by the use of the SUL carrier and the non-SUL carrier; in yet another embodiment, the indication information indicates that at a moment when the UE judges the link to be failed, the UE uses the SUL carrier and the non-SUL carrier.

For example, if the information reported includes: 1) the random access problem, and 2) indication information indicating that the UE uses the SUL carrier, it means that the UE fails because a failure occurs during the random access on the SUL carrier. For another example, if the information reported includes: 1) the problem that the number of retransmissions of the RLC layer of the UE exceeds the maximum number of retransmissions thereof, and 2) indication information indicating that the UE uses the SUL carrier, it means that the UE fails because when the SUL carrier is used for communications, the number of retransmissions of the RLC layer exceeds the maximum number of retransmissions thereof.

In addition, the "cause information of the UE failure" and the "information related to the use of the SUL carrier" may also be represented just with one piece of indication information. Optionally, there may be step 0 before step 1: the central unit sends a failure report request message to the distributed unit to request the distributed unit to report the information related to the link failure.

Optionally, there may be step 2 after step 1: the central unit sends to the distributed unit a failure report acknowledge message that acknowledges reception of the message sent by the distributed unit in step 1; or the central unit of the base station sends a failure notification message including a part or whole of the "information related to a link failure" to the base station (or the central unit thereof) where the UE is failed.

The effect of this mechanism is to help the central unit to determine the uplink carrier used by the UE in the event of a failure, and further help the base station to optimize the configuration parameters thereof, which may be the configuration parameters required by the served user or those of the serving cell, and to reduce the probability of failure.

Please refer to FIG. 19, a network-side device for transferring supplementary uplink carrier configuration information in the present disclosure includes:

an SUL carrier configuration information acquiring module configured to acquire SUL carrier configuration information;

an SUL carrier configuration information transmitting module configured to transmit a message containing the SUL carrier configuration information to a network-side entity, so that the network-side entity acquires a resource configuration status of other network-side entity; further, the network-side entity may configure a UE with an SUL carrier.

The working processes of the SUL carrier configuration information acquiring module and the SUL carrier configuration information transmitting module are corresponding to steps 101 and 102 in the method for transferring the supplementary uplink carrier configuration information in the present disclosure, respectively, which are omitted herein.

From the detailed description of the present disclosure, it may be seen that the present disclosure at least has the following advantageous technical effects as compared with the prior art: Firstly, by transferring and exchanging the SUL carrier configuration information between the network-side entities, a base station (or a central unit of a base station) acquires an SUL carrier configuration of other base station (or a distributed unit of a base station), so that a network-side entity may determine whether to select a cell containing the SUL carrier for the UE, and acquire the resource status of other network-side entity, thereby fully utilizing the SUL carrier to expand the system uplink coverage.

Secondly, by adding/modifying/releasing an SUL carrier for the UE at the network-side entity, the network side determines, according to the channel state of the UE, to trigger the network entity to configure the UE with a SUL carrier-containing cell and an SUL carrier. Meanwhile, when the UE hands over or a dual-connection is configured for the UE, it further helps to select a suitable cell and configure an SUL carrier for the user.

Thirdly, the configuration parameters of the network-side entity (which may be configuration parameters required by the served user, or configuration parameters of the serving cell) are optimized according to the radio link failure information of the UE on the SUL carrier, and SUL carrier configurations at the network side and the UE side are corrected, which reduces the probability of UE communication failure and increases the reliability of the system FIG. 20 schematically shows a system architecture diagram of an example of a next generation mobile communication system, such as a fifth generation (5G) mobile communication system. As shown, the system mainly includes a user equipment (UE) 11, a next generation radio access network (NG-RAN) 12, an Access and Mobility Management Function (AMF) 13, User Plane Function (UPF) 14, Session Management Function Entity (SMF) 15, Data Network (DN) 16. The Access and Mobility Management Function (AMF) 13, the User Plane Function (UPF) 14 and the Session Management Function Entity (SMF) 15 may be considered as being located in a next generation core network (such as 5GC). It should be understood that the devices in the figures are for purposes of exemplification only and that the system may include numerous UEs, one or more radio access networks, one or more data networks, and other devices, among others.

The user equipment (UE) 11 is a terminal device for receiving data. As used herein, the terms "user equipment" and "UE" may, in some cases, refer to a mobile device, such as a mobile phone, a personal digital assistant, a hand-held or laptop computer, and similar devices with communication capabilities. In other cases, the terms "user equipment" and "UE" may also refer to devices that have similar capabilities but are not portable, such as a desktop computer, a set-top box, or a network device.

The next generation radio access network (NG-RAN) 12 is a radio access network. The NG-RAN 12 includes a base station that provides the UE with access to a wireless network interface. The base station may be a next-generation base station (gNB) or an eNB connected to a next-generation core network (such as 5GC).

The Access and Mobility Management Function (AMF) 13 is responsible for managing the UEs mobile context, security information, etc.

The User Plane Function Entity (UPF) 14 mainly provides user plane functions.

The Session Management Function Entity (SMF) 15 is responsible for session management.

The Data Network (DN) 16 contains services such as carrier services, Internet access and third-party services. NG1 is the interface between the UE and the AMF.

NG-C is the control plane interface between the AMF and the NG-RAN. NG-U is the user plane interface between the NG-RAN and the UPF. NG6 is the interface between the UPF and the DN. NG4 is the interface between the UPF and the SMF.

FIG. 21 schematically shows a structural diagram of an example of a base station (such as a gNB) of an exemplary next generation mobile communication system (such as a 5G mobile communication system). As shown, in some embodiments, in order to support virtualization of network functions, more efficient resource management and scheduling, the gNB may be divided into a central unit (gNB-CU) 30 and distributed units (gNB-DUs) 40, where a standardized public interface F1 is supported between the central unit and the distributed unit. It should be understood that although two gNB-DUs are shown in the figure, gNBs may include more or fewer gNB-DUs. For the sake of simplicity, in the following, the central unit (gNB-CU) and the distributed unit (gNB-DU) of the gNB are also briefly referred to as CU and DU respectively. The CU provides Service Data Adaptation Protocol (SDAP), Packet Data Convergence Protocol (PDCP) and Radio Resource Control (RRC). The DU provides radio link control protocol (RLC), medium access control (MAC) and physical layer functions, among others.

It can be seen from FIG. 21 that a base station (gNB) in a 5G mobile communication system is no longer considered as a single functional entity like a base station (eNB) in a conventional LTE, but is divided into two functional entities, a CU and a DU. These two entities implement different functions. In a conventional LTE network, a base station is generally considered as a functional entity, and interactions among all functions of this entity may be treated as its internal implementations. However, in the 5G mobile communication system, a conventional base station is divided into different functional entities, such as CU and DUs. If the functions contained in the CU and DUs need to be interacted with each other, they are required to do so via the F1 interface. The CU will provide a Connection Mobility Control (CMC) function. The Connection Mobility Control involves management of radio resources in either idle or mobile states, such as setting and/or adjusting of connection mobility parameters. Examples of the connection mobility parameters are parameters such as cell selection/reselection related parameters, cell handover related parameters, and the like. In order to implement the setting and/or adjusting of the connection mobility parameters, the RRC function in the CU is required to generate setting values and/or adjustment values of these connection mobility parameters, and transmit them to other underlying protocol layers (e.g. the PDCP layer, the RLC layer, the MAC layer and the physical layer) to inform the UE. In order to implement the setting and/or adjusting of these connection mobility parameters, it is necessary to refer to the following information, including but not limited to measurement information of the users downlink channel, measurement information of a uplink channel, load information of a neighbor cell, distribution information of a data stream, transmission network (i.e. the links connecting different functional entities, including but not limited to a link connecting a CU and a DU, a link connecting two CUs, a link connecting a CU and another gNB, etc.) and hardware resource information, strategies of operators, and the like. For details of the information, reference may be made to the resource status report initialization process and the resource status update process cited in TS36.423v14.2.0 (2017 March)(Section 8.3.6 and Section 8.3.7). However, only the DU knows some of the above information (e.g., uplink channel measurement information) that is required to be referred in the settings and/or adjusting of the connection mobility parameters. The uplink channel measurement information may include, for example, one or more of the following signal measurements: a measurement of an uplink reference signal, a measurement of an uplink data signal, a measurement of an uplink random access signal, and the like. Accordingly, a mechanism is needed to allow the information known only to a DU to help a CU set and/or adjust the connection mobility parameters.

It should be understood that the terms "CMC related parameters" and "connection mobility parameters" may be used interchangeably herein. The parameter setting can be considered as a special case of the parameter adjustments, so for the sake of brevity, the term "setting and/or adjusting of parameters" is also referred to for short as "parameter adjustment" below unless otherwise indicated explicitly.

Hereinafter, a 5G mobile communication system will be used as an example application environment, and many implementations according to the present disclosure are specifically described. Hereinafter, unless otherwise indicated explicitly, a base station refers to a base station gNB of a 5G mobile communication system including different functional entities CUs and DUs. However, it will be understood by those skilled in the art that the present disclosure is not limited to the gNB, and may be applied to other base stations including different functional entities. The present disclosure is not limited to the following implementations, but is applicable to more other wireless communication systems, for example, a mobile communication system after the 5G.

As described above, the connection mobility parameters in the present disclosure are mobility related parameters such as cell selection/reselection related parameters, cell handover related parameters, and the like. A cell selection/reselection related parameter is, for example, a cell selection or reselection threshold, and the like. A cell handover related parameters is, for example, a threshold for triggering a handover preparation procedure for a specific neighbor cell, and the like.

As described above, the uplink channel measurement information in the present disclosure may include, for example, one or more of the following signal measurements: a measurement of an uplink reference signal, a measurement of an uplink data signal, a measurement of an uplink random access signal, and the like.

In addition, in the present disclosure, the name of a message is only used by way of example and not of limitation, and may be replaced with another name as long as the message can deliver the specified information.

FIG. 29 schematically shows a block diagram of a central unit of a base station, gNB-CU 30, according to an embodiment of the present disclosure.

As shown, the CU 30 may include a transmitting module 31, a receiving module 32, and a processing module 33.

The transmitting module 31 may be configured to transmit a message to a distributed unit.

The receiving module 32 may be configured to receive a message from the distributed unit.

The processing module 33 may be configured for an overall control of the central unit gNB-CU 30. In particular, the processing module 33 may be configured to generate a message to be transmitted, parse a received message, perform a connection mobility adjustment, and the like.

FIG. 30 schematically shows a block diagram of a distributed unit of a base station, gNB-DU 40, according to an embodiment of the present disclosure.

As shown, the DU 40 may include a transmitting module 41, a receiving module 42, and a processing module 43.

The transmitting module 41 may be configured to transmit a message to the central unit.

The receiving module 42 may be configured to receive a message from the central unit. The processing module 43 may be configured for an overall control of the distributed unit gNB-DU 40. In particular, the processing module 43 may be configured to generate a message to be transmitted, parse a received message, and the like.

It should be understood that the structure of the central unit and the distributed unit of the base station shown above is merely exemplary and not limitative. The transmitting module and the receiving module in the central unit or distributed unit may be separate modules or may be integrated into a transceiver module. In addition, the central unit and/or the distributed unit may include more modules, for example, may include modules available for the central unit or the distributed unit of the base station that may have been developed or will be developed in the future, and the like.

The central unit 30 and the distributed unit 40 in FIGS. 10 and 11 may cooperate to perform the connection mobility adjustment. The specific operations of the gNB-CU and the gNB-DU will be described in detail below with reference to various embodiments.

FIGS. 22A and 22B schematically illustrate a schematic diagram of a first method for performing a connection mobility adjustment according to a first embodiment of the present disclosure. In this embodiment, a gNB-CU initiates a resource status request to a gNB-DU. FIG. 22A shows a situation where the request succeeds or at least partially succeeds. FIG. 22B shows the failure of the request.

As shown in FIG. 22A, the method begins at step 301.

In step 301, the gNB-CU transmits a gNB-DU resource status request message to the gNB-DU. The gNB-DU resource status request message may contain a combination of one or more of the following:

Identification information of the gNB-DU.

Instruction information that the gNB-DU needs to report uplink channel measurement information to the gNB-CU.

A list of cells to which the above information required to be reported belongs. Information in this list indicates that the gNB-CU requests the gNB-DU to report the above information for the cells in this list.

Period information or trigger information for reporting the above information.

If the above information, which is requested to be reported, needs to be periodically reported by the gNB-DU, the request message will contain the period information. In some implementations, the period for reporting the above information may be different for different cells, and thus the request message will give different reporting period information for different cells. In some other implementations, the foregoing information for each cell may be reported at the same periodicity, and then a common reporting period information will be provided in the request message.

If the above information, which is requested to be reported, needs to be triggered by the gNB-DU according to the occurrence of a specific event, the request message will contain event information that triggers the gNB-DU to report. For example, examples of the above trigger event may be: the average of the uplink channel measurement results being less than a first threshold; the minimum value of the uplink channel measurement results being less than a second threshold; the uplink channel measurement result indicating that it is less than the third threshold and greater than the fourth threshold, or the cell load being changed, and the like. The setting of the trigger event for each cell may be different or may be the same. Thus, in some implementations, the trigger events may be set the same. In some other implementations, different trigger thresholds for the same trigger event may be set for different cells. In still other implementations, different trigger events may be set for different cells.

If some cells report periodically and some cells perform an event-triggered report for the information requested to be reported, the request message may contain a reporting period set for the periodically reporting cell and a trigger event set for the event-triggered reporting cell. The reporting period and the trigger event may be set respectively in the corresponding manner as described above.

Measurement identification information related to the uplink channel measurement, such as the measurement identity assigned by the gNB-CU corresponding to the report of the uplink channel measurement.

Instruction information related to controlling the report of the uplink channel measurement, such as starting the measurement, stopping the measurement, and the like.

If the gNB-DU can make the measurement requested by the gNB-CU or at least part of it, the method proceeds to step 302.

In step 302, the gNB-DU transmits a gNB-DU resource status response message to the gNB-CU. The gNB-DU resource status response message may contain a combination of one or more of the following:

Measurement identification information contained in the received gNB-DU resource status request message.

Measurement identification information assigned by the gNB-DU relating to this uplink channel measurement. This identification information, together with the above measurement identification information contained in the gNB-DU resource status request message, may uniquely characterize the report of the uplink channel measurement.

Some cells can make the measurements requested in the gNB-DU resource status request message, while some cells cannot do so. Thus, the gNB-DU may indicate in the gNB-DU resource status response message a list of cells that can make the requested measurement and reporting, and/or a list of cells that cannot make the requested measurement and reporting. Preferably, in case the list of cells that cannot make the requested measurement and reporting is indicated in the gNB-DU resource status response message, a reason that the requested measurement and reporting cannot be made may also be indicated.

In step 303, the gNB-DU transmits a gNB-DU resource status update Message to the gNB-CU. If the gNB-DU is instructed, in the gNB-DU resource status request message, to periodically report, the gNB-DU reports according to the periodicity in the request message. If the gNB-DU is instructed, in the gNB-DU resource status request message, to make an event-triggered report, the gNB-DU reports upon the trigger event occurs. The resource status update message may contain one or more of the following:

Cell ID, the identity of the cell to which the measured uplink signal belongs.

User ID, the identity of the UE to which the measured uplink signal belongs.

Measured signal strength of the uplink signal from the UE indicated by the user ID, such as reference signal received power (RSRP), received signal strength indicator (RSSI), signal energy. The signal strength information may be an actual measurement result or a quantized result (for example, 0 to 100, 0 means the minimum signal strength, and 100 means the maximum signal strength)

Measured signal quality of the uplink signal from the UE indicated by the user ID, such as reference signal received quality (RSRQ). Similarly, the signal quality information may be an actual measurement result or a quantized result (for example, 0 to 100, 0 means the worst signal quality, and 100 means the best signal quality).

Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.

Measurement results indicating the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).

It is easy to understand that the resource status update message needs to include a user ID when the resource status update message includes the measured signal strength, signal quality and/or level of the uplink signal from the UE indicated by the user ID. When the resource status update message includes the measurement results indicating the signal strengths/signal qualities of the uplink signals of all the UEs in the cell indicated by the Cell ID, the resource status update message may not include user IDs.

In step 304, the gNB-CU performs a connection mobility parameter adjustment according to the obtained measurement result of the uplink signal and other information. This step 304 may be performed by the processing module. The other information includes, but not limited to, measurement information of the users downlink channel, load information of a neighbor cell, distribution information of a data stream, transmission network (i.e. the links connecting different functional entities, containing but not limited to a link connecting a CU and a DU, a link connecting two CUs, a link connecting a CU and another gNB, etc.) and hardware resource information, strategies of operators, and the like, to perform the connection mobility parameter adjustment.

FIG. 22B shows the situation when the gNB-DU cannot make the measurement requested by the gNB-CU, which may result in a feedback of a failure message.

As shown, step 301 in FIG. 22B is the same as step 301 in FIG. 22A.

In step 301, the gNB-CU transmits a gNB-DU resource status request message to the gNB-DU.

If the gNB-DU cannot make the measurement requested by the gNB-CU, the method proceeds to step 302a.

In step 302a, the gNB-DU transmits a gNB-DU resource status failure message to the gNB-CU.

In some implementations, the gNB-DU resource status failure message may simply indicate that the gNB-DU resource status request cannot be responded to.

In other embodiments, the gNB-DU resource status failure message may indicate more information, for example, may contain one or more of the following:

Measurement identification information contained in the received gNB-DU resource status request message.

Measurement identification information assigned by the gNB-DU relating to this uplink channel measurement information. This identification information, together with the above measurement identification information contained in the gNB-DU resource status request message, may uniquely characterize the report of the uplink channel measurement.

For the measurement requested in the gNB-DU resource status request message, the gNB-DU may indicate in the gNB-DU resource status failure message a list of cells for which the requested measurement and reporting cannot be made, and reasons thereof.

FIGS. 23A and 23B schematically show a schematic diagram of a second method for performing a connection mobility adjustment according to a second embodiment of the present disclosure. In this embodiment, the connection mobility adjustment request is initiated by the gNB-CU. FIG. 23A shows a situation where the adjustment request is accepted or at least partially accepted. FIG. 23B shows a situation where the adjustment request fails.

As shown in FIG. 23A, the method begins at step 401.

In step 401, the gNB-CU transmits a gNB connection mobility adjustment request message to the gNB-DU. The gNB connection mobility adjustment request message may contain a combination of one or more of the following:

Cell identification information

The cell identification information identifies a cell for which a connection mobility parameter needs to be adjusted.

The cell identification information of the cell for which a connection mobility parameter needs to be adjusted includes an identity of one cell. This cell may belong to the gNB-DU that receives the message, or may belong to another gNB-DU.

The cell identification information of the cell for which a connection mobility parameter needs to be adjusted may contain identities of two or more cells. The two or more cells may belong to a same gNB-DU, to different gNB-DUs controlled by a same gNB-CU, or to different gNBs.

Adjustment suggestion information for the connection mobility parameter.

The adjustment suggestion information for the connection mobility parameter may be a suggestion for adjusting the connection mobility parameters given by the gNB-CU for the cells corresponding to each piece of the cell identification information mentioned above.

The adjustment suggestion information for the connection mobility parameter may include at least one of the following:

Information about delaying or advancing cell selection/reselection/handover as suggested by the gNB-CU. For example, it may be, as suggested by the gNB-CU, an indication message about delaying or advancing a handover by adjusting the mobility parameters. For example, if the information is a first value (e.g., 0), it indicates that the gNB-CU will delay a user handover of the cell by adjusting the mobility parameters. Conversely, if the information is a second value (e.g., 1), it indicates that the gNB-CU will advance the user handover of the cell by adjusting the mobility parameters.

A reference value suggested by the gNB-CU for connection mobility parameter adjustment A reference value range (which may be represented by a maximum value and a minimum value of the range) suggested by the gNB-CU for connection mobility parameter adjustment In some implementations, the adjustment suggestion information for each cell may be different. In some other implementations, the adjustment suggestion information for each cell may be the same. In still other implementations, the cells to be adjusted may be divided into multiple groups. For example, the principles for the grouping may be as follows: the cells in the same group have the same reason for adjusting the connection mobility parameters; the cells in the same group may affect each other when adjusting the mobility parameters; and the like. In the cell grouping implementation, corresponding suggestion information may be given for each cell in each group respectively, as shown in Table 1 below.

TABLE 1

| Group 1 | Group 2 | Group 3 |
| --- | --- | --- |
| Cell 1 | Cell 2, Cell 3 | Cell 4, Cell 5, Cell 6 |
| An indication message about delaying or advancing a handover | A reference value for the connection mobility parameter adjustment suggested for Cell 2 A reference value for the connection mobility parameter adjustment suggested for Cell 3 | A reference value range for the connection mobility parameter adjustment suggested for Cell 4 A reference value range for the connection mobility parameter adjustment suggested for Cell 5 A reference value range for the connection mobility parameter adjustment suggested for Cell 6 |

Reasons for the connection mobility parameter adjustment.

The reason for the connection mobility parameter adjustment indicates the specific reason that the gNB-CU suggests the connection mobility parameter adjustment, such as load balancing, handover optimization, and the like. For example, if there are a plurality of cells or groups of cells to adjust, reasons may be given respectively for each cell or each group of cells.

In step 402, the gNB-DU replies to the gNB-CU with a gNB connection mobility adjustment acknowledgement message. The gNB connection mobility adjustment acknowledgement message acknowledges the gNB connection mobility adjustment request message. The gNB-DU determines whether the adjustment suggestion information for the connection mobility parameter, which is proposed by the gNB-CU, is feasible according to the obtained information (such as uplink channel quality information, downlink channel quality information, and the like), and notifies the gNB-CU of the determination result. The gNB connection mobility adjustment acknowledgement message may contain one or more of the following:

Cell identities of cells corresponding to feasible suggestion information;
Cell identities of cells corresponding to infeasible suggestion information.

Alternatively, in some implementations, the gNB connection mobility adjustment acknowledgement message may further include additional information for cells corresponding to feasible suggestion information; and/or additional information for cells corresponding to infeasible suggestion information.

The additional information for cells corresponding to feasible suggestion information may include, for example, further adjustment suggestion information given by the gNB-DU.

If the adjustment suggestion information for the connection mobility parameter of a cell given by the gNB-CU in step 401 is a reference value range for the connection mobility parameter adjustment, the acknowledgement message may contain a reference value corresponding to the suggested connection mobility parameter adjustment for the cell (this reference value is within the suggested reference value range).

The additional information for cells corresponding to infeasible suggestion information may include, for example, at least one of the following given by the gNB-CU:

New adjustment suggestion information for a connection mobility parameter of the cell corresponding to the infeasible suggestion information;
Uplink channel measurement information for the cells to be adjusted which are included in the connection mobility adjustment request message; and/or
Reasons that the suggestion is not accepted.

Specifically, there are many forms for the new adjustment suggestion information, which is given by the gNB-CU, for a connection mobility parameter of the cells corresponding to the infeasible suggestion information.

If the adjustment suggestion information, which is given by the gNB-CU in step 401, for the connection mobility parameter of the cell is information for delaying or advancing a cell selection/reselection/handover, the acknowledgement message may contain suggestion information for the cell which is given by the gNB-DU, such as a suggestion about keeping the information or parameter for delaying or advancing the cell selection/reselection/handover unchanged, or a suggestion about a reference value for the connection mobility parameter adjustment, or a suggestion about a reference value range for the connection mobility parameter adjustment.

If the adjustment suggestion information, which is given by the gNB-CU in step 401, for the connection mobility parameter of the cell is a reference value for the connection mobility parameter adjustment, the acknowledgement message may contain a reference value range for the parameter adjustment of the cell as suggested by the gNB-DU.

If the adjustment suggestion information, which is given by the gNB-CU in step 401, for the connection mobility parameter of the cell is a reference value range for the connection mobility parameter adjustment, the acknowledgement message may contain a new reference value range or a reference value for the parameter adjustment of the cell as suggested by the gNB-DU.

Specifically, in some implementations, the gNB connection mobility adjustment acknowledgement message includes uplink channel measurement information of the cell served by the gNB-DU and presented in the request message in step 401, and may include one or more of the following:

Cell ID, the identity of the cell to which the measured uplink signal belongs
User ID, the identity of the UE to which the measured uplink signal belongs
Measured signal strength of the uplink signal from the UE indicated by the user ID, such as RSRP, RSSI, and signal energy. The strength information may be an actual measurement result or a quantized result (for example, 0 to 100, 0 means the minimum signal strength, and 100 means the maximum signal strength).
Measured signal quality of the uplink signal from the UE indicated by the user ID, such as RSRQ. The signal quality information may be an actual measurement result or a quantized result (for example, 0 to 100, 0 means the worst signal quality, and 100 means the best signal quality).
Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.
Measurement results of the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).

Specifically, in some implementations, the gNB connection mobility adjustment acknowledgement message may include a reason that the adjustment suggestion, given by the gNB-CU in step 401, for the connection mobility parameter of the cell is not accepted.

Then, in step 403, the gNB-CU performs a connection mobility parameter adjustment according to the received gNB connection mobility adjustment acknowledgement. This step may be performed by the processing module.

FIG. 23B shows a situation where the adjustment fails. Step 401 in FIG. 23B is the same as that in FIG. 23A.

In step 401, the gNB-CU transmits a gNB connection mobility adjustment request message to the gNB-DU.

If the gNB-DU does not agree with the suggestion information for all cells given by the gNB-CU, it proceeds to step 402a.

In step 402a, the gNB-DU may reply to the gNB-CU with a gNB connection mobility adjustment failure message.

In some implementations, the gNB connection mobility adjustment failure message may simply indicate that the gNB connection mobility adjustment request cannot be responded to.

In some other embodiments, the gNB connection mobility adjustment failure message may indicate more information, which may contain, for example, cell identifiers corresponding to infeasible suggestion information. Alternatively, in some implementations, the gNB connection mobility adjustment failure message may further include additional information for cells corresponding to infeasible suggestion information, for example, it may include at least one of the following:

New adjustment suggestion information for a connection mobility parameter of the cell corresponding to the infeasible suggestion information;

Uplink channel measurement information for the cells to be adjusted which are included in the connection mobility adjustment request message; and/or Reasons for a parameter adjustment failure.

Specifically, there are many forms for the new adjustment suggestion information, which is given by the gNB-CU, for a connection mobility parameter of the cell corresponding to the infeasible suggestion information.

If the adjustment suggestion information, which is given by the gNB-CU in step 401, for the connection mobility parameter of the cell is information for delaying or advancing a cell selection/reselection/handover, the acknowledgement message may contain suggestion information for the cell which is given by the gNB-DU, such as a suggestion about keeping the information or parameter for delaying or advancing the cell selection/reselection/handover unchanged, or a suggestion about a reference value for the connection mobility parameter adjustment, or a suggestion about a reference value range for the connection mobility parameter adjustment.

If the adjustment suggestion information, which is given by the gNB-CU in step 401, for the connection mobility parameter of the cell is a reference value for the connection mobility parameter adjustment, the acknowledgement message may contain a reference value range for the parameter adjustment of the cell as suggested by the gNB-DU.

If the adjustment suggestion information, which is given by the gNB-CU in step 401, for the connection mobility parameter of the cell is a reference value range for the connection mobility parameter adjustment, the acknowledgement message may contain a new reference value range or a reference value for the parameter adjustment of the cell as suggested by the gNB-DU.

Specifically, in some implementations, the gNB connection mobility adjustment acknowledgement message includes uplink channel measurement information of the cell served by the gNB-DU and presented in the request message in step 401, and may include one or more of the following:

Cell ID, the identity of the cell to which the measured uplink signal belongs

User ID, the identity of the UE to which the measured uplink signal belongs

Measured signal strength of the uplink signal from the UE indicated by the user ID, such as RSRP, RSSI, and signal energy. The strength information may be an actual measurement result or a quantized result (for example, 0 to 100, 0 means the minimum signal strength, and 100 means the maximum signal strength).

Measured signal quality of the uplink signal from the UE indicated by the user ID, such as RSRQ. The signal quality information may be an actual measurement result or a quantized result (for example, 0 to 100, 0 means the worst signal quality, and 100 means the best signal quality).

Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.

Measurement results indicating the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).

FIGS. 24A and 24B schematically show a schematic diagram of a third method for performing a connection mobility adjustment according to a third embodiment of the present disclosure. The method in this embodiment is similar to the method in the last embodiment, except that the gNB-DU initiates the connection mobility adjustment. At first, the gNB-DU sends the gNB-CU a gNB connection mobility adjustment required message, and operations thereafter are similar to those in the method of the last embodiment. FIG. 24A shows a situation where the adjustment request is accepted or at least partially accepted. FIG. 24B shows a situation where the adjustment request fails.

As shown in FIG. 24A, the method begins at step 501.

In step 501, the gNB-DU transmits a gNB connection mobility adjustment required message to the gNB-CU. The gNB connection mobility adjustment required message may contain one or more of the following:

Cell identification information of a cell for which a connection mobility parameter needs to be adjusted;

The cell identification information may be an identity of one cell, identities of two cells, or identities of more than two cells.

Alternatively, the cell identification information may be divided into multiple groups, and each group may contain identities of one or two or more cells. For example, the principles for the grouping may be as follows: the cells in the same group have the same reason for adjusting the connection mobility parameters; the cells in the same group may affect each other when adjusting the mobility parameters; and the like.

Uplink channel measurement information of the cell served by the gNB-DU and presented in the gNB connection mobility adjustment required message The information may include one or more of the following:

Cell ID, the identity of the cell to which the measured uplink signal belongs

User ID, the identity of the user to which the measured uplink signal belongs

Measured signal strength of the uplink signal from the UE indicated by the user ID, such as RSRP, RSSI, and signal energy The strength information may be an actual measurement result or a quantized result (for example, 0 to 100, 0 means the minimum signal strength, and 100 means the maximum signal strength).

Measured signal quality of the uplink signal from the UE indicated by the user ID, such as RSRQ. The signal quality information may be an actual measurement result or a quantized result (for example, 0 to 100, 0 means the worst signal quality, and 100 means the best signal quality).

Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.

Measurement results of the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).

The reason for the connection mobility parameter adjustment, such as load balancing, handover optimization, and the like. This reason information may be given respectively for each cell, and may be given respectively for each group of cells if cells is grouped.

The method then proceeds to step 502.

In step 502, the gNB-CU transmits a gNB connection mobility adjustment message to the gNB-DU. The gNB connection mobility adjustment message may be considered as a special type of the gNB connection mobility adjustment request message in the above embodiment. For each cell represented by the cell identities in step 501, the gNB connection mobility adjustment message may contain a combination of one or more of the following:

Cell identification information

Particularly, the cell identification information herein may include a part or all of the cell identification information of the cell contained in the gNB connection mobility adjustment required message in step 501, for which the connection mobility parameter adjustment is needed.

Adjustment suggestion information for the connection mobility parameter.

This is suggestion information for the mobility parameter adjustment, which is given by the gNB-CU for the cell corresponding to the above cell identification information.

The adjustment suggestion information for the connection mobility parameter may include at least one of the following:

Information about delaying or advancing cell selection/reselection/handover as suggested by the gNB-CU. For example, it may be, as suggested by the gNB-CU, an indication message about delaying or advancing a handover by adjusting the mobility parameters. For example, if the information is a first value (e.g., 0), it indicates that the gNB-CU will delay a user handover of the cell by adjusting the mobility parameters. Conversely, if the information is a second value (e.g., 1), it indicates that the gNB-CU will advance the user handover of the cell by adjusting the mobility parameter.

A reference value suggested by the gNB-CU for connection mobility parameter adjustment A reference value range (which may be represented by a maximum value and a minimum value of the range) suggested by the gNB-CU for connection mobility parameter adjustment Similar to the above embodiment, in some implementations, the adjustment suggestion information for each cell may be different. In some other implementations, the adjustment suggestion information for each cell may be the same. In still other implementations, the cells to be adjusted may be divided into multiple groups. In the cell grouping implementation, corresponding suggestion information may be given for each cell in each group respectively.

In addition, for a cell that does not change the connection mobility parameter, this can be implemented by containing only a cell identity in step 502 without any adjustment suggestion information, or by containing no corresponding cell identity.

In step 503, the gNB-DU transmits a gNB connection mobility adjustment acknowledgement message to the gNB-CU. This acknowledgement message is similar to the acknowledgement message in step 402 of the above embodiment. In this embodiment, the acknowledgement message may contain one or more of the following:

Cell identities of cells corresponding to feasible suggestion information in step 502

Alternatively, if the suggestion information is a reference range for connection mobility parameter adjustment, it may also contain a suggested reference value. In one embodiment, the reference value is within a suggested reference value range for parameter adjustment, while, in another embodiment, the reference value may not be within the suggested reference value range for parameter adjustment.

If only suggestion information for part of cells is feasible, for cells with feasible information, the above information will be contained in the message as described above, while, for infeasible cells, the message further contains at least one of the following messages:

Identities of infeasible cells

Suggestion information about infeasible cells

If the suggestion information in step 502 for the cell is information for delaying or advancing a cell selection/reselection/handover, the acknowledgement message may contain suggestion information for the cell which is given by the gNB-DU, such as a suggestion about keeping the information or parameter for delaying or advancing the cell selection/reselection/handover unchanged, or a suggestion about a reference value for the connection mobility parameter adjustment, or a suggestion about a reference value range for the connection mobility parameter adjustment.

If the suggestion information in step 502 for the cell is a reference value for the parameter adjustment, the message may contain a suggested reference value range for the parameter adjustment of the cell.

If the suggestion information in step 502 for the cell is a reference value range for the parameter adjustment, the message may contain a new suggested reference value range or a suggested reference value for the parameter adjustment of the cell.

Uplink channel measurement information of the cell served by the gNB-DU and corresponding to infeasible suggestion information in step 502, which may include one or more of the following:

Cell ID, the identity of the cell to which the measured uplink signal belongs

User ID, the identity of the user to which the measured uplink signal belongs

Measured signal strength of the uplink signal from the UE indicated by the user ID, such as RSRP, RSSI, and signal energy The strength information may be an actual measurement result or a quantized result (for example, 0 to 100, 0 means the minimum signal strength, and 100 means the maximum signal strength).

Measured signal quality of the uplink signal from the UE indicated by the user ID, such as RSRQ. The signal quality information may be an actual measurement result or a quantized result (for example, 0 to 100, 0 means the worst signal quality, and 100 means the best signal quality).

Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.

Measurement results indicating the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).

Reasons that the suggestion is not accepted.

Then, in step 504, the gNB-CU performs a connection mobility parameter adjustment according to the received gNB connection mobility adjustment acknowledgement. This step may be performed by the processing module.

FIG. 24B shows a situation where the adjustment fails. Steps 501 and 502 in FIG. 24B are the same as those in FIG. 24A.

In step 501, the gNB-DU transmits a gNB connection mobility adjustment required message to the gNB-CU.

In step 502, the gNB-CU transmits a gNB connection mobility adjustment message to the gNB-DU.

If the gNB-DU does not agree with all the suggestion information given by the gNB-CU, the method proceeds to step 503a. In step 503a, the gNB-DU replies with a gNB connection mobility adjustment failure message.

For each cell where the suggestion information is infeasible, the adjustment failure message may contain one or more of the following:

Identities of infeasible cells suggestion information about infeasible cells

If the suggestion information in step 502 for the cell is information for delaying or advancing a cell selection/reselection/handover, the acknowledgement message may contain suggestion information for the cell which is given by the gNB-DU, such as a suggestion about keeping the information or parameter for delaying or advancing the cell selection/reselection/handover unchanged, or a suggestion about a reference value for the connection mobility parameter adjustment, or a suggestion about a reference value range for the connection mobility parameter adjustment.

If the suggestion information in step 502 for the cell is a reference value for the parameter adjustment, the message may contain a suggested reference value range for the parameter adjustment of the cell.

If the suggestion information in step 502 for the cell is a reference value range for the parameter adjustment, the message may contain a new suggested reference value range or a suggested reference value for the parameter adjustment of the cell.

Uplink channel measurement information of the cell served by the gNB-DU and presented in the gNB connection mobility adjustment required message, which may include one or more of the following:

Cell ID, the identity of the cell to which the measured uplink signal belongs

User ID, the identity of the user to which the measured uplink signal belongs

Measured signal strength of the uplink signal from the user indicated by the user ID, such as RSRP, RSSI, and signal energy. The strength information may be an actual measurement result or a quantized result (for example, 0 to 100, 0 means the minimum signal strength, and 100 means the maximum signal strength)

Measured signal quality of the uplink signal from the user indicated by the user ID, such as RSRQ. The signal quality information may be an actual measurement result or a quantized result (for example, 0 to 100, 0 means the worst signal quality, and 100 means the best signal quality)

Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.

Measurement results indicating the signal strengths/signal qualities of the uplink signals of all the users in the cell indicated by the Cell ID, such as an average value of the measurement results for all the users. The measurement results may be actual measurement results or quantized results (for example, 0-100, 0 means the minimum signal strength, and 100 means the maximum signal strength)

Reasons for a parameter adjustment failure.

FIGS. 25A and 25B schematically illustrate a schematic diagram of a fourth method for performing a connection mobility adjustment according to a fourth embodiment of the present disclosure. In this embodiment, the connection mobility adjustment is initiated by the gNB-DU. FIG. 25A shows a situation where the adjustment request is accepted or at least partially accepted. FIG. 25B shows a situation where the adjustment request fails.

As shown in FIG. 25A, the method begins at step 601.

In step 601, the gNB-DU transmits a gNB connection mobility adjustment request message to the gNB-CU, and the message may contain a combination of one or more of the following:

Cell identification information

This identification information may be an identity of a cell which may belong to the gNB-DU that sends the message, or may belong to another gNB-DU.

This identification information may also contain identification information of two or more cells where each cell may belong to a same gNB-DU, to different gNB-DUs controlled by a same gNB-CU, or to different gNBs.

A suggestion for adjusting the mobility parameters given by the gNB-DU for each piece of the cell identification information, which may be one of the following three pieces of suggestions information:

Information about delaying or advancing cell selection/reselection/handover as suggested by the gNB-DU. For example, it may be, as suggested by the gNB-CU, an indication message about delaying or advancing a handover by adjusting the mobility parameters. For example, if the information is a first value (e.g., 0), it indicates that the gNB-CU is suggested to delay a user handover of the cell by adjusting the mobility parameters. Conversely, if the information is a second value (e.g., 1), it indicates that the gNB-CU is suggested to advance the user handover of the cell by adjusting the mobility parameter.

A reference value suggested by the gNB-DU for connection mobility parameter adjustment A reference value range (which may be represented by a maximum value and a minimum value of the range) suggested by the gNB-DU for connection mobility parameter adjustment In some implementations, the adjustment suggestion information for each cell may be different. In some other implementations, the adjustment suggestion information for each cell may be the same. In still other implementations, the cells to be adjusted may be divided into multiple groups. For example, the principles for the grouping may be as follows: the cells in the same group have the same reason for adjusting the connection mobility parameters; the cells in the same group may affect each other when adjusting the mobility parameters; and the like. In the cell grouping implementation, corresponding suggestion information may be given for each cell in each group respectively, as shown in Table 2 below.

TABLE 2

| Group 1 | Group 2 | Group 3 |
| --- | --- | --- |
| Cell 1 | Cell 2, Cell 3 | Cell 4, Cell 5, Cell 6 |
| An indication message about delaying or advancing a handover | A reference value for the connection mobility parameter adjustment suggested for Cell 2 | A reference value range for the connection mobility parameter adjustment suggested for Cell 4 |
| | A reference value for the connection mobility parameter adjustment suggested for Cell 3 | A reference value range for the connection mobility parameter adjustment suggested for Cell 5 |
| | | A reference value range for the connection mobility parameter adjustment suggested for Cell 6 |

Uplink channel measurement information of the cell served by the gNB-DU and presented in the request message, which may include one or more of the following:
  Cell ID, the identity of the cell to which the measured uplink signal belongs
  User ID, the identity of the UE to which the measured uplink signal belongs
  Measured signal strength of the uplink signal from the UE indicated by the user ID, such as RSRP, RSSI, and signal energy. The strength information may be an actual measurement result or a quantized result (for example, 0 to 100, 0 means the minimum signal strength, and 100 means the maximum signal strength).
  Measured signal quality of the uplink signal from the UE indicated by the user ID, such as RSRQ. The signal quality information may be an actual measurement result or a quantized result (for example, 0 to 100, 0 means the worst signal quality, and 100 means the best signal quality).
  Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.
  Measurement results indicating the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).
  Reasons that the gNB-DU suggests performing the connection mobility parameter adjustment, such as load balancing, handover optimization, and the like. If suggestions for a plurality of cells or groups of cells are included, each cell or each group of cells may be given a corresponding reason.

In step 602, the gNB-CU replies to the gNB-DU with a gNB connection mobility adjustment acknowledgement message. The gNB-CU may reply to the gNB-DU whether suggestion information for each cell is feasible according to the obtained information (such as uplink channel quality information, downlink channel quality information, and the like), which may contain one or more of the following:
  Cell identities of cells corresponding to feasible suggestion information
  Alternatively, if the suggested information is a reference value range for parameter adjustment, the acknowledgement message may also contain a suggested reference value corresponding to the cell. In one embodiment, the reference value is within a suggested reference value range for parameter adjustment, while, in another embodiment, the reference value may not be within the suggested reference value range for parameter adjustment.
  If suggestion information for more than one cells is contained in step 601 and only suggestion information for part of the cells is feasible, for cells with feasible information, the above information will be contained in the message as described above, while, for infeasible cells, the message further contains at least one of the following messages:
  Cell identities of cells corresponding to infeasible suggestion information
  Suggestion information for infeasible cells:
  If the suggestion information in step 601 for the cell is an instruction message about delaying or advancing a handover, the message may contain suggestion information for the cell, such as a suggestion about keeping the parameter for delaying or advancing the handover unchanged, or a suggestion about a reference value range for parameter adjustment, or a suggestion about a reference value for parameter adjustment
  If the suggestion information in step 601 for the cell is a reference value for the parameter adjustment, the message may contain a suggested reference value range for the parameter adjustment of the cell
  If the suggestion information in step 601 for the cell is a reference value range for the parameter adjustment, the message may contain an identity of the cell and a newly suggested reference value range or a suggested reference value for the parameter adjustment of the cell.
  Reasons that the suggestion is not accepted.

Then, in step 603, the gNB-CU performs a connection mobility parameter adjustment.

It should be understood that the execution order of step 603 and step 602 may be arbitrary, which is not limited to that shown in FIG. 25A. Step 603 may be performed before, after or in parallel with step 602.

In addition, step 602 is optional. In some implementations, step 602 may be omitted.

FIG. 25B shows a situation where the adjustment fails. Step 601 in FIG. 25B is the same as that in FIG. 25A.

In step 601, the gNB-DU transmits a gNB connection mobility adjustment request message to the gNB-CU.

If the gNB-CU does not agree with all the suggestion information given by the gNB-DU, the method proceeds to step 602a.

In step 602a, the gNB-CU may reply with a gNB connection mobility adjustment failure message.

In some implementations, the gNB connection mobility adjustment failure message may simply indicate that the gNB connection mobility adjustment request cannot be responded to.

In some other embodiments, the gNB connection mobility adjustment failure message may indicate more information. For each cell, the adjustment failure message may contain at least of the following:

Cell identities of cells corresponding to infeasible suggestion information

Suggestion information for infeasible cells:

If the suggestion information in step 601 for the cell is an instruction message about delaying or advancing a handover, the message may contain suggestion information for the cell, such as a suggestion about keeping the parameter for delaying or advancing the handover unchanged, or a suggestion about a reference value range for parameter adjustment, or a suggestion about a reference value for parameter adjustment If the suggestion information in step 601 for the cell is a reference value for the parameter adjustment, the message may contain a suggested reference value range for the parameter adjustment of the cell If the suggestion information in step 601 for the cell is a reference value range for the parameter adjustment, the message may contain an identity of the cell and a newly suggested reference value range or a suggested reference value for the parameter adjustment of the cell.

Reasons for a parameter adjustment failure.

FIGS. 26A and 26B schematically illustrate a schematic diagram of a fifth method for performing a connection mobility adjustment according to a fifth embodiment of the present disclosure; The method in this embodiment is similar to the method in the last embodiment, except that the gNB-CU initiates the connection mobility adjustment. At first, the gNB-CU sends the gNB-DU a gNB connection mobility adjustment demand message, and operations thereafter are similar to those in the method of the above embodiment.

FIG. 26A shows a situation where the adjustment succeeds or at least partially succeeds FIG. 26B shows a situation where the adjustment fails.

As shown in FIG. 26A, the method begins at step 701.

In step 701, the gNB-CU transmits a gNB connection mobility adjustment required message to the gNB-DU, and the message may contain a combination of one or more of the following:

Cell identification information of a cell for which a connection mobility parameter needs to be adjusted;

The identification information may be an identity of one cell, identities of two cells, or identities of more than two cells.

Alternatively, the cell identification information may be divided into multiple groups, and each group may contain identities of one or two or more cells. For example, the principles for the grouping may be as follows: the cells in the same group have the same reason for adjusting the connection mobility parameters; the cells in the same group may affect each other when adjusting the mobility parameters; and the like.

The reason for the connection mobility parameter adjustment, such as load balancing, handover optimization, and the like. This reason information may be given respectively for each cell. Alternatively, this reason information may be given respectively for each group of cells if cells is grouped.

In step 702, the gNB-CU transmits a gNB connection mobility adjustment message to the gNB-DU. The gNB connection mobility adjustment message may be considered as a special type of the gNB connection mobility adjustment request message. For each cell represented by the cell identities contained in step 701, the message may contain a combination of one or more of the following:

Cell identification information

Particularly, the cell identification information herein may include a part or all of the cell identification information of the cell contained in the gNB connection mobility adjustment required message in step 701, for which the connection mobility parameter adjustment is needed.

The suggestion information for the mobility parameter adjustment given by the gNB-DU, which may be one of the following:

An indication message for delaying or advancing a handover by adjusting the mobility parameters, or keeping the handover parameter unchanged, as suggested by the gNB-DU. For example, if the message is 0, it indicates that the gNB-DU suggests delaying user handover of the cell indicated by the cell identification information by adjusting the mobility parameter; if the message is 1, it indicates advancing the user handover of the cell; and if the message is 2, it indicates keeping the parameter for cell handover unchanged.

A reference value suggested by the gNB-DU for connection mobility parameter adjustment Reference value range for connection mobility parameter adjustment.

Similar to the above embodiment, in some implementations, the adjustment suggestion information for each cell may be different. In some other implementations, the adjustment suggestion information for each cell may be the same. In still other implementations, the cells to be adjusted may be divided into multiple groups. In the cell grouping implementation, corresponding suggestion information may be given for each cell in each group respectively.

In addition, for a cell that does not change the connection mobility parameter, this can be implemented by including only a cell identity in step 702 without any adjustment suggestion information, or by including no corresponding cell identity.

Uplink channel measurement information of the cell served by the gNB-DU and presented in the gNB connection mobility adjustment required message in step 701, which may include one or more of the following:

Cell ID, the identity of the cell to which the measured uplink signal belongs

User ID, the identity of the UE to which the measured uplink signal belongs

Measured signal strength of the uplink signal from the UE indicated by the user ID, such as RSRP, RSSI, and signal energy. The strength information may be an actual measurement result or a quantized result (for example, 0 to 100, 0 means the minimum signal strength, and 100 means the maximum signal strength).

Measured signal quality of the uplink signal from the UE indicated by the user ID, such as RSRQ. The signal quality information may be an actual measurement result or a quantized result (for example, 0 to 100, 0 means the worst signal quality, and 100 means the best signal quality).

Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.

Measurement results indicating the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).

In step 703, the gNB-CU transmits to the gNB-DU a gNB connection mobility adjustment acknowledgement message. The acknowledgement message may include one or more of the following:

Cell identities of cells corresponding to feasible suggestion information in step 702

Alternatively, if the suggestion information is a reference range for connection mobility parameter adjustment, it may also contain a suggested reference value. In one embodiment, the reference value is within a suggested reference value range for parameter adjustment, while, in another embodiment, the reference value may not be within the suggested reference value range for parameter adjustment.

If only suggestion information for part of cells is feasible, for cells with feasible information, the above information will be contained in the message as described above, while, for infeasible cells, the message further contains at least one of the following messages:

Identities of infeasible cells

Suggestion information about infeasible cells

If the suggestion information in step 702 for the cell is an instruction message about delaying or advancing a handover, the message may contain suggestion information for the cell, such as a suggestion about keeping the parameter for delaying or advancing the handover unchanged, or a suggestion about a reference value range for parameter adjustment, or a suggestion about a reference value for parameter adjustment If the suggestion information in step 702 for the cell is a reference value for the parameter adjustment, the message may contain a suggested reference value range for the parameter adjustment of the cell If the suggestion information in step 702 for the cell is a reference value range for the parameter adjustment, the message may contain a new suggested reference value range or a suggested reference value for the parameter adjustment of the cell.

Reasons that the suggestion is not accepted.

Then, in step 704, the gNB-CU performs a connection mobility parameter adjustment. This step may be performed by the processing module.

It should be understood that the execution order of step 704 and step 703 may be arbitrary, which is not limited to that shown in FIG. 26A. Step 704 may be performed before, after or in parallel with step 703.

In addition, step 703 is optional. In some implementations, step 703 may be omitted.

FIG. 26B shows a situation where the adjustment fails. Steps 701 and 702 in FIG. 26B are the same as those in FIG. 26A.

In step 701, the gNB-DU transmits a gNB connection mobility adjustment request message to the gNB-CU.

In step 702, the gNB-CU transmits a gNB connection mobility adjustment message to the gNB-DU.

If the gNB-CU does not agree with the suggestion information for all the cells given by the gNB-DU, the method proceeds to step 703a. In step 703a, the gNB-CU may reply with a gNB connection mobility adjustment failure message. For each cell, the adjustment failure message may contain one or more of the following:

Identities of infeasible cells

Suggestion information about infeasible cells

If the suggestion information in step 702 for the cell is an instruction message about delaying or advancing a handover, the message may contain suggestion information for the cell, such as a suggestion about keeping the parameter for delaying or advancing the handover unchanged, or a suggestion about a reference value range for parameter adjustment, or a suggestion about a reference value for parameter adjustment If the suggestion information in step 702 for the cell is a reference value for the parameter adjustment, the message may contain a suggested reference value range for the parameter adjustment of the cell If the suggestion information in step 702 for the cell is a reference value range for the parameter adjustment, the message may contain a new suggested reference value range or a suggested reference value for the parameter adjustment of the cell.

Reasons for a parameter adjustment failure.

FIG. 27 schematically illustrates a schematic diagram of a sixth method for performing a connection mobility adjustment according to a sixth embodiment of the present disclosure. In this embodiment, the connection mobility adjustment is initiated by the gNB-CU.

As shown in FIG. 27, the method begins at step 801.

In step 801, the gNB-CU transmits a gNB connection mobility adjustment request message to the gNB-DU. The message may contain a combination of one or more of the following:

A cell identity for which a suggestion was provided

The cell represented by the above cell identity for which a suggestion was provided will have associated suggestion information The identification information may be an identity of one cell. This cell may belong to the gNB-DU that receives the message, or may belong to another gNB-DU.

The identification information may also contain identification information of two or more cells. The two or more cells may belong to a same gNB-DU, to different gNB-DUs controlled by a same gNB-CU, or to different gNBs.

A suggestion for adjusting the connection mobility parameters given by the gNB-CU for each cell for which a suggestion was provided, and the suggestion may be one of the following three pieces of suggestions information:

Information about delaying or advancing cell selection/reselection/handover as suggested by the gNB-CU. For example, it may be, as suggested by the gNB-CU, an indication message about delaying or advancing a handover by adjusting the mobility parameters. For example, if the information is a first value (e.g., 0), it indicates that the gNB-CU will delay a user handover of the cell by adjusting the mobility parameters. Conversely, if the information is a second value (e.g., 1), it indicates that the gNB-CU will advance the user handover of the cell by adjusting the mobility parameter.

A reference value suggested by the gNB-CU for connection mobility parameter adjustment A reference value range (which may be represented by a maximum value and a minimum value of the range) suggested by the gNB-CU for connection mobility parameter adjustment In some implementations, the adjustment suggestion information for each cell may be different. In some other implementations, the adjustment suggestion information for each cell may be the same. In still other implementations, the cells to be adjusted may be divided into multiple groups. For example, the principles for the grouping may be as follows: the cells in the same group have the same reason for adjusting the connection mobility parameters; the cells in the same group may affect each other when adjusting the mobility parameters; and the like. In the cell grouping implementation, corresponding suggestion information may be given for each cell in each group respectively, as shown in Table 3 below.

TABLE 3

| Group 1 | Group 2 | Group 3 |
|---|---|---|
| Cell 1 | Cell 2, Cell 3 | Cell 4, Cell 5, Cell 6 |
| An indication message about delaying or advancing a handover | A reference value for the connection mobility parameter adjustment suggested for Cell 2 | A reference value range for the connection mobility parameter adjustment suggested for Cell 4 |
| | A reference value for the connection mobility parameter adjustment suggested for Cell 3 | A reference value range for the connection mobility parameter adjustment suggested for Cell 5 |
| | | A reference value range for the connection mobility parameter adjustment suggested for Cell 6 |

A cell identity for which a suggestion is expected:

The gNB-CU expects the gNB-DU to provide a suggestion regarding the connection mobility parameter adjustment for the cell represented by the above cell identity for which a suggestion is expected.

For each of the above cells, reasons that the gNB-DU suggests performing the connection mobility parameter adjustment, such as load balancing, handover optimization, and the like. If a plurality of cells or groups of cells are included, each cell or each group of cells may be given a corresponding reason.

In step 802, the gNB-DU replies to the gNB-CU with a gNB connection mobility adjustment response message. The gNB-DU will reply to the gNB-CU whether suggestion information provided in step 801 is feasible according to the obtained information (such as uplink channel quality information, downlink channel quality information, and the like), which contains one or more of the following:

Cell identities of cells corresponding to feasible suggestion information

Alternatively, if the suggestion information given in step 801 for the cell is a reference value range for parameter adjustment, the acknowledgement message may also contain a suggested reference value corresponding to the cell. In one embodiment, the reference value is within a suggested reference value range for parameter adjustment, while, in another embodiment, the reference value may not be within the suggested reference value range for parameter adjustment. If suggestion information for more than one cells is contained in step 801 and only suggestion information for part of the cells is feasible, then for cells with feasible information, the above information will be contained in the message, while for infeasible cells, the message further contains at least one of the following:

Cell identities of cells corresponding to infeasible suggestion information

Alternatively, suggestion information for infeasible cells:

If the suggestion information in step 801 for the cell is an instruction message about delaying or advancing a handover, the message may contain suggestion information for the cell, such as a suggestion about keeping the parameter for delaying or advancing the handover unchanged, or a suggestion about a reference value range for parameter adjustment, or a suggestion about a reference value for parameter adjustment If the suggestion information in step 801 for the cell is a reference value for the parameter adjustment, the message may contain a suggested reference value range for the parameter adjustment of the cell If the suggestion information in step 801 for the cell is a reference value range for the parameter adjustment, the message may contain an identity of the cell and a newly suggested reference value range or a suggested reference value for the parameter adjustment of the cell.

Alternatively, uplink channel measurement information of the cell served by the gNB-DU and presented in the request message in step 801, which may include one or more of the following:

Cell ID, the identity of the cell to which the measured uplink signal belongs

User ID, the identity of the UE to which the measured uplink signal belongs

Measured signal strength of the uplink signal from the UE indicated by the user ID, such as RSRP, RSSI, and signal energy. The strength information may be an actual measurement result or a quantized result (for example, 0 to 100, 0 means the minimum signal strength, and 100 means the maximum signal strength).

Measured signal quality of the uplink signal from the UE indicated by the user ID, such as RSRQ. The signal quality information may be an actual measurement result or a quantized result (for example, 0 to 100, 0 means the worst signal quality, and 100 means the best signal quality).

Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.

Measurement results indicating the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).

Reasons that the suggestion is not accepted.

If the gNB-DU does not agree with all the suggestion information given by the gNB-CU, for each cell for which a suggestion was provided in step 801, the message may contain one or more of the following:

Cell identities of cells corresponding to infeasible suggestion information

Alternatively, suggestion information for infeasible cells:

If the suggestion information in step 801 for the cell is an instruction message about delaying or advancing a handover, the message may contain suggestion information for the cell, such as a suggestion about keeping the parameter for delaying or advancing the handover unchanged, or a suggestion about a reference value range for parameter adjustment, or a suggestion about a reference value for parameter adjustment If the suggestion information in step 801 for the cell is a reference value for the parameter adjustment, the message may contain a suggested reference value range for the parameter adjustment If the suggestion information in step 801 for the cell is a reference value range for the parameter adjustment, the message may contain a new suggested reference value range or a suggested reference value for the parameter adjustment Uplink channel measurement information of the cell served by the gNB-DU and presented in the request message in step 801, which may include one or more of the following:

Cell ID, the identity of the cell to which the measured uplink signal belongs

User ID, the identity of the UE to which the measured uplink signal belongs

Measured signal strength of the uplink signal from the UE indicated by the user ID, such as RSRP, RSSI, and signal energy. The strength information may be an actual measurement result or a quantized result (for example, 0 to 100, 0 means the minimum signal strength, and 100 means the maximum signal strength).

Measured signal quality of the uplink signal from the UE indicated by the user ID, such as RSRQ. The signal quality information may be an actual measurement result or a quantized result (for example, 0 to 100, 0 means the worst signal quality, and 100 means the best signal quality).

Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.

Measurement results indicating the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).

Reasons for a parameter adjustment failure.

If a cell identity for which a suggestion is expected is contained in step 801, for each such cell, the gNB-DU may give a suggestion for adjusting the connection mobility parameters, and/or may report uplink channel measurement information. Thus, for each cell for which a suggestion is expected, the message may contain one or more of the following:

Suggestion information for the connection mobility parameter adjustment, which may include at least one of the following:

Cell identification information

One of the following three suggestion information:

An indication message for delaying or advancing a handover by adjusting the mobility parameters as suggested by the gNB-DU. For example, if the message is 0, it indicates that the gNB-DU will delay user handover of the cell by adjusting the mobility parameter, or otherwise, if the message is 1, it indicates advancing the user handover of the cell.

A reference value suggested by the gNB-DU for connection mobility parameter adjustment A reference value range (which may be represented by a maximum value and a minimum value of the range) suggested by the gNB-DU for connection mobility parameter adjustment Uplink channel measurement information, which may include one or more of the following:

Cell ID, the identity of the cell to which the measured uplink signal belongs

User ID, the identity of the UE to which the measured uplink signal belongs

Measured signal strength of the uplink signal from the UE indicated by the user ID, such as RSRP, RSSI, and signal energy. The strength information may be an actual measurement result or a quantized result (for example, 0 to 100, 0 means the minimum signal strength, and 100 means the maximum signal strength).

Measured signal quality of the uplink signal from the UE indicated by the user ID, such as RSRQ. The signal quality information may be an actual measurement result or a quantized result (for example, 0 to 100, 0 means the worst signal quality, and 100 means the best signal quality).

Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.

Measurement results indicating the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).

In an optional step 803, the gNB-CU replies to the gNB-DU with a gNB connection mobility adjustment acknowledgement message if suggestion information, for the cell for which a suggestion is expected in step 801, is provided in step 802. For the cell, for which a suggestion is expected, provided in each step 801 and the corresponding suggestion information provided in step 802, the following information may be contained:

Cell identities of cells for which the suggestion information provided in step 802 is a feasible, among the cells for which a suggestion is expected, Alternatively, if the suggestion information is a reference range for connection mobility parameter adjustment, it may also contain a suggested reference value. In one embodiment, the reference value is within a suggested reference value range for parameter adjustment, while, in another embodiment, the reference value may not be within the suggested reference value range for parameter adjustment.

If only suggestion information for part of cells is feasible, for cells with feasible information, the above information will be contained in the adjustment acknowledgement message as described above, while, for infeasible cells, the adjustment acknowledgement message further contains at least one of the following messages:

Identities of infeasible cells

Suggestion information about infeasible cells

If the suggestion information in step 802 for the cell is an instruction message about delaying or advancing a handover, the message may contain suggestion information for the cell, such as a suggestion about keeping the parameter for delaying or advancing the handover unchanged, or a suggestion about a reference value range for parameter adjustment, or a suggestion about a reference value for parameter adjustment If the suggestion information in step 802 for the cell is a reference value for the parameter adjustment, the message may contain a suggested reference value range for the parameter adjustment of the cell If the suggestion information in step 802 for the cell is a reference value range for the parameter adjustment, the message may contain a new suggested reference value range or a suggested reference value for the parameter adjustment of the cell.

Reasons that the suggestion is not accepted.

Additionally, if the gNB-CU does not agree with the suggestion information for all the cells given by the gNB-DU, for each cell, the adjustment acknowledgement message may contain one or more of the following:

Identities of infeasible cells

Suggestion information about infeasible cells

If the suggestion information in step 802 for the cell is an instruction message about delaying or advancing a handover, the message may contain suggestion information for the cell, such as a suggestion about keeping the parameter for delaying or advancing the handover unchanged, or a suggestion about a reference value range for parameter adjustment, or a suggestion about a reference value for parameter adjustment If the suggestion information in step 802 for the cell is a reference value for the parameter adjustment, the message may contain a suggested reference value range for the parameter adjustment of the cell If the suggestion information in step 802 for the cell is a reference value range for the parameter adjustment, the message may contain a new suggested reference value range or a suggested reference value for the parameter adjustment of the cell.

Reasons for a parameter adjustment failure.

Then, in step 804, the gNB-CU performs a connection mobility parameter adjustment. This step may be performed by the processing module.

It should be understood that the execution order of step 804 and step 803 may be arbitrary, which is not limited to that shown in FIG. 27. Step 804 may be performed before, after or in parallel with step 803.

In addition, step 803 is optional. In some implementations, step 803 may be omitted.

FIG. 28 schematically illustrates a schematic diagram of a seventh method for performing a connection mobility adjustment according to a seventh embodiment of the present disclosure; In this embodiment, the connection mobility adjustment is initiated by the gNB-DU.

As shown in FIG. 28, the method begins at step 901.

In step 901, the gNB-DU transmits a gNB connection mobility adjustment request message to the gNB-CU. The adjustment request message may contain a combination of one or more of the following:

A cell identity for which a suggestion was provided

The cell represented by the above cell identity for which a suggestion was provided will have associated suggestion information This identification information may be an identity of a cell which may belong to the gNB-DU that receives the message, or may belong to another gNB-DU.

This identification information may also contain identification information of two or more cells where the two or more cells may belong to a same gNB-DU, to different gNB-DUs controlled by a same gNB-CU, or to different gNBs.

A suggestion for adjusting the connection mobility parameters given by the gNB-DU for each cell for which a suggestion was provided, and the suggestion may be one of the following three pieces of suggestions information:

An indication message for delaying or advancing a handover by adjusting the mobility parameters as suggested by the gNB-DU. For example, if the message is 0, it indicates that the gNB-CU will delay user handover of the cell by adjusting the mobility parameter, or otherwise, if the message is 1, it indicates advancing the user handover of the cell.

A reference value suggested by the gNB-DU for connection mobility parameter adjustment A reference value range (which may be represented by a maximum value and a minimum value of the range) suggested by the gNB-DU for connection mobility parameter adjustment In some implementations, the adjustment suggestion information for each cell may be different. In some other implementations, the adjustment suggestion information for each cell may be the same. In still other implementations, the cells to be adjusted may be divided into multiple groups. For example, the principles for the grouping may be as follows: the cells in the same group have the same reason for adjusting the connection mobility parameters; the cells in the same group may affect each other when adjusting the mobility parameters; and the like. In the cell grouping implementation, corresponding suggestion information may be given for each cell in each group respectively, as shown in Table 4 below.

TABLE 4

| Group 1 | Group 2 | Group 3 |
|---|---|---|
| Cell 1 | Cell 2, Cell 3 | Cell 4, Cell 5, Cell 6 |
| An indication message about delaying or advancing a handover | A reference value for the connection mobility parameter adjustment suggested for Cell 2 A reference value for the connection mobility parameter adjustment suggested for Cell 3 | A reference value range for the connection mobility parameter adjustment suggested for Cell 4 A reference value range for the connection mobility parameter adjustment suggested for Cell 5 A reference value range for the connection mobility parameter adjustment suggested for Cell 6 |

A cell identity for which a suggestion is expected

The gNB-DU expects the gNB-CU to provide a suggestion regarding the connection mobility parameter adjustment for the cell represented by the above cell identity for which a suggestion is expected.
  Alternatively, uplink channel measurement information of the cell served by the gNB-DU and presented in the request message in step 901, which may include one or more of the following:
    Cell ID, the identity of the cell to which the measured uplink signal belongs
    User ID, the identity of the UE to which the measured uplink signal belongs
    Measured signal strength of the uplink signal from the UE indicated by the user ID, such as RSRP, RSSI, and signal energy. The strength information may be an actual measurement result or a quantized result (for example, 0 to 100, 0 means the minimum signal strength, and 100 means the maximum signal strength).
    Measured signal quality of the uplink signal from the UE indicated by the user ID, such as RSRQ. The signal quality information may be an actual measurement result or a quantized result (for example, 0 to 100, 0 means the worst signal quality, and 100 means the best signal quality).
    Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.
    Measurement results indicating the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).
  For each above cell, reasons that the gNB-DU suggests performing the connection mobility parameter adjustment, such as load balancing, handover optimization, and the like. If a plurality of cells or groups of cells are included, each cell or each group of cells may be given a corresponding reason.

In step 902, the gNB-CU replies to the gNB-DU with a gNB connection mobility adjustment response message. The gNB-CU will reply to the gNB-DU whether suggestion information provided in step 801 is feasible according to the obtained information (such as uplink channel quality information, downlink channel quality information, and the like), which contains one or more of the following:
  Cell identities of cells corresponding to feasible suggestion information
  Alternatively, if the suggestion information given in step 901 for the cell is a reference value range for parameter adjustment, the acknowledgement message may also contain a suggested reference value corresponding to the cell. In one embodiment, the reference value is within a suggested reference value range for parameter adjustment, while, in another embodiment, the reference value may not be within the suggested reference value range for parameter adjustment.
If suggestion information for more than one cells is contained in step 901 and only suggestion information for part of the cells is feasible, for cells with feasible information, the above information will be contained in the message, while, for infeasible cells, the message further contains at least one of the following:
  Cell identities of cells corresponding to infeasible suggestion information
  Alternatively, suggestion information for infeasible cells:
    If the suggestion information in step 901 for the cell is an instruction message about delaying or advancing a handover, the message may contain suggestion information for the cell, such as a suggestion about keeping the parameter for delaying or advancing the handover unchanged, or a suggestion about a reference value range for parameter adjustment, or a suggestion about a reference value for parameter adjustment
    If the suggestion information in step 901 for the cell is a reference value for the parameter adjustment, the message may contain a suggested reference value range for the parameter adjustment of the cell
    If the suggestion information in step 901 for the cell is a reference value range for the parameter adjustment, the message may contain an identity of the cell and a newly suggested reference value range or a suggested reference value for the parameter adjustment of the cell.
Reasons that the suggestion is not accepted.
If the gNB-CU does not agree with all the suggestion information given by the gNB-DU, for each cell for which a suggestion was provided in step 901, the message may contain one or more of the following:
  Cell identities of cells corresponding to infeasible suggestion information
  Alternatively, suggestion information for infeasible cells:
    If the suggestion information in step 901 for the cell is an instruction message about delaying or advancing a handover, the message may contain suggestion information for the cell, such as a suggestion about keeping the parameter for delaying or advancing the handover unchanged, or a suggestion about a reference value range for parameter adjustment, or a suggestion about a reference value for parameter adjustment If the suggestion information in step 901 for the cell is a reference value for the parameter adjustment, the message may contain a suggested reference value range for the parameter adjustment If the suggestion information in step 901 for the cell is a reference value range for the parameter adjustment, the message may contain a new suggested reference value range or a suggested reference value for the parameter adjustment Reasons for a parameter adjustment failure.

If a cell identity for which a suggestion is expected is contained in step 901, for each such cell, the gNB-CU may give a suggestion for adjusting the connection mobility parameters, which may contain the following information:

Cell identification information

One of the following three suggestion information:

An indication message for delaying or advancing a handover by adjusting the mobility parameters as suggested by the gNB-CU. For example, if the message is 0, it indicates that the gNB-CU will delay user handover of the cell by adjusting the mobility parameter, or otherwise, if the message is 1, it indicates advancing the user handover of the cell.

A reference value suggested by the gNB-CU for connection mobility parameter adjustment A reference value range (which may be represented by a maximum value and a minimum value of the range) suggested by the gNB-CU for connection mobility parameter adjustment In optional step 903, the gNB-DU replies to the gNB-CU with a gNB connection mobility adjustment acknowledgement message if suggestion information, for the cell for which a suggestion is expected in step 901, is provided in step 902. For the cell, for which a suggestion is expected, provided in each step 901 and the corresponding suggestion information provided in step 902, the following information is contained:

Cell identities of cells for which the suggestion information provided in step 902 is a feasible, among the cells for which a suggestion is expected, Alternatively, if the suggestion information is a reference range for connection mobility parameter adjustment, it may also contain a suggested reference value. In one embodiment, the reference value is within a suggested reference value range for parameter adjustment, while, in another embodiment, the reference value may not be within the suggested reference value range for parameter adjustment.

If only suggestion information for part of cells is feasible, for cells with feasible information, the above information will be contained in the message as described above, while, for infeasible cells, the message further contains at least one of the following messages:

Identities of infeasible cells

Suggestion information about infeasible cells

If the suggestion information in step 902 for the cell is an instruction message about delaying or advancing a handover, the message may contain suggestion information for the cell, such as a suggestion about keeping the parameter for delaying or advancing the handover unchanged, or a suggestion about a reference value range for parameter adjustment, or a suggestion about a reference value for parameter adjustment If the suggestion information in step 902 for the cell is a reference value for the parameter adjustment, the message may contain a suggested reference value range for the parameter adjustment of the cell If the suggestion information in step 502 for the cell is a reference value range for the parameter adjustment, the message may contain a newly suggested reference value range or a suggested reference value for the parameter adjustment of the cell.

Alternatively, uplink channel measurement information of the cell served by the gNB-DU and expecting a suggestion in step 901, which may include one or more of the following:

Cell ID, the identity of the cell to which the measured uplink signal belongs

User ID, the identity of the UE to which the measured uplink signal belongs

Measured signal strength of the uplink signal from the UE indicated by the user ID, such as RSRP, RSSI, and signal energy. The strength information may be an actual measurement result or a quantized result (for example, 0 to 100, 0 means the minimum signal strength, and 100 means the maximum signal strength).

Measured signal quality of the uplink signal from the UE indicated by the user ID, such as RSRQ. The signal quality information may be an actual measurement result or a quantized result (for example, 0 to 100, 0 means the worst signal quality, and 100 means the best signal quality).

Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.

Measurement results indicating the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).

Reasons that the suggestion is not accepted.

Additionally, if the gNB-DU does not agree with the suggestion information for all the cells given by the gNB-CU, for each cell, the message may contain one or more of the following:

Identities of infeasible cells

Suggestion information about infeasible cells

If the suggestion information in step 902 for the cell is an instruction message about delaying or advancing a handover, the message may contain suggestion information for the cell, such as a suggestion about keeping the parameter for delaying or advancing the handover unchanged, or a suggestion about a reference value range for parameter adjustment, or a suggestion about a reference value for parameter adjustment If the suggestion information in step 902 for the cell is a reference value for the parameter adjustment, the message may contain a suggested reference value range for the parameter adjustment of the cell If the suggestion information in step 902 for the cell is a reference value range for the parameter adjustment, the message may contain a new suggested reference value range or a suggested reference value for the parameter adjustment of the cell.

Alternatively, uplink channel measurement information of the cell served by the gNB-DU and expecting a suggestion in step 901, which may include one or more of the following:

Cell ID, the identity of the cell to which the measured uplink signal belongs

User ID, the identity of the UE to which the measured uplink signal belongs

Measured signal strength of the uplink signal from the UE indicated by the user ID, such as RSRP, RSSI, and signal energy. The strength information may be an actual measurement result or a quantized result (for example, 0 to 100, 0 means the minimum signal strength, and 100 means the maximum signal strength).

Measured signal quality of the uplink signal from the UE indicated by the user ID, such as RSRQ. The signal quality information may be an actual measurement result or a quantized result (for example, 0 to 100, 0 means the worst signal quality, and 100 means the best signal quality).

Measured level (e.g., intensity level or quality level) of the uplink signal from the UE indicated by the user ID, such as low, medium and high. The above level decision depends on a specific implementation of the gNB-DU. For example, the level is "low" if the signal strength or quality of the uplink signal is lower than a fourth threshold, "high" if higher than a fifth threshold, and "medium" if between the fourth and the fifth thresholds.

Measurement results indicating the signal strengths/signal qualities of the uplink signals of all the UEs in the cell indicated by the Cell ID, such as an average value of the measurement results for all the UEs. The measurement results may be actual measurement results or quantized results (for example, 0-100, 0 means the minimum signal strength/the worst signal quality, and 100 means the maximum signal strength/the best signal quality).

Reasons for a parameter adjustment failure.

Then, in step 904, the gNB-CU performs a connection mobility parameter adjustment according to the received gNB connection mobility adjustment acknowledgement. This step may be performed by the processing module.

Examples referring to the exemplary embodiments will be described as supplementary notes below. The above exemplary embodiments and modifications thereto may also be described in whole or in part as the following supplementary notes. However, the present disclosure and modifications thereto, which are exemplified in the foregoing exemplary embodiments, are not limited to the following.

(Supplementary Note 1)

A method performed in a central unit of a base station, comprising:

transmitting a resource status request message to a distributed unit of the base station;

receiving a resource status response message and a resource status update message from the base station; and performing a connection mobility adjustment according to the received resource status response message and resource status update message.

(Supplementary Note 2)

A central unit in a base station comprising:

a transmitting module configured to transmit a resource status request message to a distributed unit of the base station; and a receiving module configured to receive a resource status response message and a resource status update message from the distributed unit of the base station; and a processing module configured to perform a connection mobility adjustment according to the received resource status response message and resource status update message.

(Supplementary Note 3)

A method performed in a distributed unit of a base station, comprising:

receiving a resource status request message from a central unit of the base station;

transmitting a resource status response message and a resource status update message to the central unit of the base station.

(Supplementary Note 4)

A distributed unit in a base station comprising:

a receiving module configured to receive a resource status request message from a central unit of the base station; and a transmitting module configured to transmit a resource status response message and a resource status update message to the central unit of the base station.

(Supplementary Note 5)

The method or unit of any of Supplementary Notes 1-4, wherein the resource status request message comprises any of the following:

identification information of the distributed unit;

instruction information that uplink channel measurement information is required to be reported;

a list of cells to which the uplink channel measurement information required to be reported belongs;

period information or trigger information for the report;

measurement identification information assigned by the central unit and relating to the uplink channel measurement; and instruction information related to controlling the report of the uplink channel measurement information.

(Supplementary Note 6)

The method or unit of any of Supplementary Notes 1-4, wherein the resource status response message comprises any of the following:

measurement identification information assigned by the central unit;

measurement identification information assigned by the distributed unit;

a list of cells that can be measured and reported;

a list of cells that cannot be measured and reported;

reasons that the cells cannot be measured and reported.

(Supplementary Note 7)

The method or unit of any of Supplementary Notes 1-4, wherein the resource status update message comprises any of the following:

the identity of the cell corresponding to the reported measurement;

the user identity corresponding to the reported measurement;

measured signal strength;

measured signal quality;

measured signal level; and overall signal strength/signal quality of the cell.

(Supplementary Note 8)
A method performed in a central unit of a base station, comprising:
- transmitting a connection mobility adjustment request message to a distributed unit of the base station;
- receiving a connection mobility adjustment acknowledgement message from the distributed unit of the base station, and
- performing a connection mobility adjustment according to the received connection mobility adjustment acknowledgement message.

(Supplementary Note 9)
The method of Supplementary Note 8, further comprising:
- receiving a connection mobility adjustment required message from the distributed unit of the base station,
- wherein transmitting the connection mobility adjustment request message to the distributed unit of the base station is made in response to the received connection mobility adjustment required message.

(Supplementary Note 10)
The central unit of Supplementary Note 8, wherein the connection mobility adjustment request message includes at least one of the following:
- cell identification information of a cell for which a connection mobility parameter needs to be adjusted;
- adjustment suggestion information for the connection mobility parameter;
- a reason for connection mobility parameter adjustment.

(Supplementary Note 11)
The method of Supplementary Note 10, wherein the adjustment suggestion information for the connection mobility parameter comprises at least one of the following:
- Information about delaying or advancing cell selection/reselection/handover;
- a reference value for the connection mobility parameter adjustment;
- a reference value range for the connection mobility parameter adjustment.

(Supplementary Note 12)
The method of Supplementary Note 8, wherein the connection mobility adjustment acknowledgement message comprises at least one of the following:
- information about cells corresponding to feasible adjustment suggestion information; and/or
- information about cells corresponding to infeasible adjustment suggestion information.

(Supplementary Note 13)
A central unit in a base station comprising:
- a transmitting module configured to transmit a connection mobility adjustment request message to a distributed unit of the base station;
- a receiving module configured to receive a connection mobility adjustment acknowledgement message from the distributed unit of the base station; and
- a processing module configured to perform a connection mobility adjustment according to the connection mobility adjustment acknowledgement message.

(Supplementary Note 14)
The central unit of Supplementary Note 13, wherein:
- the receiving module is further configured to receive a connection mobility adjustment required message from the distributed unit of the base station, and
- the transmitting module is further configured to transmit the connection mobility adjustment request message to the distributed unit of the base station in response to the connection mobility adjustment required message.

(Supplementary Note 15)
The central unit of Supplementary Note 13, wherein the connection mobility adjustment request message includes at least one of the following:
- cell identification information of a cell for which a connection mobility parameter needs to be adjusted;
- adjustment suggestion information for the connection mobility parameter;
- a reason for connection mobility parameter adjustment.

(Supplementary Note 16)
The central unit of Supplementary Note 15, wherein the adjustment suggestion information for the connection mobility parameter comprises at least one of the following:
- information about delaying or advancing cell selection/reselection/handover;
- a reference value for the connection mobility parameter adjustment; and/or
- a reference value range for the connection mobility parameter adjustment.

(Supplementary Note 17)
The method of Supplementary Note 13, wherein the connection mobility adjustment acknowledgement message comprises at least one of the following:
- information about cells corresponding to feasible adjustment suggestion information; and/or
- information about cells corresponding to infeasible adjustment suggestion information.

(Supplementary Note 18)
A method performed in a distributed unit of a base station, comprising:
- receiving a connection mobility adjustment request message from a central unit of the base station;
- transmitting, in response to the received connection mobility adjustment request message, a connection mobility adjustment acknowledgement message to the central unit of the base station.

(Supplementary Note 19)
The method of Supplementary Note 18, further comprising:
- transmitting a connection mobility adjustment required message to the central unit of the base station;
- wherein the connection mobility adjustment request message is a response message to the connection mobility adjustment required message.

(Supplementary Note 20)
The method of Supplementary Note 18, wherein the connection mobility adjustment request message includes at least one of the following:
- cell identification information of a cell for which a connection mobility parameter needs to be adjusted;
- adjustment suggestion information for the connection mobility parameter;
- a reason for connection mobility parameter adjustment.

(Supplementary Note 21)
The method of Supplementary Note 20, wherein the adjustment suggestion information for the connection mobility parameter comprises at least one of the following:
- information about delaying or advancing cell selection/reselection/handover;
- a reference value for the connection mobility parameter adjustment; and/or
- a reference value range for the connection mobility parameter adjustment.

(Supplementary Note 22)
The method of Supplementary Note 18, wherein the connection mobility adjustment acknowledgement message comprises at least one of the following:

information about cells corresponding to feasible adjustment suggestion information; and/or information about cells corresponding to infeasible adjustment suggestion information.

(Supplementary Note 23)

A distributed unit in a base station comprising:

a receiving module, configured to receive a connection mobility adjustment request message from a central unit of the base station; and a transmitting module, configured to transmit, in response to the received connection mobility adjustment request message, a connection mobility adjustment acknowledgement message to the central unit of the base station.

(Supplementary Note 24)

The distributed unit of Supplementary Note 23, wherein:

the transmitting module is further configured to transmit a connection mobility adjustment required message to the central unit of the base station;

wherein the connection mobility adjustment request message is a response message to the connection mobility adjustment required message.

(Supplementary Note 25)

The distributed unit of claim 23, wherein the connection mobility adjustment request message includes at least one of the following:

cell identification information of a cell for which a connection mobility parameter needs to be adjusted;

adjustment suggestion information for the connection mobility parameter;

a reason for connection mobility parameter adjustment.

(Supplementary Note 26)

The distributed unit of claim 25, wherein the adjustment suggestion information for the connection mobility parameter comprises at least one of the following:

information about delaying or advancing cell selection/reselection/handover;

a reference value for the connection mobility parameter adjustment; and/or a reference value range for the connection mobility parameter adjustment.

(Supplementary Note 27)

The distributed unit of claim 23, wherein the connection mobility adjustment acknowledgement message comprises at least one of the following:

information about cells corresponding to feasible adjustment suggestion information; and/or information about cells corresponding to infeasible adjustment suggestion information.

(Supplementary Note 28)

A method performed in a central unit of a base station, comprising:

receiving a connection mobility adjustment request message from a distributed unit of the base station; and performing a connection mobility adjustment according to the received connection mobility adjustment request message.

(Supplementary Note 29)

The method of Supplementary Note 28, further comprising:

transmitting a connection mobility adjustment acknowledgement message to a distributed unit of the base station.

(Supplementary Note 30)

The method of Supplementary Note 28, further comprising:

transmitting a connection mobility adjustment required message to a distributed unit of the base station;

wherein the connection mobility adjustment request message is a response to the connection mobility adjustment required message.

(Supplementary Note 31)

A central unit in a base station comprising:

a receiving module configured to receive a connection mobility adjustment request message from a distributed unit of the base station; and a processing module configured to perform a connection mobility adjustment according to the received connection mobility adjustment request message.

(Supplementary Note 32)

The central unit of Supplementary Note 31, wherein:

the transmitting module is further configured to transmit a connection mobility adjustment acknowledgement message to a distributed unit of the base station.

(Supplementary Note 33)

The central unit of Supplementary Note 31, wherein:

the transmitting module is further configured to transmit a connection mobility adjustment required message to a distributed unit of the base station.

wherein the connection mobility adjustment request message is a response to the connection mobility adjustment required message.

(Supplementary Note 34)

A method performed in a distributed unit of a base station, comprising:

transmitting a connection mobility adjustment request message to a central unit of the base station; and receiving a connection mobility adjustment acknowledgement message from the central unit of the base station.

(Supplementary Note 35)

The method of Supplementary Note 34, further comprising:

receiving a connection mobility adjustment required message from a central unit of the base station, wherein transmitting the connection mobility adjustment request message to the central unit of the base station is made in response to the received connection mobility adjustment required message.

(Supplementary Note 36)

A distributed unit in a base station comprising:

a transmitting module configured to transmit a connection mobility adjustment request message to a central unit of the base station; and a receiving module configured to receive a connection mobility adjustment acknowledgement message from the central unit of the base station.

(Supplementary Note 37)

The distributed unit of Supplementary Note 36, wherein:

the receiving module is further configured to receive a connection mobility adjustment required message from a central unit of the base station, wherein transmitting the connection mobility adjustment request message to the central unit of the base station is made in response to the received connection mobility adjustment required message.

(Supplementary Note 38)

A method performed in a central unit of a base station, comprising:

transmitting a connection mobility adjustment request message to a distributed unit of the base station;

receiving a connection mobility adjustment response message from a distributed unit of the base station; and performing a connection mobility adjustment according to the received connection mobility adjustment response message.

(Supplementary Note 39)

The method of Supplementary Note 38, further comprising:

transmitting a connection mobility adjustment acknowledgement message to a distributed unit of the base station.

(Supplementary Note 40)

The method of Supplementary Note 38 or 39, wherein the connection mobility adjustment request message includes at least one of the following:

a cell identity of the cell for which a suggestion is provided, and its corresponding adjustment suggestion information for the connection mobility parameter;

a cell identity for which a suggestion is expected a reason for the adjustment.

(Supplementary Note 41)

The method of Supplementary Note 38 or 39, wherein the connection mobility adjustment response message includes at least one of the following:

information about cells corresponding to feasible suggestion information;

information about cells corresponding to infeasible suggestion information.

(Supplementary Note 42)

A central unit in a base station configured to perform a method of any of Supplementary Notes 38-41.

(Supplementary Note 43)

A method performed in a distributed unit of a base station, comprising:

receiving a connection mobility adjustment request message from a central unit of the base station;

transmitting a connection mobility adjustment response message to the central unit of the base station.

(Supplementary Note 44)

The method of Supplementary Note 43, further comprising:

receiving a connection mobility adjustment acknowledgement message from the central unit of the base station.

(Supplementary Note 45)

The method of Supplementary Note 43 or 44, wherein the connection mobility adjustment request message includes at least one of the following:

a cell identity of the cell for which a suggestion is provided, and its corresponding adjustment suggestion information for the connection mobility parameter;

a cell identity for which a suggestion is expected;

a reason for the adjustment.

(Supplementary Note 46)

The method of Supplementary Note 43 or 44, wherein the connection mobility adjustment response message includes at least one of the following:

information about cells corresponding to feasible suggestion information;

information about cells corresponding to infeasible suggestion information.

(Supplementary Note 47)

A distributed unit in a base station configured to perform a method of any of Supplementary Notes 43-46.

(Supplementary Note 48)

A method performed in a central unit of a base station, comprising:

receiving a connection mobility adjustment request message from a distributed unit of the base station;

transmitting a connection mobility adjustment response message to the central unit of the base station;

receiving a connection mobility adjustment acknowledgement message from the distributed unit of the base station, and performing a connection mobility adjustment according to the received connection mobility adjustment acknowledgement message.

(Supplementary Note 49)

The method of Supplementary Note 48, wherein the connection mobility adjustment request message includes at least one of the following:

a cell identity of the cell for which a suggestion is provided, and its corresponding adjustment suggestion information for the connection mobility parameter;

a cell identity for which a suggestion is expected;

a reason for the adjustment.

(Supplementary Note 50)

The method of Supplementary Note 48, wherein the connection mobility adjustment response message includes at least one of the following:

information about cells corresponding to feasible suggestion information;

information about cells corresponding to infeasible suggestion information.

(Supplementary Note 51)

A central unit in a base station configured to perform a method of any of Supplementary Notes 48-50.

(Supplementary Note 52)

A method performed in a distributed unit of a base station, comprising:

transmitting a connection mobility adjustment request message to a central unit of the base station;

receiving a connection mobility adjustment response message from a central unit of the base station; and transmitting a connection mobility adjustment acknowledgement message to a central unit of the base station.

(Supplementary Note 53)

The method of Supplementary Note 52, wherein the connection mobility adjustment request message includes at least one of the following:

a cell identity of the cell for which a suggestion is provided, and its corresponding adjustment suggestion information for the connection mobility parameter;

a cell identity for which a suggestion is expected; and a reason for the adjustment.

(Supplementary Note 54)

The method of Supplementary Note 52, wherein the connection mobility adjustment response message includes at least one of the following:

information about cells corresponding to feasible suggestion information;

information about cells corresponding to infeasible suggestion information.

(Supplementary Note 55)

A distributed unit in a base station configured to perform a method of any of Supplementary Notes 52-55.

The method and apparatus involved in the present application have been described above in connection with the preferred embodiments. According to the method for connection mobility control performed via the F1 interface according to the present disclosure, accuracy of setting of parameters such as cell selection/reselection and/or handover can be improved, and issues such as user handover failure, Ping-pong handover, load imbalance between cells and the like due to improper setting of these parameters can be reduced.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flowcharts are executed by computers or other processors of programmable data processing means.

The modules in the devices of the present disclosure can be integrated together, or can be deployed separately. The modules can be integrated into one module, or can be further split into multiple submodules.

It should be understood by those skilled in the art that the drawings are merely schematic diagrams of one preferred embodiment, and the modules or flows in the drawings are not necessary for the implementation of the present disclosure.

It should be understood by those skilled in the art that the modules in the devices in the embodiments can be distributed in the devices in the embodiments according to the descriptions in the embodiments, or can be located in one or more devices in the embodiments in accordance with corresponding changes. The modules in the embodiments can be integrated into one module, or can be further split into multiple submodules.

The serial number in the present disclosure is merely for description and does not indicate the superiority of the embodiments.

The foregoing description merely shows several specific embodiments of the present disclosure, and the present disclosure is not limited thereto. Any variation conceived by those skilled in the art shall fall into the protection scope of the present disclosure.

It should be understood by those skilled in the art that the present disclosure involves devices for carrying out one or more of operations as described in the present disclosure. Those devices may be specially designed and manufactured as intended or may include known devices in a general-purpose computer. These devices have computer programs stored therein, which are selectively activated or reconfigured. Such computer programs may be stored in device (such as computer) readable media or in any type of media suitable for storing electronic instructions and respectively coupled to a bus, the computer readable media include but are not limited to any type of disk (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media include any media storing or transmitting information in a device (for example, computer) readable form.

It can be understood for those skilled in the art that each block of the structure charts and/or block diagrams and/or flowchart illustrations, and combinations of blocks in the structure charts and/or block diagrams and/or flowchart illustrations, may be implemented by computer program instructions. It can be understood for those skilled in the art that the computer program instructions may also be supplied to a general-purpose computer, a special-purpose computer or other processor capable of programming a data processing method for implementation, so that schemes specified in one or more block of the structure charts and/or block diagrams and/or flowchart illustrations are implemented by a computer or other processor capable of programming a data processing method.

It can be understood for those skilled in the art that various operations, methods, steps in a flow, measures and schemes that have been discussed in the present disclosure may be alternated, changed, combined or deleted. In addition, those with various operations, methods, steps in a flow, measures and schemes that have been discussed in the present disclosure may further be alternated, changed, rearranged, disintegrated, combined or deleted. In addition, in the prior art, those with various operations, methods, steps in a flow, measures and schemes that discussed by the present disclosure may further be alternated, changed, rearranged, disintegrated, combined or deleted.

What is claimed is:

1. A method performed by a central unit (CU) of a base station in a wireless communication system, the method comprising:
    transmitting, to a distributed unit (DU) of the base station, a setup request message, wherein the setup request message includes a first cell identifier (ID) of a primary cell (PCell) or a primary secondary cell group (SCG) cell (PSCell), a first information indicating that both uplink (UL) and supplementary uplink (SUL) are configured for the PCell or the PSCell, a second cell ID of a secondary cell (SCell), and second information indicating that both of UL and SUL are configured for the SCell;
    receiving, from the DU of the base station, a setup response message as a response to the setup request message, wherein the setup response message includes a user equipment (UE)-specific configuration associated with a physical uplink shared channel (PUSCH) on the SUL; and
    receiving, from the DU of the base station, an initial UL radio resource control (RRC) message including SUL access indication information indicating that the UE has performed an access on the SUL.

2. The method of claim 1, wherein the setup response message further includes at least one of:
    identification information of a serving cell setup for the UE,
    SUL carrier configuration information of the serving cell, or
    UL carrier configuration information of the serving cell.

3. The method of claim 2, further comprising:
    transmitting, to the UE via the DU of the base station, the SUL carrier configuration information.

4. A method performed by a distributed unit (DU) of a base station in a wireless communication system, the method comprising:
    receiving, from a central unit (CU) of the base station, a setup request message, wherein the setup request message includes a first cell identifier (ID) of a primary cell (PCell) or a primary secondary cell group (SCG) cell (PSCell), a first information indicating that both of uplink (UL) and supplementary uplink (SUL) are configured for the PCell or the PSCell, a second cell ID of a secondary cell (SCell), and second information indicating that both of UL and SUL are configured for the SCell;
    transmitting, to the CU of the base station, a setup response message as a response to the setup request message, wherein the setup response message includes a user equipment (UE)-specific configuration associated with a physical uplink shared channel (PUSCH) on the SUL; and transmitting, to the CU of the base station, an initial UL radio resource control (RRC) message including SUL access indication information indicating that the UE has performed and access on the SUL.

5. The method of claim 4, wherein the setup response message further includes at least one of:

identification information of a serving cell setup for the UE,

SUL carrier configuration information of the serving cell, or

UL carrier configuration information of the serving cell.

6. The method of claim 5, further comprising:

transmitting, to the UE, the SUL carrier configuration information.

7. A central unit (CU) of a base station in a wireless communication system, the CU comprising:

a transceiver; and at least one processor coupled with the transceiver, and configured to:

transmit, to a distributed unit (DU) of the base station, a setup request message, wherein the setup request message includes a first cell identifier (ID) of a primary cell (PCell) or a primary secondary cell group (SCG) cell (PSCell), a first information indicating that both of uplink (UL) and supplementary uplink (SUL) are configured for the PCell or the PSCell, a second cell ID of a secondary cell (SCell), and second information indicating that both of UL and SUL are configured for the SCell;

receive, from the DU of the base station, a setup response message as a response to the setup request message, wherein the setup response message includes a user equipment (UE)-specific configuration associated with a physical uplink shared channel (PUSCH) on the SUL; and receive, from the DU of the base station, an initial UL a radio resource control (RRC) message including SUL access indication information indicating that the UE has performed an access on the SUL.

8. The CU of claim 7, wherein the at least one processor is further configured to:

transmit, to the UE via the DU of the base station, SUL carrier configuration information.

9. The CU of claim 8, wherein the setup response message further includes at least one of:

identification information of a serving cell setup for the UE, the SUL carrier configuration information of the serving cell, or UL carrier configuration information of the serving cell.

10. A distributed unit (DU) of a base station in a wireless communication system, the DU comprising:

a transceiver; and at least one processor coupled with the transceiver and configured to:

receive, from a central unit (CU) of the base station, a setup request message, wherein the setup request message includes a first cell identifier (ID) of a primary cell (PCell) or a primary secondary cell group (SCG) cell (PSCell), a first information indicating that both of uplink (UL) and supplementary uplink (SUL) are configured for the PCell or the PSCell, a second cell ID of a secondary cell (SCell), and second information indicating that both of UL and SUL are configured for the SCell, transmit, to the CU of the base station, a setup response message as a response to the setup request message, wherein the setup response message includes a user equipment (UE)-specific configuration associated with a physical uplink shared channel (PUSCH) on the SUL, and transmit, to the CU of the base station, an initial UL radio resource control (RRC) message including SUL access indication information indicating that the UE has performed an access on the SUL.

11. The DU of claim 10, wherein the setup response message further includes at least one of:

identification information of a serving cell setup for the UE,

SUL carrier configuration information of the serving cell, or

UL carrier configuration information of the serving cell.

12. The DU of claim 11, wherein the at least one processor is further configured to:

transmit, to the UE, the SUL carrier configuration information.

* * * * *